United States Patent [19]

Tredennick et al.

[11] 4,338,661
[45] Jul. 6, 1982

[54] CONDITIONAL BRANCH UNIT FOR MICROPROGRAMMED DATA PROCESSOR

[75] Inventors: Harry L. Tredennick; Thomas G. Gunter, both of Austin, Tex.

[73] Assignee: Motorola, Inc., Schaumburg, Ill.

[21] Appl. No.: 41,201

[22] Filed: May 21, 1979

[51] Int. Cl.³ .......................... G06F 9/06; G06F 9/22; G06F 9/30
[52] U.S. Cl. ..................................................... 364/200
[58] Field of Search ... 364/200 MS File, 900 MS File

[56] References Cited

U.S. PATENT DOCUMENTS

| 3,245,044 | 4/1966 | Meade et al. | 364/200 |
|---|---|---|---|
| 4,038,643 | 7/1977 | Kim | 364/200 |
| 4,075,687 | 2/1978 | Nissen et al. | 364/200 |
| 4,155,120 | 5/1979 | Keefer et al. | 364/200 |
| 4,159,520 | 6/1979 | Prioste | 364/200 |
| 4,179,731 | 12/1979 | Yamazaki | 364/200 |
| 4,197,578 | 4/1980 | Wada et al. | 364/200 |
| 4,199,811 | 4/1980 | Borgerson et al. | 364/200 |

*Primary Examiner*—Harvey E. Springborn
*Attorney, Agent, or Firm*—Anthony J. Sarli, Jr.; Jeffrey Van Myers; Robert L. King

[57] ABSTRACT

A data processor having a microprogrammed control store and including a conditional branch control unit for receiving selection bits output by the control store, selection bits from an instruction register, and conditional signals for generating a two-bit result which, when added to a base address, can specify one of two, three, or four branch destinations in the control store. The selection bits output by the control store determine whether the combination of conditional signals upon which the branch is dependent is selected by the control store or is selected directly by a bit field in the macroinstruction. Also, one of the selection bits output by the control store is used to select one of two possible output codes for the two-bit result associated with a particular branch destination. The latter feature allows for two conditional branch points in the control store to test for the same condition and to select the same destination when the tested condition is of one logic state while selecting different destinations when the tested condition is of the opposite logic state.

5 Claims, 54 Drawing Figures

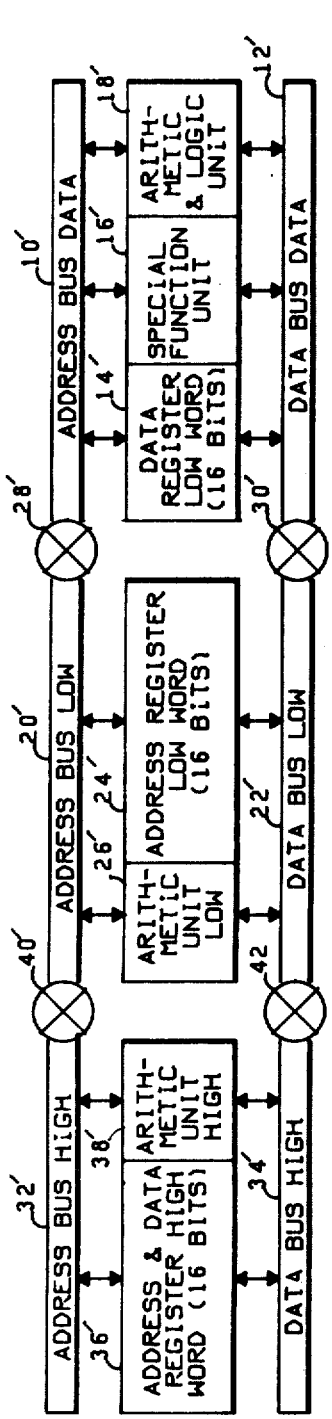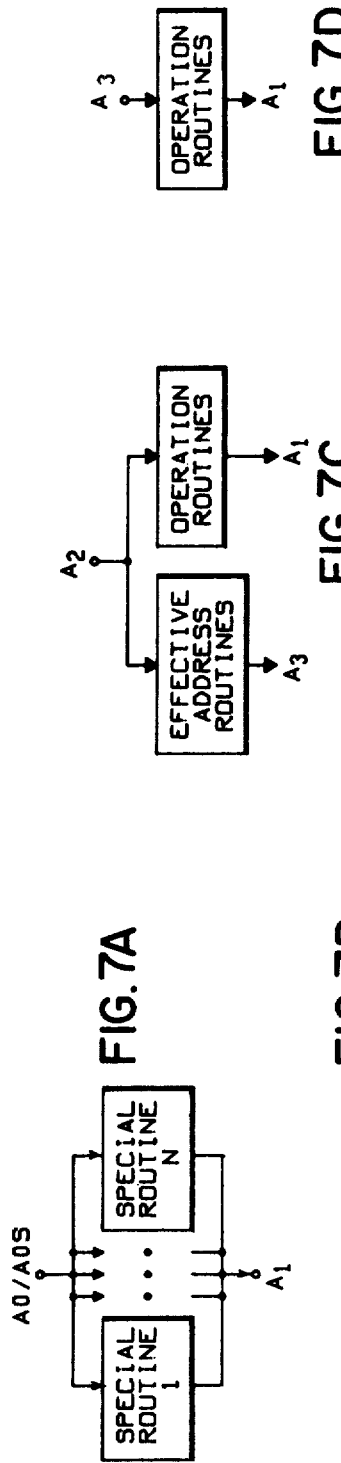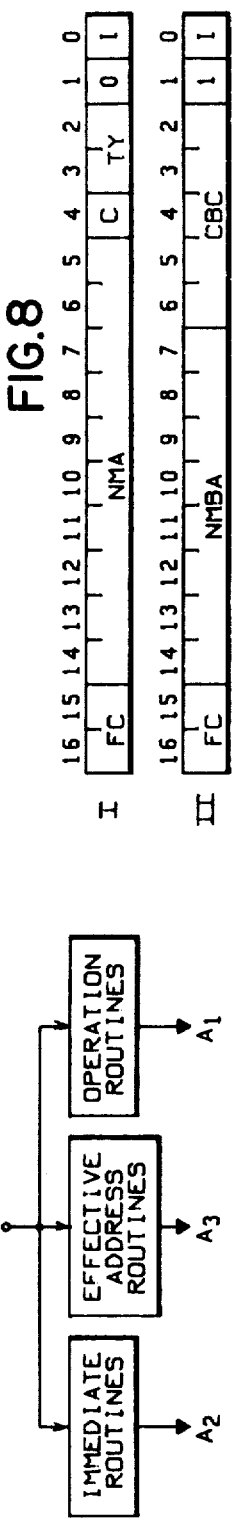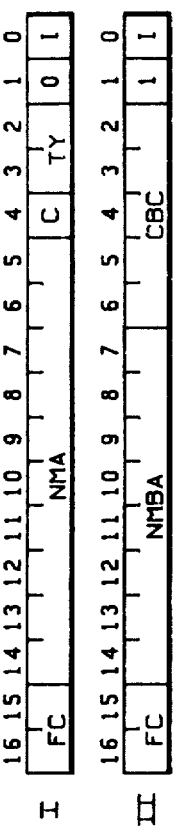

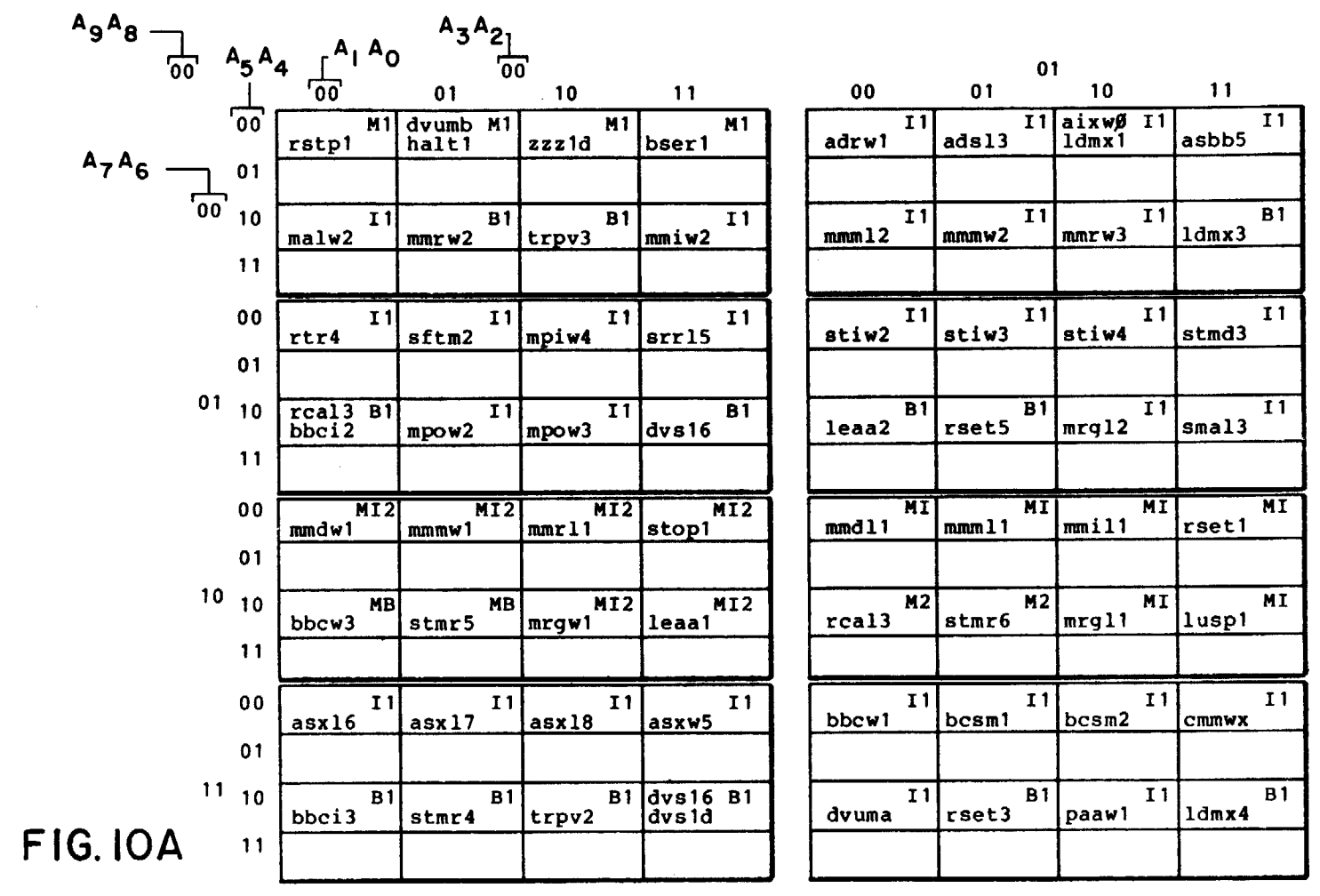

FIG.IOA

Section 11

| | 00 | 01 | 10 | 11 |
|---|---|---|---|---|
| | rmi12 [I1] | rmi13 [I1] | rmm12 [I1] | rmr12 [I1] |
| | mpiw3 [I1] | dvom3 [B1] | mpa12 [I1] | mpa13 [I1] |
| | swap1 [I1] | swap2 [I1] | tasm1 [I1] | tasm2 [I1] |
| | dvsø7 [B1] | dvsø5 [B1] | mulm1 [I1] | mulr1 [I1] |
| | tsr12 [I1] | unlk3 [I1] | unlk4 [I1] | link3 [I1] |
| | nbcm1 [I1] | dvum3 [B1] / dvsø4 [B1] | nnr12 [I1] | paa12 [I1] |
| | dcnt2 [I1] | jmpa1 [I1] | jsa12 [I1] | malw1 [I1] |
| | dvs1ø [B1] | trac1DB1 / dvur2 | pdc11 [I1] | pdc12 [I2] |

Section 10

| | 00 | 01 | 10 | 11 |
|---|---|---|---|---|
| | push6 [I1] | rbrb3 [I1] | rcal2 [I1] | rlql1 [I1] |
| | mpi13 [I1] | mulm6 [B1] | mpilt [I1] | popm6 [B1] / push3 |
| | stmr2 [I1] | stmw2 [I1] | stmx1 [I1] | strw2 [I1] |
| | mrgm1 [I1] | mulm3 [B1] | btsr3 [B1] | mstw1 [I1] |
| | tasr2 [I1] | trap2 [I1] | trap4 [I1] | tsm12 [I1] |
| | dvumf [B1] | mulm5 [B1] | bcsr3 [B1] | push5 [B1] |
| | cpd12 [I1] | cpm12 [I1] | cpr12 [I1] | cprm2 [I1] |
| | dvumd [B1] | mulm4 [B1] | bcsr4 [B1] | push4 [B1] |

Left table (row group 01):

| | | 00 | 01 | 10 | 11 |
|---|---|---|---|---|---|
| 00 | 00 | asxw2 MI3 | roaw1 MI4 | asxw3 MI3 | ldmr2 MI3 |
| | 01 | dvumb MB3 / chkr3 | mmxw1 MI4 | nnrw1 MI3 | trap3 MI3 |
| | 10 | aixw2 MB4 | bsri2 MI4 | aixw1 MI4 | exge1 MI4 |
| | 11 | aixw2 M3 / zzz14 | malw3 MI3 / popm1 | rmdw2 MI2 | zzz1b MI4 |
| 01 | 00 | chkr4 B1 | dvur3 I1 | nnml2 I1 | tasr1 I1 |
| | 01 | | | | |
| | 10 | exge1 I1 / susp1 | bsri1 I1 | bsrw1 I1 | pinw2 I1 |
| | 11 | | | | |
| 10 | 00 | | | | |
| | 01 | | | | |
| | 10 | | | | |
| | 11 | | | | |
| 11 | 00 | trac1 M5 | rorw1 MI7 | adsw1 MI6 | romw1 MI6 |
| | 01 | trap1 MB | cprw1 MI | mpiw1 MI | cpmw1 MI |
| | 10 | aixw4 MB8 | malw3 MI8 | ablw1 MI8 | aixw0 MI8 |
| | 11 | zzz15 | stmd1 MI | jsa11 MI | jsrx0 MI |

Right table (row group 01):

| | | 00 | 01 | 10 | 11 |
|---|---|---|---|---|---|
| 00 | 00 | asx13 MI | roa11 MI | asx14 MI | un1k1 MI |
| | 01 | rset4 M | mmx11 MI | nnr11 MI | bser3 MI |
| | 10 | aix12 MB | bsrw2 MI | aix11 MI | btsr1 MI |
| | 11 | leax2 MB | ldmr1 MI | rmd13 MI | zzz1c MI |
| 01 | 00 | peax5 I1 | maw13 I1 | stmx2 I1 | ldmd3 I1 |
| | 01 | | | | |
| | 10 | btsr2 I1 | chkm1 I1 | chkr1 I1 | chkr2 I1 |
| | 11 | | | | |
| 10 | | | | | |
| 11 | 00 | it1x1 M | ror11 MI | ads11 MI | romm1 MI |
| | 01 | stiw1 M | cpr11 MI | mpi11 MI | cpm11 MI |
| | 10 | asx15 MB | sma11 MI | ab111 MI | aix10 MI |
| | 11 | leax3 MB | ldmx0 MI | jma11 MI | jmpx0 MI |

|    | 00 | 01 | 10 | 11 |
|----|----|----|----|----|
| 00 | zzz00 | rcal1 MI | zzz01 MI | zzz02 MI |
|    | zzz03 | rmx11 MI | zzz04 MI | zzz05 MI |
|    | rmx12 MB | peax6 MI | peax1 MI | bcsr1 MI |
|    | stmx4 MB | zzz08 MI | zzz09 MI | zzz0a MI |
| 11 |  |  |  |  |
|    | mpi12 MI | bbci1 MI |  | nnm11 MI |
|    | dvs02 MI | pin11 MI | stmx3 MI |  |
|    |  |  | dvs01 MI | sccr1 MI |
| 10 |  |  |  |  |
|    |  |  |  |  |
|    | zzz06 | rbrb1 MI | mpol1 MI | cpmm1 MI |
|    | zzz0f MB | zzz10 MI | zzz11 MI | zzz12 MI |
|    | rmx13 MB | smaw1 MI | ral11 MI | rmx10 MI |
|    | stmx5 MB | ldmd1 MI | unlk2 MI | peax0 MI |

|    | 00 | 01 | 10 | 11 |
|----|----|----|----|----|
| 00 | asbb2 MI | reaw1 MI | asbb3 MI | popm2 MI |
|    | itlx6 M | rmxw1 MI | nbcr1 MI | bser5 MI |
|    | rmxw2 MB | paaw2 MI | leax1 MI | bclr1 MI |
|    | peax2 MB | rtr2 MI | zzz06 MI | zzz07 MI |
| 01 |  |  |  |  |
|    | mpiw2 MI2 | dcnt1 MI2 | aixw1 MI2 / ldmx2 MI2 | nnmw1 MI2 |
|    | dvum1 MI2 | adrl1 MI2 | dvur1 MI2 | sccb1 MI2 |
|    |  |  |  |  |
| 10 |  |  |  |  |
|    | strw1 M | rorm1 MI | mpow1 MI | rom11 MI |
|    | zzz0c MI | cprm1 MI | zzz0d MI | zzz0e MI |
|    | rmxw3 MB | lmal1 MI | ralw1 MI | rmxw0 MI |
|    | peax3 MB | lmaw1 MI | paal1 MI | leax0 MI |

FIG. IOB CONTINUED

FIG. 10C

Top grid (row label 10):

|  | 00 | 01 | 10 | 11 |
|---|---|---|---|---|
| 00 | mmx12 MB | jmpx2 MB | asbb4 MB | dcnt5 MI |
| 01 | rts2 MI | adsl2 MI | rmml1 MI | abll2 MI |
| 10 | cmml2 MI | cpdl1 MI | popm5 MI | smaw3 M2 |
| 11 | lmal3 MI | abwl1 MI | dvs17 MB2 | ldmx5 MI |
| 00 | lead2 I1 | pead2 I1 | link1 I1 | roaw2 B1 |
| 01 | dvs15 I1 | mall1 I1 | mall2 I1 | mall3 I1 |
| 10 | mmx13 MB | jmpx3 MB | rmiw1 MI | sccr2 MB |
| 11 | rmil1 MI | bclr5 MB | dvs1a MB | dvs1b M2 |

Bottom grid (row label 10, col label 00):

|  | 00 | 01 | 10 | 11 |
|---|---|---|---|---|
| 00 | mmxw2 MB2 | jsrx2 MB2 | asxw4 MI2 | b MI2 |
| 01 | ablw1 MI2 / smal2 | abll3 MI2 | rmmw1 MI2 | ablw2 MI2 |
| 10 | cmmw2 MI2 | cpdw1 MI2 | ldmr5 MI2 | sccb3 MB |
| 11 | e#w1 MI2 | abww1 MI2 | dvs20 M | adsw2 MI2 |
| 00 | jsra1 I1 | jsrd2 I1 | laaw1 I1 | ldmx6 I1 |
| 01 | dvs06 I1 | bcsr3 B1 / bclr3 | link4 I1 | dvs03 B1 / dvs1f |
| 10 | mmxw3 MB2 | jsrx3 MB2 | rmrw1 MI2 | sccb2 MB2 |
| 11 | rmrl1 MI2 | bclr4 MB2 | dvs03 M2 | dvs1e MB |

| | 00 | 01 | 10 | 11 | |
|---|---|---|---|---|---|
| | | dvumb B1 | dvum2 I1 | pinw1 I1 | |
| | dvum5 B1 dvs12 | dvsØe | | | I1 |
| | rstp2 I1 | rstp5 I1 | rstw1 I1 | rts3 I1 | |
| | dvs13 B1 | dvs14 I1 | dvumØ I1 | push2 I1 | |
| | nbcr3 B1 | peaa1 I1 | pead1 I1 | pin12 I1 | |
| | dvsØf MB | lmal2 MI | dvsØ9 MB | trap5 MI | |
| | rstp4 MI | rmd12 MI | ral12 MI | raql1 MI | |
| | dvsØa MB | dvsØd MB | dvumz MB | dvsØc M | |
| | srrw3 MB2 | jmpx1 MI | trap6 MI | mmi12 MI | |

| | 00 | 01 | 10 | 11 | |
|---|---|---|---|---|---|
| | jmal2 I1 | dvume I1 dvsØ8 | dvs11 I1 | pin13 I1 | |
| | rrgl2 I1 | rrgm1 I1 | rrgw2 I1 | rset2 I1 | |
| | dvum9 B1 | dvum9 B1 dvumc | dvs1c B1 | dvum7 B1 dvum8 | |
| | srrl4 B1 | jsaw1 I1 | jsaw2 I1 | jsaw3 I1 | |
| | rstp3 MI2 | e¢11 MI2 | dvum5 MB2 | it1x4 MI2 | |
| | dvum6 MB2 | ral13 MI2 | ralw2 MI2 | raqw1 MI2 | |
| | srrl3 MB | dvumb MI2 | mmrw2 MB2 dvum4 | dvum7 MB2 | |
| | | jsrx1 MI2 | ldmd4 MI2 | mmr12 MI2 | |

| 10 | | | |
|---|---|---|---|
| 00 | 01 | 10 | 11 |
| tmr13 I1 | roal2 I1 | roal3 I1 | roal4 I1 |
| | | | |
| mmfw2D81 mmaw2 | bcsr5 I1 | bser4 I1 | bser6 I1 |
| | | | |
| adr12 I1 | mor12 I1 | stmw1 I1 | btsi1 I1 |
| | | | |
| bclm2 I1 | mawl2 I1 | lmaw2 I1 | ablw3 I1 |
| | | | |
| mmrw1 MI2 | mmxwØ MI2 | morw1 MI2 | maww2 MI2 |
| | | | |
| ldmr4 MB2 | jsawØ MI2 | O#w1 MI2 | jsrd1 MI2 |
| | | | |
| asxl1 MI | rrgl1 MI | nbcr2 MI | rtr1 MI |
| | | | |
| ldmr3 MB | stmd2 MI | sftm1 MI | rorm2 M |
| | | | |

| 11 | | | |
|---|---|---|---|
| 00 | 01 | 10 | 11 |
| toml2 I1 | toml3 I1 | rorl3 I1 | rorm3 I1 |
| | | | |
| popm6 BI | bsrt3 I1 | bsrw3 I1 | btsm1 I1 |
| | | | |
| zzz17 | zzz18 | zzz19 | zzz1a |
| | | | |
| zzz1e | zzz1f | zzz2Ø | zzz21 |
| | | | |
| mmiw1 MI | mmx1Ø MI | morl1 MI | morw2 MI |
| | | | |
| popm4 MB | jmaw1 MI | laal2 M | jmpd1 MI |
| | | | |
| asbb1 MI | tsrl1 MI | zzz22 | rts1 MI |
| | | | |
| popm3 MB | zzz23 | zzz24 | mulm2 M |
| | | | |

FIG. 10D CONTINUED

| $A_9A_8$ $A_7A_6A_5A_4$ $A_3A_2$ | $A_1A_0$ 00 | 01 | 10 | 11 |
|---|---|---|---|---|
| 00 0000 00 | rstp1 m | dvumb dm | zzz1d m | bser1 m |
| 00 0000 01 | adrw1 | adsl3 | aixw0 d | asbb5 |
| 00 0000 10 | push6 | rbrb3 | rcal2 | rlql1 |
| 00 0000 11 | rmil2 | rmil3 | rmml2 | rmrl2 |
| 00 0100 00 | rtr4 | sftm2 | mpiw4 | srr15 |
| 00 0100 01 | stiw2 | stiw3 | stiw4 | stmd3 |
| 00 0100 10 | stmr2 | stmw2 | stmx1 | strw2 |
| 00 0100 11 | swap1 | swap2 | tasm1 | tasm2 |
| 00 1000 0x | mmdw1 | mmmw1 | mmrl1 | stop1 |
| 00 1000 10 | tasr2 | trap2 | trap4 | tsml2 |
| 00 1000 11 | tsrl2 | unlk3 | unlk4 | link3 |
| 00 1100 00 | asx16 | asx17 | asx18 | asxw5 |
| 00 1100 01 | bbcw1 | bcsm1 | bcsm2 | cmmw4 |
| 00 1100 10 | cpdl2 | cpml2 | cprl2 | cprm2 |
| 00 1100 11 | dcnt2 | jmpa1 | jsal2 | malw1 |
| 01 0000 xx | asxw2 | roaw1 | asxw3 | ldmr2 |

FIG. 11A

|            | 00       | 01       | 10       | 11       |
|---         |---       |---       |---       |---       |
| 00 0010 00 | malw2    | mmrw2 b  | trpv3 b  | mmiw2    |
| 00 0010 01 | mmml2    | mmmw2    | mmrw3    | ldmx3 b  |
| 00 0010 10 | mpil3    | mulm6 b  | mpil4    | popm6 db |
| 00 0010 11 | mpiw3    | dvum3 b  | mpol2    | mpol3    |
| 00 0110 00 | rcal3 db | mpow2    | mpow3    | dvs16 b  |
| 00 0110 01 | leaa2 b  | rset5 b  | mrgl2    | smal3    |
| 00 0110 10 | mrgm1    | mulm3 b  | btsr3 b  | mstw1    |
| 00 0110 11 | dvs07 b  | dvs05 b  | mulm1    | mulr1    |
| 00 1010 0x | rcal3 b  | stmr6 b  | mrgw1    | leaa1    |
| 00 1010 10 | dvumf b  | mulm5 b  | bcsr3 b  | push5 b  |
| 00 1010 11 | nbcm1    | dvum3 db | nnrl2    | paal2    |
| 00 1110 00 | bbci3 b  | stmr4 b  | trpv2 b  | dvs16 db |
| 00 1110 01 | dvuma    | rset3 b  | paaw1    | ldmx4 b  |
| 00 1110 10 | dvumd b  | mulm4 b  | bcsr4 b  | push4 b  |
| 00 1110 11 | dvs10 b  | trac1 db | pdc11    | pdc12    |
| 01 0000 xx | aixw2 b  | bsri2    | aixw1    | exge1    |

FIG. 11B

|           | 00       | 01       | 10       | 11       |
|-----------|----------|----------|----------|----------|
| 01 0001 xx | dvumb db | mmxw1    | nnrw1    | trap3    |
| 01 0101 00 | chkr4 b  | dvur3    | nnm12    | tasr1    |
| 01 0101 01 | peax5    | maw13    | stmx2    | ldmd3    |
| 01 0101 1x | mpiw2    | dcnt1    | aixw1 d  | nnmw1    |
| 01 110x xx | trac1 b  | rorw1    | adsw1    | romw1    |
| 10 0001 0x | mmxw2 b  | jsrx2 b  | asxw4    | b        |
| 10 0001 10 | jma12    | dvume d  | dvs11    | pin13    |
| 10 0001 11 | dvum5 db | dvumb db | dvum2    | pinw1    |
| 10 0101 0x | cmmw2    | cpdw1    | ldmr5    | smaw3 b  |
| 10 0101 10 | dvum9 b  | dvum9 db | dvs1c b  | dvum7 db |
| 10 0101 11 | dvs13 b  | dvs14    | dvum0    | push2    |
| 10 1001 00 | jsra1    | jsrd2    | laaw1    | ldmx6    |
| 10 1001 01 | lead2    | pead2    | link1    | roaw2 b  |
| 10 1001 1x | dvume b  | e#11     | dvum5 b  | itlx4    |
| 10 1101 0x | mmxw3 b  | jsrx3 b  | rmrw1    | sccb2 b  |
| 10 1101 1x | dvum6 b  | dvumb b  | mmrw2 db | dvum7 b  |

FIG. 11C

|              | 00       | 01       | 10       | 11       |
|--------------|----------|----------|----------|----------|
| 01 0011 xx   | aixw2 db | malw3 d  | rmdw2    | zzz1b    |
| 01 0111 00   | exge1 d  | bsri1    | bsrw1    | pinw2    |
| 01 0111 01   | btsr2    | chkm1    | chkr1    | chkr2    |
| 01 0111 1x   | dvum1    | adrl1    | dvur1    | sccb1    |
| 01 111x xx   | aixw4 b  | malw3    | ablw1    | aixw0    |
| 10 0011 0x   | ablw1 d  | abll3    | rmmw1    | ablw2    |
| 10 0011 10   | rrgl2    | rrgm1    | rrgw2    | rset2    |
| 10 0011 11   | rstp2    | rstp5    | rstw1    | rts3     |
| 10 0111 0x   | e#w1     | abww1    | dvs17 b  | adsw2    |
| 10 0111 10   | srrl4 b  | jsaw1    | jsaw2    | jsaw3    |
| 10 0011 11   | nbcr3 b  | peaa1    | pead1    | pinl2    |
| 10 1011 00   | dvs06    | bcsr3 db | link4    | dvs03 db |
| 10 1011 01   | dvs15    | mall1    | mall2    | mall3    |
| 10 1010 1x   | rstp3    | rall3    | ralw2    | raqw1    |
| 10 1111 0x   | rmrl1    | bclr4 b  | dvs03    | dvs1b b  |
| 10 1111 1x   | srrw3 b  | jsrx1    | ldmd4    | mmrl2    |

FIG. 11D

|  | 00 | 01 | 10 | 11 |
|---|---|---|---|---|
| 11 0000 0x | asx12 | sriw1 | srrw1 | srrw2 |
| 11 0000 10 | rmr13 | roal2 | roal3 | roal4 |
| 11 0000 11 | rom12 | rom13 | ror13 | rorm3 |
| 11 0100 00 | cmm13 | cmm15 | cmm16 | cmm17 |
| 11 0100 01 | itlx2 | itlx3 | itlx5 | itlx7 |
| 11 0100 10 | adr12 | mor12 | stmw1 | btsi1 |
| 11 0100 11 | zzz17 | zzz18 | zzz19 | zzz1a |
| 11 1000 0x | lead1 | maqw1 | bcsr2 | maww1 |
| 11 1000 1x | mmrw1 | mmxw0 | morw1 | maww2 |
| 11 1100 xx | pdcw1 | rrgw1 | asbb6 | cmmw3 |

FIG. 11E

|           | 00      | 01     | 10     | 11      |
|-----------|---------|--------|--------|---------|
| 11 0010 0x | bclm1  | jsrd3  | cmmw1  | rcaw2 b |
| 11 0010 10 | mmrw2 db | bcsr5 | bser4  | bser6   |
| 11 0010 11 | popm6 b | bsri3 | bsrw3  | btsm1   |
| 11 0110 00 | exge2  | pdcw2  | extr1  | extr2   |
| 11 0110 01 | pead3  | leax4  | peax4  | adrw2   |
| 11 0110 10 | bclm2  | mawl2  | lmaw2  | ablw3   |
| 11 0110 11 | zzz1e  | zzz1f  | zzz20  | zzz21   |
| 11 1010 0x | trac2  | stmr1  | raww1  | rmdw1   |
| 11 1010 1x | ldmr4 b | jsaw0 | o#w1   | jsrd1   |
| 11 1110 xx | o#l1 b | smaw2  | tsmw1  | rorl2 b |

FIG. 11F

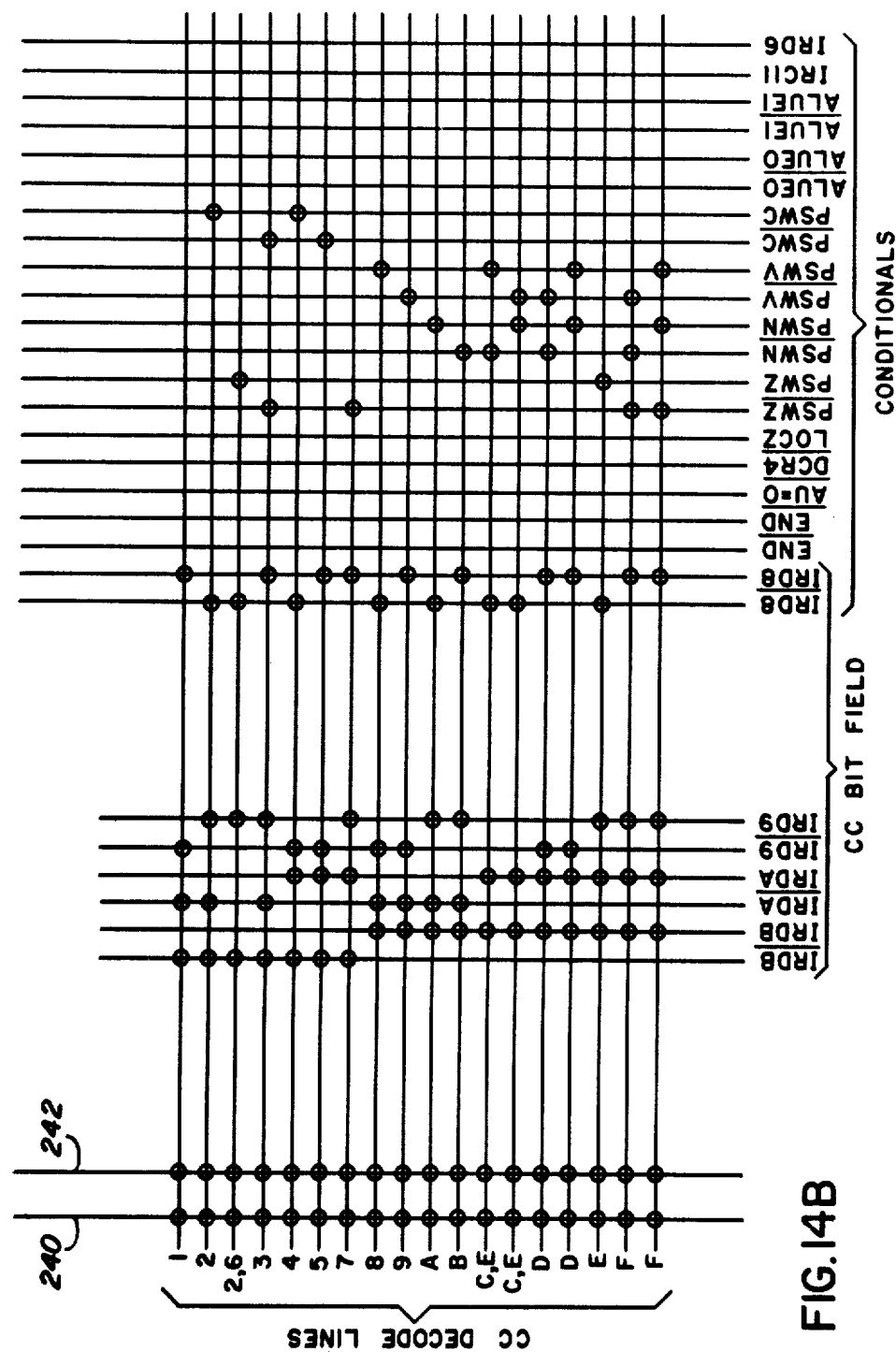

FIG. 16

ALU CONTROL TABLE

| oper | alu function | into cbit | c5' 1s 0/1 | c4' msb | c3' X' | c2' X | 1 | 0 | csl' | cand' | cxor' | cor' | csr' | sub' | abdea' |
|---|---|---|---|---|---|---|---|---|---|---|---|---|---|---|---|
| ext | a7 → r8 — r15 | 0 → C | | | | | | x | | | x | x | | | x |
| addl | a + d + 1 → r | cn' → C | | | | x | x | | | | | | | | |
| add | a + d → r | cn' → C | | | | x | | x | | | | | | | |
| addx | a + d + x → r | cn' → C | | | | x | x | x | | | | | | | |
| sub | d + a' + 1 → r | cn' → C | | | | x | x | | | | | | | x | |
| subx | d + a' + x → r | cn' → C | | | | x | x | x | | | | | | x | |
| sub0 | d + a' → r | cn' → C | | | | x | | x | | | | | | x | |
| and | a < d | 0 → C | | | | | x | | x | | | | | | |
| or | a v d → r | 0 → C | | | | | x | | | | | | x | | |
| exor | ad v a'd' | 0 → C | | | | | x | | | | x | | | | |
| lss | x■□0/1 | msb → C | x | | | | | | | | | | | | |
| lsr | ■→x → C | abd[0] → C | | | | | | | | x | | | | x | |
| lsl | x←■ → C | msb → C | | | | | | | | | | | x | x | |
| asr | ■→x → C | abd[0] → C | | | | | | | | x | | | x | x | |
| asl | x←■ → C | msb → C | | x | | | | | | | | | x | x | |
| rol | c←■←c | abd[0] → C | | | | | | | | | | | x | x | |
| ror | ■→c | msb → C | | | | | | | | x | | | | x | |
| roxl | x←■←c | abd[0] → C | | | | | | | | | | | x | x | |
| roxr | ■→x | abd[0] → C | | | | | | | | x | | | | x | |

ALU FUNCTION AND CONDITION CODE TABLE

| | 1 | 2 | 3 | 4 | 5 | INSTRUCTION(S) |
|---|---|---|---|---|---|---|
| 1 | AND KNZ$\emptyset\emptyset$ | SUB KNZ$\emptyset\bar{C}$ | SUBX | SLAA$_X$ | EXT | DIVS, DIVU |
| 2 | AND KNZ$\emptyset\emptyset$ 1 KNZKK | ADD CNZVC | ADDX CNZVC | ASR ANZ$\emptyset$A | EXT | ADD, ADDI, ADDQ, DCNT, ASR, LDQ, MOVE |
| 3 | AND KNZ$\emptyset\emptyset$ 1 KNZKK | ADDX CDDDD | ADD C*DZDC* | ASL ANZV'A | EXT | ABCD, ASL |
| 4 | AND KNZ$\emptyset\emptyset$ 1 KNZKK | AND KNZ$\emptyset\emptyset$ | AND KNZ$\emptyset\emptyset$ | LSL ANZ$\emptyset$A | EXT | AND, ANDI, CLR, LSL |
| 5 | AND KNZ$\emptyset\emptyset$ 1 KNZKK | SUB $\bar{C}$NZV$\bar{C}$ | SUBX $\bar{C}$NZV$\bar{C}$ | LSR ANZ$\emptyset$A | EXT | SUB, SUBI, NEG, SUBQ, LSR, MOVB |
| 6 | AND KNZ$\emptyset\emptyset$ | SUB KNZVC | SUBX KNZVC | | EXT | CMP, CMPM, CMPI, CHK |
| 7 | AND KNZ$\emptyset\emptyset$ | SUB KNZV$\bar{C}$ | ADD KNZV$\bar{C}$ | | EXT | MULS, MULU |
| 8 | AND KNZ$\emptyset\emptyset$ 1 KNZKK | EXT KNZ$\emptyset\emptyset$ | | ROXR KNZ$\emptyset$A | EXT | ROXR, EXT |
| 9 | AND KNZ$\emptyset\emptyset$ 1 KNZKK | SUBX $\bar{C}$NZV$\bar{C}$ | ADD1 $\bar{C}$*DZD$\bar{C}$* | RDL KNZ$\emptyset$A | EXT | ROL, SBCD, NBCD, SWAP |
| 10 | AND KNZ$\emptyset\emptyset$ 1 KNZKK | SUBX $\bar{C}$NZV$\bar{C}$ | SUBX $\bar{C}$NZV$\bar{C}$ | RDR KNZ$\emptyset$A | EXT | ROR, SUBX, NEG, X |
| 11 | AND KNZ$\emptyset\emptyset$ 1 KNZKK | SUB$\emptyset$ KNZV$\bar{C}$ | SUB$\emptyset$ KNZV$\bar{C}$ | ROXL ANZ$\emptyset$A | EXT | NOT, ROXL |
| 12 | AND | ADDX CNZVC | ADDX CNZVC | | EXT | ADDX |
| 13 | AND KKZKK | EOR KNZ$\emptyset\emptyset$ | EDR KNZ$\emptyset\emptyset$ | | EXT | EOR, EDRI, BCHG, BTST |
| 14 | AND KKZKK | OR KNZ$\emptyset\emptyset$ | OR KNZ$\emptyset\emptyset$ | EOR | EXT | OR, ORI, BCLR, BSET |
| 15 | AND KNZ$\emptyset\emptyset$ | OR | | | | TAS, TST, SCC, MOVB |

K: NO CHANGE
D: DON'T CARE
A: SPECIAL CHARACTER
ORDER: XNZVC
C*: C$_{PSW}$ V C$_{INF}$

FIG. 17

ALU FUNCTION CONTROL AND CONDITION CODE DECODER

| # | i | Instruction Decode | Instruction | Row inhibits |
|---|---|---|---|---|
| 0 |   | 15' 14 13' 12' | long shift | 1 3 4 5 6 7 8 9 10 11 13 14 15 |
| 1 |   | 15' 14 13' 12' | word shift | 2 5 |
| 2 |   | 15' 14 13' 12' | byte shift | 2 5 |
| 3 |   | 15' 14 13' 12 | | |
| 4 |   | 15' 13' 12 8 7' 6' | addx,subx | |
| 5 |   | 15' 13' 12 8 7' 6' 5' 4' | addx,subx | |
| 6 |   | 15' 13' 12 8 6 5' 4' | add,sub | |
| (4) | i | 15' 14' 13' 12' | | |
| (5) | i | 15' 14 13' 12' | | |
| 7 |   | 15' 13' 12' | | 1 2 3 4 6 7 8 9 11 12 13 14 15 |
| 8 |   | 15' 13' 12' 8 7' 6 | mul,div | 1 2 6 8 9 10 12 |
| 9 |   | 15' 13' 12' 8 7' 6 5' | abcd, sbcd | 1 3 4 7 9 |
| 10 |   | 15' 13' 12' 8 6 5' 4' | and,or | 1 3 7 9 |
| 11 |   | 15' 13' 12 | | |
| (9) | i | 15' 13' 12' | | |
| (10) | i | 15' 14' 13' 12' 8 7' 6' 5' 4' | | |
| 12 |   | 15' 14' 13 12 | ldq,dcmt,movw,movl,bcc | 1 3 4 5 6 7 8 9 10 11 12 13 14 15 |
| 13 |   | 15' 13' 12' 7 6 | scc,movb | 1 2 3 4 5 6 6 7 8 9 10 11 12 13 14 |
| 14 |   | 15' 13' 12' 7 6 | subq,movb | 1 2 3 4 5 6 7 8 9 10 11 12 13 14 15 |
| 15 |   | 15' 13' 12' 8 7 6 | | 1 3 4 5 6 7 8 9 10 11 12 13 14 |
| (14) | i | 15' 14' 13' 12' | addq,movb | 1 3 7 8 9 10 11 12 13 14 15 |
| 16 |   | 15' 14' 13' 12' 8' 7' | | |
| (14) | i | 15' 13' 12' 8' 7' | | |
| 17 |   | 15' 13' 12' 8' 7 | bclr,bset | 2 4 5 6 13 |
| 18 |   | 15' 13' 12' 11 10 9' 8' 7 | bchg,btst | 2 4 5 6 14 |
| 19 |   | 15' 13' 12' 11 10' 9' 8' | cmpi | 2 4 5 13 14 |
| 20 |   | 15' 13' 12' 11 10' 9 8' | bclr,bset,ext | 2 4 5 6 9 10 11 13 |
| 21 |   | 15' 13' 12' 11 10 9' 8' 7 | ori,tas,tst | 2 4 5 6 8 9 10 11 14 |
| 22 |   | 15' 13' 12' | | |

IMMEDIATE LINE: 0000    BTST, BCHG, BSET, BCLR, ORI, ANDI, SUBI, ADDI, EORI, CMPI

| | RYD | RYA | (RYA) | (RYA)+ | -(RYA) | (RYA)<br>+d₁₆ | (RYA)<br>+(X)<br>+d₈ | ABSW | ABSL | (PC)<br>+d₁₆ | (PC)<br>+(X)<br>+d₈ | # | UNUSED | IR[11:6] |
|---|---|---|---|---|---|---|---|---|---|---|---|---|---|---|
| A1<br>A2<br>A3 | O#W1<br>ROAW1 | TRAP1 | O#W1<br>ADRW1<br>MORW1 | O#W1<br>PINW1<br>MORW1 | O#W1<br>PDCW1<br>MORW1 | O#W1<br>ADSW1<br>MORW1 | O#W1<br>AIXW0<br>MORW1 | O#W1<br>ABWW1<br>MORW1 | O#W1<br>ABNW1<br>MORW1 | TRAP1 | TRAP1 | O#W1<br>STIW1 | TRAP1 | X01000<br>00X000 BYTE<br>ANDI,EORI,ORI |
| A1<br>A2<br>A3 | O#W1<br>ROAW1 | TRAP1 | O#W1<br>ADRW1<br>MORL1 | O#W1<br>PINW1<br>MORL1 | O#W1<br>PCDW1<br>MORL1 | O#W1<br>APSW1<br>MORL1 | O#W1<br>AIXW0<br>MORL1 | O#W1<br>ABWW1<br>MORL1 | O#W1<br>ABLW1<br>MORL1 | TRAP1 | TRAP1 | O#W1<br>STIW1 | TRAP1 | X01001<br>00X001 WORD<br>ANDI,EORI,ORI |
| A1<br>A2<br>A3 | O#L1<br>ROAL1 | TRAP1 | O#L1<br>ADRL1<br>MORL1 | O#L1<br>PINL1<br>MORL1 | O#L1<br>PDCL1<br>MORL1 | O#L1<br>ADSL1<br>MORL1 | O#L1<br>AIXL0<br>MORL1 | O#L1<br>RBWL1<br>MORL1 | O#L1<br>ABLL1<br>MORL1 | TRAP1 | TRAP1 | TRAP1 | TRAP1 | X01010<br>00X010 LONG<br>ANDI,EORI,ORI |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XX1011<br>0XX011<br>X1X011<br>1110XX |
| A1<br>A2<br>A3 | O#W1<br>ROAW1 | TRAP1 | O#W1<br>ADRW1<br>MORW1 | O#W1<br>PINW1<br>MORW1 | O#W1<br>PDCW1<br>MORW1 | O#W1<br>ADSW1<br>MORW1 | O#W1<br>AIXW0<br>MORW1 | O#W1<br>ABWW1<br>MORW1 | O#W1<br>ABLW1<br>MORW1 | TRAP1 | TRAP1 | TRAP1 | TRAP1 | 01X000 BYTE<br>ADDI,SUBI |
| A1<br>A2<br>A3 | O#W1<br>ROAW1 | TRAP1 | O#W1<br>ADRW1<br>MORW1 | O#W1<br>PINW1<br>MORW1 | O#W1<br>PDCW1<br>MORW1 | O#W1<br>ADSW1<br>MORW1 | O#W1<br>AIXW0<br>MORW1 | O#W1<br>ABWW1<br>MORW1 | O#W1<br>ABLW1<br>MORW1 | TRAP1 | TRAP1 | TRAP1 | TRAP1 | 01X001 WORD<br>ADDI,SUBI |
| A1<br>A2<br>A3 | O#W1<br>ROAL1 | TRAP1 | O#L1<br>ADRL1<br>MORL1 | O#L1<br>PINL1<br>MORL1 | O#L1<br>PDCL1<br>MORL1 | O#L1<br>ADSL1<br>MORL1 | O#L1<br>AIXL0<br>MORL1 | O#L1<br>ABWL1<br>MORL1 | O#L1<br>ABLL1<br>MORL1 | TRAP1 | TRAP1 | TRAP1 | TRAP1 | 01X010 LONG<br>ADDI,SUBI |
| A1<br>A2<br>A3 | | | | | | | | | | | | | | |

IR[5:0]   000XXX 001XXX 010XXX 011XXX 100XXX 101XXX 110XXX 111000 111001 111010 111011 111100 111101<br>
                                                                                                                                                                                                11111X

IMMEDIATE LINE 0000   ANDI, EORI, ORI, ADDI, SUBI

IMMEDIATE LINE: 0000   BTST, BCHG, BSET, BCLR, ORI, ANDI, SUBI, ADDI, EORI, CMPI

| | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED | IR[11:6] |
|---|---|---|---|---|---|---|---|---|---|---|---|---|---|---|
| A1<br>A2<br>A3 | BTSR1 | MPIW1 | ADRW1<br><br>BTSM1 | PINWL<br><br>BTSM1 | PDCW1<br><br>BTSM1 | ADSW1<br><br>BTSM1 | AIXW1<br><br>BTSM1 | ABWW1<br><br>BTSM1 | ABLW1<br><br>BTSM1 | ADSW1<br><br>BTSM1 | AIXW1<br><br>BTSM1 | E#W1<br>BTS11 | TRAP1 | XXX100<br>DYNAMIC BTST |
| A1<br>A2<br>A3 | BCSR1 | MPIL1 | ADRW1<br><br>BCSM1 | PINWL<br><br>BCSM1 | PDCW1<br><br>BCSM1 | ADSW1<br><br>BCSM1 | AIXW1<br><br>BCSM1 | ABWW1<br><br>BCSM1 | ABLW1<br><br>BCSM1 | | | TRAP1 | TRAP1 | XXX101<br>DYNAMIC BCHG |
| A1<br>A2<br>A3 | BCSR1 | MPOL1 | ADRW1<br><br>BCSM1 | PINW1<br><br>BCSM1 | PDCW1<br><br>BCSM1 | ADSW1<br><br>BCSM1 | AIXW1<br><br>BCSM1 | ABWW1<br><br>BCSM1 | ABLW1<br><br>BCSM1 | TRAP1 | TRAP1 | TRAP1 | TRAP1 | XXX111<br>DYNAMIC BSET |
| A1<br>A2<br>A3 | BCLR1 | MPOW1 | ADRW1<br><br>BCLM1 | PINW1<br><br>BCLM1 | PDCW1<br><br>BCLM1 | ADSW1<br><br>BCLM1 | AIXW1<br><br>BCLM1 | ABWW1<br><br>BCLM1 | HBLW1<br><br>BCLM1 | TRAP1 | TRAP1 | TRAP1 | TRAP1 | XXX110<br>DYNAMIC BCLR |
| A1<br>A2<br>A3 | 0#W1<br>BTSR1 | TRAP1 | 0#W1<br>ADRW1<br>BTSM1 | 0#W1<br>PINW1<br>BTSM1 | 0#W1<br>PDCW1<br>BTSM1 | 0#W1<br>ADSW1<br>BTSM1 | 0#W1<br>AIXW1<br>BTSM1 | 0#W1<br>ABWW1<br>BTSM1 | 0#W1<br>ABLW1<br>BTSM1 | 0#W1<br>ADSW1<br>BTSM1 | 0#W1<br>AIXW0<br>BTSM1 | TRAP1 | TRAP1 | 100000<br>STATIC BTST |
| A1<br>A2<br>A3 | 0#W1<br>BCSR1 | TRAP1 | 0#W1<br>ADRW1<br>BCSM1 | 0#W1<br>PINW1<br>BCSM1 | 0#W1<br>PDCW1<br>BCSM1 | 0#W1<br>ADSW1<br>BCSM1 | 0#W1<br>AIXW1<br>BCSM1 | 0#W1<br>ABWW1<br>BCSM1 | 0#W1<br>ABLW1<br>BCSM1 | TRAP1 | TRAP1 | TRAP1 | TRAP1 | 100001<br>STATIC BCHG |
| A1<br>A2<br>A3 | 0#W1<br>BCSR1 | TRAP1 | 0#W1<br>ADRW1<br>BCSM1 | 0#W1<br>PINW1<br>BCSM1 | 0#W1<br>PDCW1<br>BCSM1 | 0#W1<br>ADSW1<br>BCSM1 | 0#W1<br>AIXW1<br>BCSM1 | 0#W1<br>ABWW1<br>BCSM1 | 0#W1<br>ABLW1<br>BCSM1 | TRAP1 | TRAP1 | TRAP1 | TRAP1 | 100011<br>STATIC BSET |
| A1<br>A2<br>A3 | 0#W1<br>BCLR1 | TRAP1 | 0#W1<br>ADRW1<br>BCLM1 | 0#W1<br>PINW1<br>BCLM1 | 0#W1<br>PDCW1<br>BCLM1 | 0#W1<br>ADSW1<br>BCLM1 | 0#W1<br>AIXW1<br>BCLM1 | 0#W1<br>ABWW1<br>BCLM1 | 0#W1<br>ABLW1<br>BCLM1 | TRAP1 | TRAP1 | TRAP1 | TRAP1 | 100010<br>STATIC BCLR |

IR[5:0]  000XXX 001XXX 010XXX 011XXX 100XXX 101XXX 110XXX 111000 111001 111010 111011 111100 111101 11111X

IMMEDIATE LINE 0000   BTST, BCHG, BSET, BCLR

| | RYD | RYA | (RYA) | (RYA)+ | -(RYA) | (RYA)<br>+d₁₆ | (RYA)<br>+(X)<br>+d₈ | ABSW | ABSL | (PC)<br>+d₁₆ | (PC)<br>+(X)<br>+d₈ | # | UNUSED | IR[11:6] |
|---|---|---|---|---|---|---|---|---|---|---|---|---|---|---|
| A1<br>A2<br>A3 | O#W1<br>RCAW1 | TRAP1 | O#W1<br>ADRW1<br>CPDW1 | O#W1<br>PINW1<br>CPDW1 | O#W1<br>PDCW1<br>CPDW1 | O#W1<br>ADSW1<br>CPDW1 | O#W1<br>A12W0<br>CPDW1 | O#W1<br>ABLW1<br>CPDW1 | O#W1<br>ABLW1<br>CPDW1 | TRAP1 | TRAP1 | TRAP1 | TRAP1 | 110000 BYTE<br>CMPI |
| A1<br>A2<br>A3 | O#W1<br>RCAL1 | TRAP1 | O#W1<br>ADRW1<br>CPDW1 | O#W1<br>PINW1<br>CPDW1 | O#W1<br>PDCW1<br>CPDW1 | O#W1<br>ADSW1<br>CPDW1 | O#W1<br>AIXW0<br>CPDW1 | O#W1<br>ABLW1<br>CPDW1 | O#W1<br>ABLW1<br>CPDW1 | TRAP1 | TRAP1 | TRAP1 | TRAP1 | 110001 WORD<br>CMPI |
| A1<br>A2<br>A3 | O#L1<br>RCAL1 | TRAP1 | O#L1<br>ADRL1<br>CPDL1 | O#L1<br>PINL1<br>CPDL1 | O#L1<br>PDCL1<br>CPDL1 | O#L1<br>ADSL1<br>CPDL1 | O#L1<br>AIXL0<br>CPDL1 | O#L1<br>ABWL1<br>CPDL1 | O#L1<br>ABLL1<br>CPDL1 | TRAP1 | TRAP1 | TRAP1 | TRAP1 | 110010 LONG<br>CMPI |
| A1<br>A2<br>A3 | | | | | | | | | | | | | | |
| A1<br>A2<br>A3 | | | | | | | | | | | | | | |
| A1<br>A2<br>A3 | | | | | | | | | | | | | | |
| A1<br>A2<br>A3 | | | | | | | | | | | | | | |
| A1<br>A2<br>A3 | | | | | | | | | | | | | | |

IMMEDIATE LINE: 0000   BTST, BCHG, BSET, BCLR, ORI, ANDI, SUBI, ADDI, EORI, CMPI

IR[5:0]: 000XXX 001XXX 010XXX 011XXX 100XXX 101XXX 110XXX 111000 111001 111010 111011 111100 111101 1111X

IMMEDIATE LINE 0000 CMPI

MOVE BYTE

| | | | | | SOURCE | | | | | | | | DESTINATION IR[11:6] |
|---|---|---|---|---|---|---|---|---|---|---|---|---|---|
| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED |
| A1<br>A2<br>A3 | RRGW1 | TRAP1 | ADRW1<br>MRGW1 | PINW1<br>MRGW1 | PDCW1<br>MRGW1 | ADSW1<br>MRGW1 | AIXW0<br>MRGW1 | ABWW1<br>MRGW1 | ABLW1<br>MRGW1 | ADSW1<br>MRGW1 | AIXW1<br>MRGW1 | E#W1<br>RRGW1 | TRAP1 | RXD<br>XXX000 |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | RXA<br>XXX001 |
| A1<br>A2<br>A3 | RMRW1 | TRAP1 | ADRW1<br>MMRW1 | PNWL<br>MMRW1 | PDCW1<br>MMRW1 | ADSW1<br>MMRW1 | AIXW1<br>MMRW1 | ABWW1<br>MMRW1 | ABLW1<br>MMRW1 | ADSW1<br>MMRW1 | AIXW1<br>MMRW1 | E#W1<br>RMRW1 | TRAP1 | (RYA)<br>XXX010 |
| A1<br>A2<br>A3 | RMIW1 | TRAP1 | ADRW1<br>MMIW1 | PINW1<br>MMIW1 | PDCW1<br>MMIW1 | ADSW1<br>MMIW1 | AIXW1<br>MMIW1 | ABWW1<br>MMIW1 | ABLW1<br>MMIW1 | ADSW1<br>MMIW1 | IXW01<br>MMIW1 | E#W1<br>RMIW1 | TRAP1 | (RYA)+<br>XXX100 |
| A1<br>A2<br>A3 | RMMW1 | TRAP1 | ADRW1<br>MMMW1 | PINW1<br>MMMW1 | PDCW1<br>MMMW1 | ADSW1<br>MMMW1 | AIXW1<br>MMMW1 | ABWW1<br>MMMW1 | ABLW1<br>MMMW1 | ADSW1<br>MMMW1 | AIXW0<br>MMMW1 | E#W1<br>RMMW1 | TRAP1 | -(RYA)<br>XXX100 |
| A1<br>A2<br>A3 | RMDW1 | TRAP1 | ADRW1<br>MMDW1 | PINW1<br>MMDW1 | PDCW1<br>MMDW1 | ADSW1<br>MMDW1 | AIXW1<br>MMDW1 | ABWW1<br>MMDW1 | ABLW1<br>MMDW1 | ADSW1<br>MMDW1 | AIXW1<br>MMDW1 | E#W1<br>RMDW1 | TRAP1 | (RXA)+d16<br>XXX101 |
| A1<br>A2<br>A3 | RMXW0 | TRAP1 | ADRW1<br>MMXW0 | PINW1<br>MMXW0 | PDCW1<br>MMXW0 | APSW1<br>MMXW0 | AIXW1<br>MMXW0 | ABWW1<br>MMXW0 | ABLW1<br>MMXW0 | ADSW1<br>MMXW0 | AIXW1<br>MMXW0 | E#W1<br>RMXW0 | TRAP1 | (RXA)+(X)+d8<br>XXX110 |
| A1<br>A2<br>A3 | RAWW1 | TRAP1 | ADRW1<br>MAWW1 | PINW1<br>MAWW1 | PDCW1<br>MAWW1 | ADSW1<br>MAWW1 | AIXW1<br>MAWW1 | ABWW1<br>MAWW1 | ABLW1<br>MAWW1 | ADSW1<br>MAWW1 | AIXW1<br>MAWW1 | E#W1<br>RAWW1 | TRAP1 | ABSW<br>000111 |
| A1<br>A2<br>A3 | RALW1 | TRAP1 | ADRW1<br>MALW1 | PINW1<br>MALW1 | PDCW1<br>MALW1 | ADSW1<br>MALW1 | AIXW1<br>MALW1 | ABWW1<br>MALW1 | ABLW1<br>MALW1 | ADSW1<br>MALW1 | AIXW0<br>MALW1 | E#W1<br>RALW1 | TRAP1 | ABSL<br>001111 |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | UNUSED<br>X1X111<br>1XX111 |

IR[5:0]  000XXX  001XXX  010XXX  011XXX  100XXX  101XXX  110XXX  111000  111001  111010  111011  111100  111101<br>111111X

MOVE BYTE 0001

FIG. 21D

MOVE DOUBLE

| | | | | | SOURCE | | | | | | | | DESTINATION |
|---|---|---|---|---|---|---|---|---|---|---|---|---|---|
| | RYA | (RYA) | (RYA)+ | -(RYA) | (RYA)+d16 | (RYA)+(X)+d8 | ABSW | ABSL | (PC)+d16 | (PC)+(X)+d8 | # | UNUSED | IR[11:6] |
| A1 A2 A3 | RRGL1 | ADRL1 / MRGL1 | PINL1 / MRGL1 | PDCL1 / MRGL1 | ADSL1 / MRGL1 | AIXL0 / MRGL1 | ABWL1 / MRGL1 | ABLL1 / MRGL1 | ADSL1 / MRGL1 | AIXL0 / MRGL1 | E#L1 / RRGL1 | TRAP1 | RXD XXX000 |
| A1 A2 A3 | RRGL1 | ADRL1 / MRGL1 | PINL1 / MRGL1 | PDCL1 / MRGL1 | ADSL1 / MRGL1 | AIXL0 / MRGL1 | ABWL1 / MRGL1 | ABLL1 / MRGL1 | ADSL1 / MRGL1 | AIXL0 / MRGL1 | E#L1 / RRGL1 | TRAP1 | RXA XXX001 |
| A1 A2 A3 | RMRL1 | ADRL1 / MMRL1 | PINL1 / MMRL1 | PDCL1 / MMRL1 | ADSL1 / MMRL1 | AIXL0 / MMRL1 | ABWL1 / MMRL1 | ABLL1 / MMRL1 | ADSL1 / MMRL1 | AIXL0 / MMRL1 | E#L1 / RMRL1 | TRAP1 | (RXA) XXX010 |
| A1 A2 A3 | RMIL1 | ADRL1 / MMIL1 | PINL1 / MMIL1 | PDCL1 / MMIL1 | ADSL1 / MMIL1 | AIXL0 / MMIL1 | ABWL1 / MMIL1 | ABLL1 / MMIL1 | ADSL1 / MMIL1 | AIXL0 / MMIL1 | E#L1 / RMIL1 | TRAP1 | (RXA)+ XXX011 |
| A1 A2 A3 | RMML1 | ADRL1 / MMML1 | PINL1 / MMML1 | PDCL1 / MMML1 | ADSL1 / MMML1 | AIXL0 / MMML1 | ABWL1 / MMML1 | ABLL1 / MMML1 | ADSL1 / MMML1 | AIXL0 / MMML1 | E#L1 / RMML1 | TRAP1 | -(RXA) XXX100 |
| A1 A2 A3 | RMDL1 | ADRL1 / MMDL1 | PINL1 / MMDL1 | PDCL1 / MMDL1 | ADSL1 / MMDL1 | AIXL0 / MMDL1 | ABWL1 / MMDL1 | ABLL1 / MMDL1 | ADSL1 / MMDL1 | AIXL0 / MMDL1 | E#L1 / RMDL1 | TRAP1 | (RXA)+d16 XXX101 |
| A1 A2 A3 | RMXL0 | MMXL0 | MMXL0 | MMXL0 | MMXL0 | MMXL0 | MMXL0 | MMXL0 | MMXL0 | MMXL0 | E#L1 / RMXL0 | TRAP1 | (RXA)+(X)+d8 XXX110 |
| A1 A2 A3 | RAWL1 | ADRL1 / MAWL1 | PINL1 / MAWL1 | PDCL1 / MAWL1 | APSL1 / MAWL1 | AIXL0 / MAWL1 | ABWL1 / MAWL1 | ABLL1 / MAWL1 | ADSL1 / MAWL1 | AIXL0 / MAWL1 | E#L1 / RAWL1 | TRAP1 | ABSW 001111 |
| A1 A2 A3 | RALL1 | ADRL1 / MALL1 | PINL1 / MALL1 | PDCL1 / MALL1 | ADSL1 / MALL1 | AIXL0 / MALL1 | ABWL1 / MALL1 | ABLL1 / MALL1 | ADSL1 / MALL1 | AIXL0 / MALL1 | E#L1 / RALL1 | TRAP1 | ABSL 001111 |
| A1 A2 A3 | TRAP1 | TRAP1 | TRAP1 | TRAP1 | TRAP1 | TRAP1 | TRAP1 | TRAP1 | TRAP1 | TRAP1 | TRAP1 | TRAP1 | UNUSED X1X111 1XX111 |
| | 000XXX | 001XXX | 010XXX | 011XXX | 100XXX | 101XXX | 110XXX | 111000 | 111001 | 111010 | 111011 | 111100 | 111101 111111X |

MOVE DOUBLE 0010

MISCELLANEOUS LINE 0100

| IR[5:0] | RYD | RYA | (RYA) | (RYA)+ | -(RYA) | (RYA)+d_{16} | (RYA)+(X)+d_8 | ABSW | ABSL | (PC)+d_{16} | (PC)+(X)+d_8 | # | UNUSED IR[11:6] |
|---|---|---|---|---|---|---|---|---|---|---|---|---|---|
| A1 | NNRW1 | TRAP1 | ADRW1 | PINW1 | PDCW1 | ADSW1 | AIXW0 | ABWW1 | ABLW1 | TRAP1 | TRAP1 | TRAP1 | TRAP1 | 0XX000 BYTE CLR NEG NEGX NOT |
| A2 |  |  |  |  |  |  |  |  |  |  |  |  |  |
| A3 |  |  | NNMW1 | NNMW1 | NNMW1 | NNMW1 | NNMW1 | NNMW1 | NNMW1 |  |  |  |  |
| A1 | NNRW1 | TRAP1 | ADRW1 | PINW1 | PDCW1 | ADSW1 | AIXW0 | ABWW1 | ABLW1 | TRAP1 | TRAP1 | TRAP1 | TRAP1 | 0XX001 WORD CLR NEG NEGX NOT |
| A2 |  |  |  |  |  |  |  |  |  |  |  |  |  |
| A3 |  |  | NNMW1 | NNMW1 | NNMW1 | NNMW1 | NNMW1 | NNMW1 | NNMW1 |  |  |  |  |
| A1 | NNRL1 | TRAP1 | ADRL1 | PINL1 | PDCL1 | ADSL1 | AIXL0 | ABWL1 | ABLL1 | TRAP1 | TRAP1 | TRAP1 | TRAP1 | 0XX010 LONG CLR NEG NEGX NOT |
| A2 |  |  |  |  |  |  |  |  |  |  |  |  |  |
| A3 |  |  | NNML1 | NNML1 | NNML1 | NNML1 | NNML1 | NNML1 | NNML1 |  |  |  |  |
| A1 | STRW1 | TRAP1 | ADRW1 | PINW1 | PDCW1 | ADSW1 | AIXW0 | ABWW1 | ABLW1 | TRAP1 | TRAP1 | TRAP1 | TRAP1 | 000011 MFST |
| A2 |  |  |  |  |  |  |  |  |  |  |  |  |  |
| A3 |  |  | STMW1 | STMW1 | STMW1 | STMW1 | STMW1 | STMW1 | STMW1 |  |  |  |  |
| A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | 001011 11X000 11000X |
| A2 |  |  |  |  |  |  |  |  |  |  |  |  |  |
| A3 |  |  |  |  |  |  |  |  |  |  |  |  |  |
| A1 | RSTW1 | TRAP1 | ADRW1 | PINW1 | PDCW1 | ADSW1 | AIXW0 | ABWW1 | ABLW1 | ADSW1 | AIXW0 | E#W1 RSTW1 | TRAP1 | 010011 MTCC |
| A2 |  |  |  |  |  |  |  |  |  |  |  |  |  |
| A3 |  |  | MSTW1 | MSTW1 | MSTW1 | MSTW1 | MSTW1 | MSTW1 | MSTW1 | MSTW1 | MSTW1 |  |  |
| A1 | RSTW1 | TRAP1 | ADRW1 | PINW1 | PDCW1 | ADSW1 | AIXW0 | ABWW1 | ABLW1 | ADSW1 | AIXW0 | E#W1 RSTW1 | TRAP1 | 011011 MTST |
| A2 |  |  |  |  |  |  |  |  |  |  |  |  |  |
| A3 |  |  | MSTW1 | MSTW1 | MSTW1 | MSTW1 | MSTW1 | MSTW1 | MSTW1 | MSTW1 | MSTW1 |  |  |
| A1 | NBCR1 | TRAP1 | ADRW1 | PINW1 | PDCW1 | APSW1 | AIXW0 | ABWW1 | ABLW1 | TRAP1 | TRAP1 | TRAP1 | TRAP1 | 100 000 BYTE NBCD |
| A2 |  |  |  |  |  |  |  |  |  |  |  |  |  |
| A3 |  |  | NBCM1 | NBCM1 | NBCM1 | NBCM1 | NBCM1 | NBCM1 | NBCM1 |  |  |  |  |

000XXX 001XXX 010XXX 011XXX 100XXX 101XXX 110XXX 111000 111001 111010 111011 111100 111101 1111X

MISCELLANEOUS LINE 0100  CLR NEG NEGX NOT MFST MTCC MTST NBCD

FIG. 21H

MISCELLANEOUS LINE 0100

| | RYD | RYA | (RYA) | (RYA)+ | -(RYA) | (RYA)+d16 | (RYA)+(X)+d8 | ABSW | ABSL | (PC)+d16 | (PC)+(X)+d8 | # | UNUSED IR[11:6] |
|---|---|---|---|---|---|---|---|---|---|---|---|---|---|
| A1 | SWAP1 | TRAP1 | PEAA1 | TRAP1 | TRAP1 | PEAD1 | PEAX0 | PAAW1 | PAAL1 | PEAD1 | PEAX0 | TRAP1 | TRAP1 | 100 001 SWAP PEA |
| A1 | NNRW1 | TRAP1 | STMR1 | TRAP1 | PUSH1 | STMD1 | STMX1 | SMAW1 | SMAL1 | TRAP1 | TRAP1 | TRAP1 | TRAP1 | 100 010 EXTW STM16 |
| A1 | EXTR1 | TRAP1 | STMR1 | TRAP1 | PUSH1 | STMD1 | STMX1 | SMAW1 | SMAL1 | TRAP1 | TRAP1 | TRAP1 | TRAP1 | 100 011 EXTL STM32 |
| A1 A2 A3 | TSRW1 | TRAP1 | ADRW1 / TSMW1 | PINW1 / TSMW1 | PDCW1 / TSMW1 | ADSW1 / TSMW1 | AIXW0 / TSMW1 | ABWW1 / TSMW1 | ABLW1 / TSMW1 | TRAP1 | TRAP1 | TRAP1 | TRAP1 | 101 000 BYTE TST |
| A1 A2 A3 | TSRW1 | TRAP1 | ADRW1 / TSML1 | PINW1 / TSML1 | PDCW1 / TSML1 | ADSW1 / TSML1 | AIXW0 / TSML1 | ABWW1 / TSML1 | ABLW1 / TSML1 | TRAP1 | TRAP1 | TRAP1 | TRAP1 | 101 001 WORD TST |
| A1 A2 A3 | TSRL1 | TRAP1 | ADRL1 / TSML1 | PINL1 / TSML1 | PDCL1 / TSML1 | ADSL1 / TSML1 | AIXL0 / TSML1 | ABWL1 / TSML1 | ABLL1 / TSML1 | TRAP1 | TRAP1 | TRAP1 | TRAP1 | 101 010 LONG TST |
| A1 A2 A3 | TASR1 | TRAP1 | ADRW1 / TASM1 | PINW1 / TASM1 | PDCW1 / TASM1 | ADSW1 / TASM1 | AIXW0 / TASM1 | ABWW1 / TASM1 | ABLW1 / TASM1 | TRAP1 | TRAP1 | TRAP1 | TRAP1 | 101 011 TAS |
| A1 A2 A3 | TRAP1 | TRAP1 | LDMP1 | POPM1 | TRAP1 | LDMD1 | LDMX0 | LMAW1 | LMAL1 | LDMD1 | LDMX0 | TRAP1 | TRAP1 | 110 01X LDM16 LDM32 |

IR[5:0]   000XXX 001XXX 010XXX 011XXX 100XXX 101XXX 110XXX 111000 111001 111010 111011 111100 111101 11111X

MISCELLANEOUS LINE 0100   SWAP, PEA, EXT, STM, TST, TAS, LDM

FIG. 21I

MISCELLANEOUS LINE 0100

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:6] |
|---|---|---|---|---|---|---|---|---|---|---|---|---|---|---|
| A1 A2 A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XXX 100 |
| A1 A2 A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XXX 101 |
| A1 A2 A3 | CHKR1 | ADRW1 CHKM1 | PINW1 CHKM1 | PDCW1 CHKM1 | ADSW1 CHKM1 | ADSW1 CHKM1 | AIXW1 CHKM1 | ABWW1 CHKM1 | ABLW1 CHKM1 | ADSW1 CHKM1 | AIXW1 CHKM1 | E#W1 CHKR1 | TRAP1 | XXX 110 CHK |
| A1 A2 A3 | TRAP1 | LEAA1 | TRAP1 | TRAP1 | TRAP1 | LEAD1 | LEAX0 | LAAW1 | LAAL1 | LEAD1 | LEAX0 | TRAP1 | TRAP1 | XXX 111 LEA |
| A1 A2 A3 | TRAP1 | JSRA1 | TRAP1 | TRAP1 | TRAP1 | JSRD1 | JSRX0 | JSAW0 | JSAL1 | JSRD1 | JSRX0 | TRAP1 | TRAP1 | 111 010 JSR |
| A1 A2 A3 | TRAP1 | JMPA1 | TRAP1 | TRAP1 | TRAP1 | JMPD1 | JMPX0 | JMAW1 | JMAL1 | JMPD1 | JMPX0 | TRAP1 | TRAP1 | 111 011 JMP |
| A1 A2 A3 | TRAP1 (TRAP) 00XXXX | LINK1 | UNLK1 | LUSP1 | SUSP1 | TRPV1 | RSET1 | B (NOP) | STOP1 | RTE | RTR | RTS | | 111 001 RTS TRAP LINK UNLK MUSP TRPV RESET NOP STOP RTE RTR |
| A1 A2 A3 | | 111XXX 110100 | | | | | | 110110 | 110000 | 110001 | 110010 | 110011 | 110111 | 110101 | |
| A1 A2 A3 | | | | | | | | | | | | | | |

IR[5:0] 000XXX 001XXX 010XXX 011XXX 100XXX 101XXX 110XXX 111XXX 111000 111001 111010 111011 111100 111101 11111X

MISCELLANEOUS LINE 0100 LINK, UNLK, CHK, LEA, JSR, JMP, RTS, TRAP, MUSP, TRPV, RESET, NOP, STOP, RTE, RTR

FIG. 21J

ADDQ LINE 0101 ADDQ, Scc, SUBQ

IR[11:9]=XXX
IR[8:6]
BYTE 000 (RXD)+(EA)→RXD
WORD 001 (RXD)+(EA)→RXD
LONG 010 (RXD)+(EA)→RXD
BYTE 011 OP(EA)→EA
BYTE 100 (EA)+(RXD)→EA
WORD 101 (EA)+(RXD)→EA
LONG 110 (EA)+(RXD)→EA
BYTE 111 OP(EA)→EA

| | | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED |
|---|---|---|---|---|---|---|---|---|---|---|---|---|---|---|
| A1 | | RAQW1 | TRAP1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | | |
| A3 | | | | MAQW1 | MAQW1 | MAQW1 | MAQW1 | MAQW1 | MAQW1 | MAQW1 | | | | |
| A1 | | RAQW1 | RAQL1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | | |
| A3 | | | | MAQW1 | MAQW1 | MAQW1 | MAQW1 | MAQW1 | MAQW1 | MAQW1 | | | | |
| A1 | | RAQL1 | RAQL1 | ADRL1 | PINL1 | PDCL1 | ADSL1 | AIXL0 | ABWL1 | ABLL1 | TRAP1 | TRAP1 | TRAP1 | TRAP1 |
| A2 | | | | | | | | | | | | | | |
| A3 | | | | MAQL1 | MAQL1 | MAQL1 | MAQL1 | MAQL1 | MAQL1 | MAQL1 | | | | |
| A1 | | SCCR1 | TRAP1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | | |
| A3 | | | | SCCB1 | SCCB1 | SCCB1 | SCCB1 | SCCB1 | SCCB1 | SCCB1 | | | | |
| A1 | | RAQW1 | TRAP1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | | |
| A3 | | | | MAQW1 | MAQW1 | MAQW1 | MAQW1 | MAQW1 | MAQW1 | MAQW1 | | | | |
| A1 | | RAQW1 | RAQL1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | | |
| A3 | | | | MAQW1 | MAQW1 | MAQW1 | MAQW1 | MAQW1 | MAQW1 | MAQW1 | | | | |
| A1 | | RAQL1 | RAQL1 | ADRL1 | ANL1 | PDCL1 | ADSL1 | AIXL0 | ABWL1 | ABLL1 | TRAP1 | TRAP1 | TRAP1 | TRAP1 |
| A2 | | | | | | | | | | | | | | |
| A3 | | | | MAQL1 | MAQL1 | MAQL1 | MAQL1 | MAQL1 | MAQL1 | MAQL1 | | | | |
| A1 | | SCCR1 | TRAP1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | | |
| A3 | | | | SCCB1 | SCCB1 | SCCB1 | SCCB1 | SCCB1 | SCCB1 | SCCB1 | | | | |

IR[5:0]   000XXX 001XXX 010XXX 011XXX 100XXX 101XXX 110XXX 111000 111001 111010 111011 111100 111101 1111X

ADDQ LINE 0101 ADDQ, Scc, SUBQ

FIG. 21K

Bcc LINE 0110 Bcc, BRA, BSR

| IR[5:0] | | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:6] |
|---|---|---|---|---|---|---|---|---|---|---|---|---|---|---|---|
| 000000 | A1 | BBCW1 | BBCI1 | BBCI1 | BBCI1 | BBCI1 | BBCI1 | BBCI1 | BBCI1 | BBCI1 | BBCI1 | BBCI1 | BBCI1 | BBCI1 | XXXX000 |
| 001XXX | A2 | | | | | | | | | | | | | | 1XXXX00 |
| | A3 | | | | | | | | | | | | | | X1XXX00 |
| | | | | | | | | | | | | | | | XX1X00 |
| 010XXX | A1 | BBCI1 | BBCI1 | BBCI1 | BBCI1 | BBCI1 | BBCI1 | BBCI1 | BBCI1 | BBCI1 | BBCI1 | BBCI1 | BBCI1 | BBCI1 | XXX01X |
| | A2 | | | | | | | | | | | | | | XXX0X1 |
| | A3 | | | | | | | | | | | | | | |
| 011XXX | A1 | BSRW1 | BSRI1 | BSRI1 | BSRI1 | BSRI1 | BSRI1 | BSRI1 | BSRI1 | BSRI1 | BSRI1 | BSRI1 | BSRI1 | BSRI1 | 000100 |
| | A2 | | | | | | | | | | | | | | |
| | A3 | | | | | | | | | | | | | | |
| 100XXX | A1 | BSRI1 | BSRI1 | BSRI1 | BSRI1 | BSRI1 | BSRI1 | BSRI1 | BSRI1 | BSRI1 | BSRI1 | BSRI1 | BSRI1 | BSRI1 | 00011X |
| 0001XX | A2 | | | | | | | | | | | | | | 0001X1 |
| 000X1X | A3 | | | | | | | | | | | | | | |
| 111XX1 | | | | | | | | | | | | | | | |
| 101XXX | A1 | | | | | | | | | | | | | | |
| | A2 | | | | | | | | | | | | | | |
| | A3 | | | | | | | | | | | | | | |
| 110XXX | A1 | | | | | | | | | | | | | | |
| | A2 | | | | | | | | | | | | | | |
| | A3 | | | | | | | | | | | | | | |
| 111000 | A1 | | | | | | | | | | | | | | |
| 111001 | A2 | | | | | | | | | | | | | | |
| 111010 | A3 | | | | | | | | | | | | | | |
| 111011 | A1 | | | | | | | | | | | | | | |
| 111100 | A2 | | | | | | | | | | | | | | |
| 111101 | A3 | | | | | | | | | | | | | | |
| 11111X | | | | | | | | | | | | | | | |

Bcc LINE 0110 Bcc, BRA, BSR

FIG. 21L

LDQ LINE 0111 LDQ & DCNT

| IR[5:0] | RYD | RYA | (RYA) | (RYA)+ | -(RYA) | (RYA)+$d_{16}$ | (RYA)+(X)+$d_8$ | ABSW | ABSL | (PC)+$d_{16}$ | (PC)+(X)+$d_8$ | # | UNUSED IR[11:6] XXX0XX | XXX1XX |
|---|---|---|---|---|---|---|---|---|---|---|---|---|---|---|
| 000XXX A1 | RLQL1 | RLQL1 | RLQL1 | RLQL1 | RLQL1 | RLQL1 | RLQL1 | RLQL1 | RLQL1 | RLQL1 | RLQL1 | RLQL1 | RLQL1 | |
| A2 | DCNT1 | DCNT1 | DCNT1 | DCNT1 | DCNT1 | DCNT1 | DCNT1 | DCNT1 | DCNT1 | DCNT1 | DCNT1 | DCNT1 | DCNT1 | |
| A3 | | | | | | | | | | | | | | |
| 001XXX A1 A2 A3 | | | | | | | | | | | | | | |
| 010XXX A1 A2 A3 | | | | | | | | | | | | | | |
| 011XXX A1 A2 A3 | | | | | | | | | | | | | | |
| 100XXX A1 A2 A3 | | | | | | | | | | | | | | |
| 101XXX A1 A2 A3 | | | | | | | | | | | | | | |
| 110XXX A1 A2 A3 | | | | | | | | | | | | | | |
| 111000 A1 A2 A3 | | | | | | | | | | | | | | |
| 111001 | | | | | | | | | | | | | | |
| 111010 | | | | | | | | | | | | | | |
| 111011 | | | | | | | | | | | | | | |
| 111100 | | | | | | | | | | | | | | |
| 111101 | | | | | | | | | | | | | | |
| 11111X | | | | | | | | | | | | | | |

LDQ LINE 0111 LDQ & DCNT

OR LINE 1000 OR, DIVU, DIVS, SBCD

| | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED | IR[11:9]=XXX IR[8:6] |
|---|---|---|---|---|---|---|---|---|---|---|---|---|---|---|
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 | BYTE 000 (RXD)+(EA)→RXD |
| A2 | | | | | | | | | | | | | | |
| A3 | | | ROMW1 | ROMW1 | ROMW1 | ROMW1 | ROMW1 | ROMW1 | ROMW1 | ROMW1 | ROMW1 | | | |
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 | WORD 001 (RXD)+(EA)→RXD |
| A2 | | | | | | | | | | | | | | |
| A3 | | | ROMW1 | ROMW1 | ROMW1 | ROMW1 | ROMW1 | ROMW1 | ROMW1 | ROMW1 | ROMW1 | | | |
| A1 | RORL1 | TRAP1 | ADRL1 | PINL1 | PDCL1 | ADSL1 | AIXL0 | ABWL1 | ABLL1 | ADSL1 | AIXL0 | E#L1 RORL1 | TRAP1 | LONG 010 (RXD)+(EA)→RXD |
| A2 | | | | | | | | | | | | | | |
| A3 | | | ROML1 | ROML1 | ROML1 | ROML1 | ROML1 | ROML1 | ROML1 | ROML1 | ROML1 | | | |
| A1 | DVUR1 | TRAP1 | ADRW1 | PINW1 | PDCW1 | ADSW1 | AIXW0 | ABWW1 | ABLW1 | ADSW1 | AIXW0 | E#W1 DVUR1 | TRAP1 | 011 |
| A2 | | | | | | | | | | | | | | |
| A3 | | | DVUM1 | DVUM1 | DVUM1 | DVUM1 | DVUM1 | DVUM1 | DVUM1 | DVUM1 | DVUM1 | | | |
| A1 | RBRB1 | ASBB1 | ADRW1 | PINW1 | PDCW1 | ADSW1 | AIXW0 | ABWW1 | ABLW1 | TRAP1 | TRAP1 | E#W1 | TRAP1 | BYTE 100 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | TRAP1 | TRAP1 | ADRW1 | PINW1 | PDCW1 | ADSW1 | AIXW0 | ABWW1 | ABLW1 | TRAP1 | TRAP1 | TRAP1 | TRAP1 | WORD 101 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | TRAP1 | TRAP1 | ADRL1 | PINL1 | PDCL1 | ADSL1 | AIXL0 | ABWL1 | ABLL1 | TRAP1 | TRAP1 | TRAP1 | TRAP1 | LONG 110 (EA)+(RXD)→EA |
| A2 | | | | | | | | | | | | | | |
| A3 | | | MORL1 | MORL1 | MORL1 | MORL1 | MORL1 | MORL1 | MORL1 | | | | | |
| A1 | DVS02 | TRAP1 | ADRW1 | PINW1 | PDCW1 | ADSW1 | AIXW0 | ABWW1 | ABLW1 | ADSW1 | AIXW0 | E#W1 DVS02 | TRAP1 | 111 |
| A2 | | | | | | | | | | | | | | |
| A3 | | | DVS01 | DVS01 | DVS01 | DVS01 | DVS01 | DVS01 | DVS01 | DVS01 | DVS01 | | | |

IR[5:0] 000XXX 001XXX 010XXX 011XXX 100XXX 101XXX 110XXX 111000 111001 111010 111011 111100 111101 1111X

OR LINE 1000 OR, DIVU, DIVS, SBCD

FIG. 21M

SUB LINE 1001 SUB & SUBX

| IR[5:0] | | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED | IR[11:9]=XXX IR[8:6] |
|---|---|---|---|---|---|---|---|---|---|---|---|---|---|---|---|
| A1 | | RORW1 | TRAP1 | ADRW1 | PINW1 | PDCW1 | ADSW1 | AIXW0 | ABWW1 | ABLW1 | ADSW1 | AIXW0 | E#W1 | TRAP1 | BYTE 000 (RXD)+(EA)→RXD |
| A2 | | | | | | | | | | | | | | | |
| A3 | | | | ROMW1 | ROMW1 | ROMW1 | ROMW1 | ROMW1 | ROMW1 | ROMW1 | ROMW1 | ROMW1 | RORW1 | | |
| A1 | | RORW1 | RORW1 | ADRW1 | PINW1 | PDCW1 | ADSW1 | AIXW0 | ABWW1 | ABLW1 | ADSW1 | AIXW0 | E#W1 | TRAP1 | WORD 001 (RXD)+(EA)→RXD |
| A2 | | | | | | | | | | | | | | | |
| A3 | | | | ROMW1 | ROMW1 | ROMW1 | ROMW1 | ROMW1 | ROMW1 | ROMW1 | ROMW1 | ROMW1 | RORW1 | | |
| A1 | | RORL1 | RORL1 | ADRL1 | PINL1 | PDCL1 | ADSL1 | AIXL0 | ABWL1 | ABLL1 | ADSL1 | AIXL0 | E#L1 | TRAP1 | LONG 010 (RXD)+(EA)→RXD |
| A2 | | | | | | | | | | | | | | | |
| A3 | | | | ROML1 | ROML1 | ROML1 | ROML1 | ROML1 | ROML1 | ROML1 | ROML1 | ROML1 | RORL1 | | |
| A1 | | RORM1 | RORM1 | ADRW1 | PINW1 | PDCW1 | ADSW1 | AIXW0 | ABWW1 | ABLW1 | ADSW1 | AIXW0 | E#W1 | TRAP1 | WORD 011 (RXA)+(EA)→RXA |
| A2 | | | | | | | | | | | | | | | |
| A3 | | | | ROMM1 | ROMM1 | ROMM1 | ROMM1 | ROMM1 | ROMM1 | ROMM1 | ROMM1 | ROMM1 | RORM1 | | |
| A1 | | RORW1 | ASXW1 | ADRW1 | PINW1 | PDCW1 | ADSW1 | AIXW0 | ABWW1 | ABLW1 | TRAP1 | TRAP1 | TRAP1 | TRAP1 | BYTE 100 (EA)+(RXD)→EA |
| A2 | | | | | | | | | | | | | | | |
| A3 | | | | MORW1 | MORW1 | MORW1 | MORW1 | MORW1 | MORW1 | MORW1 | | | | | |
| A1 | | RORW1 | ASXW1 | ADRW1 | PINW1 | PDCW1 | ADSW1 | AIXW0 | ABWW1 | ABLW1 | TRAP1 | TRAP1 | TRAP1 | TRAP1 | WORD 101 (EA)+(RXD)→EA |
| A2 | | | | | | | | | | | | | | | |
| A3 | | | | MORW1 | MORW1 | MORW1 | MORW1 | MORW1 | MORW1 | MORW1 | | | | | |
| A1 | | RORL1 | ASXL1 | ADRL1 | PINL1 | PDCL1 | ADSL1 | AIXL0 | ABWL1 | ABLL1 | ADSL1 | AIXL0 | E#L1 | TRAP1 | LONG 110 (EA)+(RXD)→EA |
| A2 | | | | | | | | | | | | | | | |
| A3 | | | | MORL1 | MORL1 | MORL1 | MORL1 | MORL1 | MORL1 | MORL1 | ROML1 | ROML1 | RORL1 | | |
| A1 | | RORL1 | RORL1 | | | | | | ABWL1 | ABLL1 | ADSL1 | AIXL0 | | TRAP1 | LONG 111 (RXA)+(EA)→RXA |
| A2 | | | | | | | | | | | | | | | |
| A3 | | | | ROML1 | ROML1 | ROML1 | ROML1 | ROML1 | ROML1 | ROML1 | ROML1 | ROML1 | RORL1 | | |

000XXX 001XXX 010XXX 011XXX 100XXX 101XXX 110XXX 111000 111001 111010 111011 111100 111101 11111X

SUB LINE 1001 SUB & SUBX

CMP LINE 1011 CMP, EOR, CMPM, CMPA

| | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED | IR[11:9]=XXX IR[8:6] |
|---|---|---|---|---|---|---|---|---|---|---|---|---|---|---|
| A1 | CPRW1 | TRAP1 | ADRW1 | PINW1 | PDCW1 | ADSW1 | AIXW0 | ABWW1 | ABLW1 | ADSW1 | AIXW0 | E≠W1 | TRAP1 | BYTE 000 (RXD)+(EA)→RXD |
| A2 | | | | | | | | | | | | CPRW1 | | |
| A3 | | | CPMW1 | CPMW1 | CPMW1 | CPMW1 | CPMW1 | CPMW1 | CPMW1 | CPMW1 | CPMW1 | | | |
| A1 | CPRW1 | CPRW1 | ADRW1 | PINW1 | PDCW1 | ADSW1 | AIXW0 | ABWW1 | ABLW1 | ADSW1 | AIXW0 | E≠W1 | TRAP1 | WORD 001 (RXD)+(EA)→RXD |
| A2 | | | | | | | | | | | | CPRW1 | | |
| A3 | | | CPMW1 | CPMW1 | CPMW1 | CPMW1 | CPMW1 | CPMW1 | CPMW1 | CPMW1 | CPMW1 | | | |
| A1 | CPRL1 | CPRL1 | ADRL1 | PINL1 | PDCL1 | ADSL1 | AIXL0 | ABWL1 | ABLL1 | ADSL1 | AIXL0 | E≠L1 | TRAP1 | LONG 010 (RXD)+(EA)→RXD |
| A2 | | | | | | | | | | | | CPRL1 | | |
| A3 | | | CPML1 | CPML1 | CPML1 | CPML1 | CPML1 | CPML1 | CPML1 | CPML1 | CPML1 | | | |
| A1 | CPRW1 | CPRM1 | ADRW1 | PINW1 | PDCW1 | ADSW1 | AIXW0 | ABWW1 | ABLW1 | ADSW1 | AIXW0 | E≠W1 | TRAP1 | WORD 011 (RXA)+(EA)→RXA |
| A2 | | | | | | | | | | | | CPRM1 | | |
| A3 | | | CPMM1 | CPMM1 | CPMM1 | CPMM1 | CPMM1 | CPMM1 | CPMM1 | CPMM1 | CPMM1 | | | |
| A1 | ROAW1 | CMMW1 | ADRW1 | PINW1 | PDCW1 | ADSW1 | AIXW0 | ABWW1 | ABLW1 | TRAP1 | TRAP1 | TRAP1 | TRAP1 | BYTE 100 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | ROAW1 | CMMW1 | ADRW1 | PINW1 | PDCW1 | ADSW1 | AIXW0 | ABWW1 | ABLW1 | TRAP1 | TRAP1 | TRAP1 | TRAP1 | WORD 101 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | ROAL1 | CMML1 | ADRL1 | PINL1 | PDCL1 | ADSL1 | AIXL0 | ABWL1 | ABLL1 | TRAP1 | TRAP1 | TRAP1 | TRAP1 | LONG 110 (EA)+(RXD)→EA |
| A2 | | | | | | | | | | | | | | |
| A3 | | | MORL1 | MORL1 | MORL1 | MORL1 | MORL1 | MORL1 | MORL1 | | | | | |
| A1 | CPRL1 | CPRL1 | ADRL1 | PINL1 | PDCL1 | ADSL1 | AIXL0 | ABWL1 | ABLL1 | ADSL1 | AIXL0 | E≠L1 | TRAP1 | LONG 111 (RXA)+(EA)→RXA |
| A2 | | | | | | | | | | | | CPRL1 | | |
| A3 | | | CPML1 | CPML1 | CPML1 | CPML1 | CPML1 | CPML1 | CPML1 | CPML1 | CPML1 | | | |

IR[5:0]  000XXX 001XXX 010XXX 011XXX 100XXX 101XXX 110XXX 111000 111001 111010 111011 111100 111101 11111X

CMP LINE 1011 CMP, EOR, CMPM, CMPA

FIG. 21R

ADD LINE 1100 AND, MULU, ABCD, EXGD, EXGM, EXGA, MULS

IR[11:9]=XXX
IR[8:6]

| IR[5:0] | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | |
|---|---|---|---|---|---|---|---|---|---|---|---|---|---|---|
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 | BYTE 000 (RXD)+(EA)→RXD |
| A2 | | | ROMW1 | ROMW1 | ROMW1 | ROMW1 | ROMW1 | ROMW1 | ROMW1 | ROMW1 | ROMW1 | | | |
| A3 | | | | | | | | | | | | | | |
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 | WORD 001 (RXD)+(EA)→RXD |
| A2 | | | ROMW1 | ROMW1 | ROMW1 | ROMW1 | ROMW1 | ROMW1 | ROMW1 | ROMW1 | ROMW1 | | | |
| A3 | | | | | | | | | | | | | | |
| A1 | RORL1 | TRAP1 | ADRL1 | PINL1 | PDCL1 | ADSL1 | AIXL0 | ABWL1 | ABLL1 | ADSL1 | AIXL0 | E#L1 RORL1 | TRAP1 | LONG 010 (RXD)+(EA)→RXD |
| A2 | | | ROML1 | ROML1 | ROML1 | ROML1 | ROML1 | ROML1 | ROML1 | ROML1 | ROML1 | | | |
| A3 | | | | | | | | | | | | | | |
| A1 | MULR1 | TRAP1 | ADRW1 | PINW1 | PDCW1 | ADSW1 | AIXW0 | ABWW1 | ABLW1 | ADSW1 | AIXW0 | E#W1 MULR1 | TRAP1 | 011 |
| A2 | | | MULM1 | MULM1 | MULM1 | MULM1 | MULM1 | MULM1 | MULM1 | MULM1 | MULM1 | | | |
| A3 | | | | | | | | | | | | | | |
| A1 | RBRB1 | ASBB1 | ADRW1 | PINW1 | PDCW1 | ADSW1 | AIXW0 | ABWW1 | ABLW1 | ADSW1 | AIXW0 | TRAP1 | TRAP1 | BYTE 100 (EA)+(RXD)→EA |
| A2 | | | MORW1 | MORW1 | MORW1 | MORW1 | MORW1 | MORW1 | MORW1 | MORW1 | MORW1 | | | |
| A3 | | | | | | | | | | | | | | |
| A1 | EXGE1 | EXGE1 | ADRW1 | PINW1 | PDCW1 | ADSW1 | AIXW0 | ABWW1 | ABLW1 | ADSW1 | AIXW0 | TRAP1 | TRAP1 | WORD 101 (EA)+(RXD)→EA |
| A2 | | | MORW1 | MORW1 | MORW1 | MORW1 | MORW1 | MORW1 | MORW1 | MORW1 | MORW1 | | | |
| A3 | | | | | | | | | | | | | | |
| A1 | TRAP1 | EXGE1 | ADRL1 | PINL1 | PDCL1 | ADSL1 | AIXL0 | ABWL1 | ABLL1 | ADSL1 | AIXL0 | TRAP1 | TRAP1 | LONG 110 (EA)+(RXD)→EA |
| A2 | | | MORL1 | MORL1 | MORL1 | MORL1 | MORL1 | MORL1 | MORL1 | MORL1 | MORL1 | | | |
| A3 | | | | | | | | | | | | | | |
| A1 | MULR1 | TRAP1 | ADRW1 | PINW1 | PDCW1 | ADSW1 | AIXW0 | ABWW1 | ABLW1 | ADSW1 | AIXW0 | E#W1 MULR1 | TRAP1 | 111 |
| A2 | | | MULM1 | MULM1 | MULM1 | MULM1 | MULM1 | MULM1 | MULM1 | MULM1 | MULM1 | | | |
| A3 | | | | | | | | | | | | | | |

000XXX 001XXX 010XXX 011XXX 100XXX 101XXX 110XXX 111000 111001 111010 111011 111100 111101 11111x

AND LINE 1100 AND, MULU, ABCD, EXGD, EXGM, EXGA, MULS

ADD LINE 1101 ADD & ADDX

| | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED | IR[11:9]=XXX IR[8:6] |
|---|---|---|---|---|---|---|---|---|---|---|---|---|---|---|
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 | BYTE 000 (RXD)+(EA)→RXD |
| A2 | | | | | | | | | | | | | | |
| A3 | | | ROMW1 | ROMW1 | ROMW1 | ROMW1 | ROMW1 | ROMW1 | ROMW1 | ROMW1 | ROMW1 | | | |
| A1 | RORW1 | RORW1 | ADRW1 | PINW1 | PDCW1 | ADSW1 | AIXW0 | ABWW1 | ABLW1 | ADSW1 | AIXW0 | E#W1 RORW1 | TRAP1 | WORD 001 (RXD)+(EA)→RXD |
| A2 | | | | | | | | | | | | | | |
| A3 | | | ROMW1 | ROMW1 | ROMW1 | ROMW1 | ROMW1 | ROMW1 | ROMW1 | ROMW1 | ROMW1 | | | |
| A1 | RORL1 | RORL1 | ADRL1 | PINL1 | PDCL1 | ADSL1 | AIXL0 | ABWL1 | ABLL1 | ADSL1 | AIXL0 | E#L1 RORL1 | TRAP1 | LONG 010 (RXD)+(EA)→RXD |
| A2 | | | | | | | | | | | | | | |
| A3 | | | ROML1 | ROML1 | ROML1 | ROML1 | ROML1 | ROML1 | ROML1 | ROML1 | ROML1 | | | |
| A1 | RORW1 | RORM1 | ADRW1 | PINW1 | PDCW1 | ADSW1 | AIXW0 | ABWW1 | ABLW1 | ADSW1 | AIXW0 | E#W1 RORM1 | TRAP1 | WORD 011 (RXA)+(EA)→RXA |
| A2 | | | | | | | | | | | | | | |
| A3 | | | ROMM1 | ROMM1 | ROMM1 | ROMM1 | ROMM1 | ROMM1 | ROMM1 | ROMM1 | ROMM1 | | | |
| A1 | RORW1 | ASXW1 | ADRW1 | PINW1 | PDCW1 | ADSW1 | AIXW0 | ABWW1 | ABLW1 | TRAP1 | TRAP1 | TRAP1 | TRAP1 | BYTE 100 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | RORW1 | ASXW1 | ADRW1 | PINW1 | PDCW1 | ADSW1 | AIXW0 | ABWW1 | ABLW1 | TRAP1 | TRAP1 | TRAP1 | TRAP1 | WORD 101 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | RORL1 | ASXL1 | ADRL1 | PINL1 | PDCL1 | ADSL1 | AIXL0 | ABWL1 | ABLL1 | ADSL1 | AIXL0 | E#L1 RORL1 | TRAP1 | LONG 110 (EA)+(RXD)→EA |
| A2 | | | | | | | | | | | | | | |
| A3 | | | MORL1 | MORL1 | MORL1 | MORL1 | MORL1 | MORL1 | MORL1 | ROML1 | ROML1 | | | |
| A1 | RORL1 | RORL1 | ADRL1 | PINL1 | PDCL1 | ADSL1 | AIXL0 | ABWL1 | ABLL1 | ADSL1 | AIXL0 | E#L1 RORL1 | TRAP1 | LONG 111 (RXA)+(EA)→RXA |
| A2 | | | | | | | | | | | | | | |
| A3 | | | ROML1 | ROML1 | ROML1 | ROML1 | ROML1 | ROML1 | ROML1 | ROML1 | ROML1 | | | |

IR[5:0] 000XXX 001XXX 010XXX 011XXX 100XXX 101XXX 110XXX 111000 111001 111010 111011 111100 111101 11111X

ADD LINE 1101 ADD & ADDX

FIG. 21S

SHIFT LINE 1110 ASL, ASR, LSL, LSR, ROL, ROR, ROXL, ROXR, REGISTER & MEMORY SHIFTS.

| IR[5:0] | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:6] |
|---|---|---|---|---|---|---|---|---|---|---|---|---|---|---|
| | 000XXX | 001XXX | 010XXX | 011XXX | 100XXX | 101XXX | 110XXX | 111000 | 111001 | 111010 | 111011 | 111100 | 111101 111111X | |
| A1 | TRAP1 | ADRW1 | PINW1 | PDCW1 | ADSW1 | AIXW1 | ABWW1 | ABLW1 | TRAP1 | TRAP1 | TRAP1 | TRAP1 | TRAP1 | 0XXX11 WORD MEMORY SHIFTS |
| A2 | | SFTM1 | SFTM1 | SFTM1 | SFTM1 | SFTM1 | SFTM1 | SFTM1 | | | | | | |
| A3 | | | | | | | | | | | | | | |
| A1 | SRIW1 | SRIW1 | SRIW1 | SRRW1 | SRRW1 | SRRW1 | SRRW1 | SRRW1 | SRRW1 | SRRW1 | SRRW1 | SRRW1 | SRRW1 | XXXX00 BYTE REGISTER-SHIFTS |
| A2 | | | | | | | | | | | | | | |
| A3 | | | | | | | | | | | | | | |
| A1 | SRIW1 | SRIW1 | SRIW1 | SRRW1 | SRRW1 | SRRW1 | SRRW1 | SRRW1 | SRRW1 | SRRW1 | SRRW1 | SRRW1 | SRRW1 | XXXX01 WORD REGISTER-SHIFTS |
| A2 | | | | | | | | | | | | | | |
| A3 | | | | | | | | | | | | | | |
| A1 | SRIL1 | SRIL1 | SRIL1 | SRRL1 | SRRL1 | SRRL1 | SRRL1 | SRRL1 | SRRL1 | SRRL1 | SRRL1 | SRRL1 | SRRL1 | XXXX10 LONG REGISTER-SHIFTS |
| A2 | | | | | | | | | | | | | | |
| A3 | | | | | | | | | | | | | | |
| A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | 1XXX11 |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |

SHIFT LINE 1110 ASx, LSx, ROx, ROXx

FIG. 21T

| IR[5:0] | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED IR[11:6] XXXXXX |
|---|---|---|---|---|---|---|---|---|---|---|---|---|---|
| A1 A2 A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| | 000XXX | 001XXX | 010XXX | 011XXX | 100XXX | 101XXX | 110XXX | 111000 | 111001 | 111010 | 111011 | 111100 | 111101 1111X |

RESERVED LINE 1111 (top)
RESERVED LINE 1111 (bottom)

FIG. 21U

CONDITIONAL BRANCH UNIT FOR MICROPROGRAMMED DATA PROCESSOR

TABLE OF CONTENTS

Subject

Cross Reference to Related Applications
Technical Field
Background Art
Brief Summary of the Invention
Brief Description of the Drawings
Detailed Description of a Preferred Embodiment
    Structural Overview of Preferred Embodiment
    Instruction Register Sequence Decoder
    Two-level Microprogrammed Control Unit
    Conditional Branch Logic
    ALU and Condition Code Control Unit
    Claims
    List of Microwords
    Abbreviations
    Conditional Branch Choices
    Abbreviations
    Abbreviations
    Instructions
    Word Formats
    Microword Sequences

CROSS-REFERENCE TO RELATED APPLICATIONS

1. "Microprogrammed Control Apparatus For Data Processor", invented by Tredennick et al, bearing Ser. No. 961,796, filed Nov. 17, 1978, and assigned to the assignee of the present invention.

2. "Execution Unit For Data Processor Using Segmented Bus Structure" invented by Gunter et al, bearing Ser. No. 961,798, filed Nov. 17, 1978, and assigned to the assignee of the present invention.

3. "Instruction Register Sequence Decoder For Microprogrammed Data Processor And Method" invented by Tredennick et al, bearing Ser. No. 41,202, filed concurrently herewith and assigned to the assignee of the present invention.

4. "Two-Level Control Store For Microprogrammed Data Processor" invented by Gunter et al, bearing Ser. No. 41,135, filed concurrently herewith and assigned to the assignee of the present invention.

5. "ALU And Condition Code Control Unit For Data Processor" invented by Gunter et al, bearing Ser. No. 41,203, filed concurrently herewith and assigned to the assignee of the present invention.

TECHNICAL FIELD

This invention relates generally to data processors and more particularly to a data processor having a control store containing a plurality of microinstruction routines for implementing instructions received by the data processor.

BACKGROUND ART

Recent improvements in MOS semiconductor technology have resulted in advancement in large scale integrated circuit microprocessors. The latest generation of LSI microprocessors is an order to magnitude more powerful than the previous generation of microprocessors introduced 3 or 4 years ago. The latest generation of microprocessors has 16-bit data paths and 16-bit arithmetic capability, and such microprocessors directly address multiple-megabyte memories. In terms of functional capability and speed, such microprocessors will outperform all but the high end models of current 16-bit minicomputers.

LSI microprocessor design is now at the stage where better implementation techniques are required in order to control complexity and meet tight design schedules. One technique for achieving these goals is to use microprogramming for controlling the processor. Most of the traditionally claimed benefits of microprogramming, for example, regularity (to decrease complexity), flexibility (to ease design changes), and reduced design costs, apply to the implementation problems for current LSI microprocessor design.

Generally, a data processor performs a series of operations upon digital information in an execution unit according to a stored program of instructions. These instructions are often termed "macroinstructions" in order to avoid confusion with the microinstructions contained in the control store of the data processor. The microinstructions are often grouped into microinstruction routines in order to perform various macroinstructions. In order to implement certain macroinstructions, the sequence of the microinstructions is dependent upon one or more variables. For example, a macroinstruction which is implemented with an iterative type microinstruction sequence may employ a loop counter which is decremented and tested for zero before repeating the microinstruction routine. Thus, the branch to the beginning of the microinstruction routine is conditional on the loop counter not being equal to zero. Similarly, for a multiply macroinstruction using microinstructions to perform an add/shift algorithm, whether or not an addition will be performed prior to the shift is conditional on a bit in a shift register. Where the next microinstruction is dependent upon two variables or conditions, the data processor may have to select the next microinstruction address from as many as four possible branch destinations.

Often, two microinstruction routines may test for the same condition and converge upon a common branch destination routine if the condition being tested is TRUE but diverge to two unrelated branch destination routines if the condition is FALSE (or vice versa). If the branch control logic within the data processor allows two different conditional branch microinstructions to share a common branch destination, then the size of the control store can be minimized since the destination routine need not be duplicated within the control store.

In addition, data processors typically are designed to implement macroinstructions which are expressly conditioned on various condition code bits such that branching within the macroinstruction program memory is possible (for example, a branch on condition macroinstruction). In this case, the condition to be tested is specified by the op-code of the macroinstruction. Since usually several different conditions may be tested (branch if zero, branch if overflow, branch if carry, etc.), the size of the micro control store will be increased since separate microinstructions would ordinarily be required to process each of the different conditional type macroinstructions.

Thus, it should be appreciated by those skilled in the art that a data processor which includes conditional branch logic which permits different conditional branch type microinstructions to share some but not all branch destinations and which allows microinstruction routines for processing conditional type macroinstructions to be shared is a significant improvement over the prior art.

BRIEF SUMMARY OF THE INVENTION

An object of the present invention is to provide conditional branch logic for a data processor having a microprogrammed control store such that the size of the control store is reduced.

Another object of the present invention is to provide conditional branch logic for a data processor having a microprogrammed control store which provides for conditional branching within the control store both for macroinstructions which implicitly require conditional branching and macroinstructions which explicitly require conditional branching without increasing the size of the control store.

A further object of the present invention is to provide conditional branch logic which can provide multiple branch addresses for a particular branch destination such that different conditional branch microinstructions can share a common destination.

These and other objects of the present invention are accomplished by providing a data processor adapted for microprogrammed operation and having a control store which provides conditional branch selection signals which specify the manner in which the address of the branch destination in the control store is to be generated. The data processor includes branch control logic which receives conditional branch selection signals from the control store which can directly select the conditional signal or signals to be considered. The conditional branch selection signals can also defer selection of the conditional signals to a group of bits in a stored macroinstruction. The selected conditional signals generate an output signal according to the logic state of the selected conditional signals. The branch control logic is responsive to at least one of the conditional branch selection signals for selecting one of a plurality of branch destination codes associated with the output signal generated by the selected conditional signals. The selected branch destination code is provided to the control store for determining the branch destination in the control store.

BRIEF DESCRIPTION OF THE DRAWINGS

FIG. 3 is a simplified block diagram of the execution unit used within the data processor for executing macroinstructions.

FIGS. 7A-7D illustrate the concept of functional branching within the micro control store implemented through the use of the instruction register sequence decoder.

FIG. 8 illustrates first and second formats for microwords contained by the micro control store, the first format corresponding to direct branch type microwords and the second format corresponding to conditional branch type microwords.

Figure 10D:
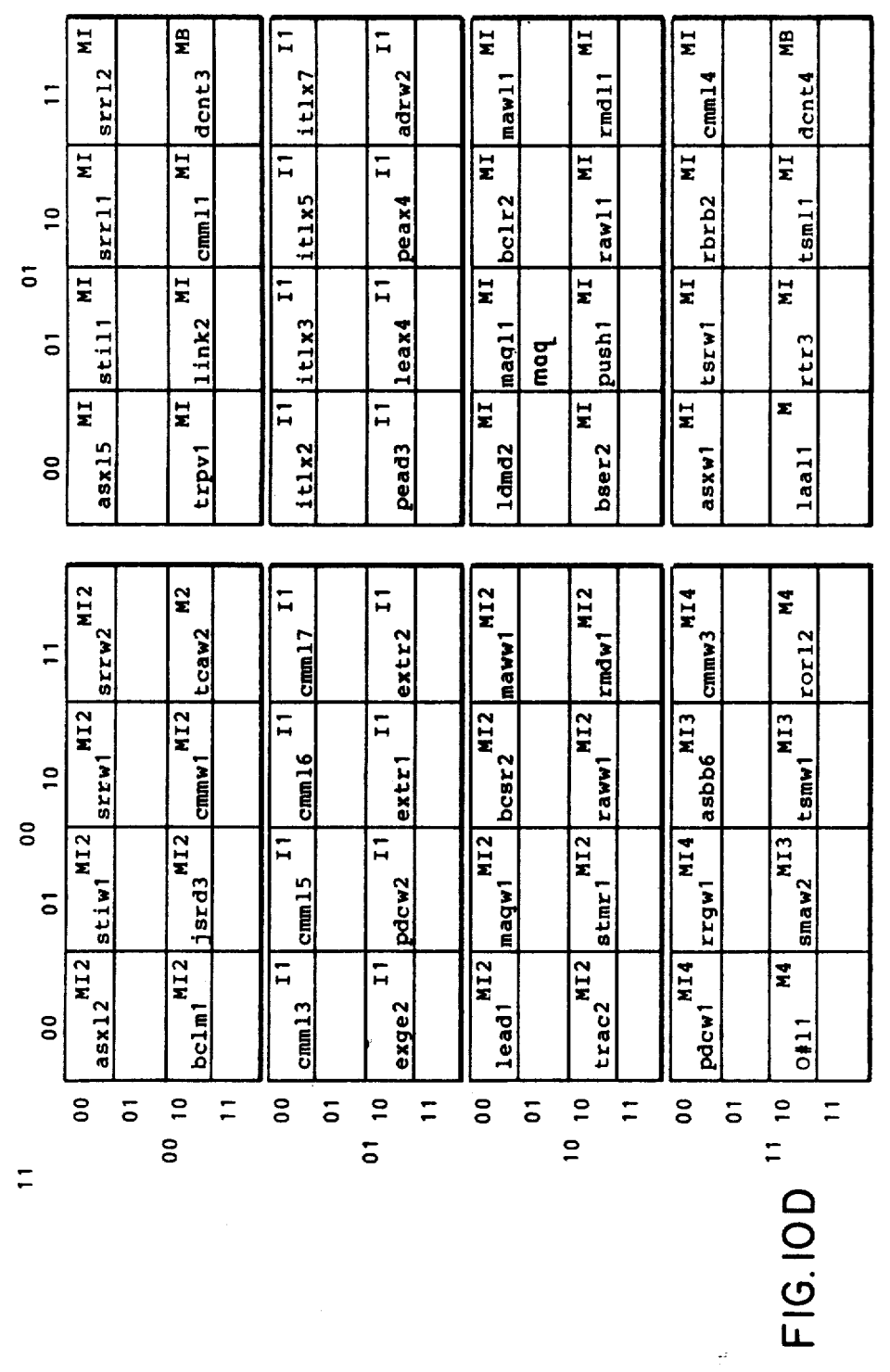

FIGS. 10A-10D illustrate the locations of the various microwords within the micro control store.

FIGS. 11A-11F illustrate the control store addresses to which each of the nanowords in the nano control store is responsive.

FIGS. 14A-14B illustrate circuitry for implementing the conditional branch logic unit shown in FIG. 14.

FIG. 16 is an ALU control table which illustrates the operations which can be performed by the ALU within the execution unit.

FIG. 17 illustrates an ALU Function And Condition Code table having 15 rows and 5 columns which specify the ALU function and the manner in which the condition codes are to be controlled for various macroinstructions.

FIG. 18 is an ALU Function Control And Condition Code Decoder table which illustrates the relationship between the opcodes for various macroinstructions and the rows in the table shown in FIG. 18.

Figure 21F:
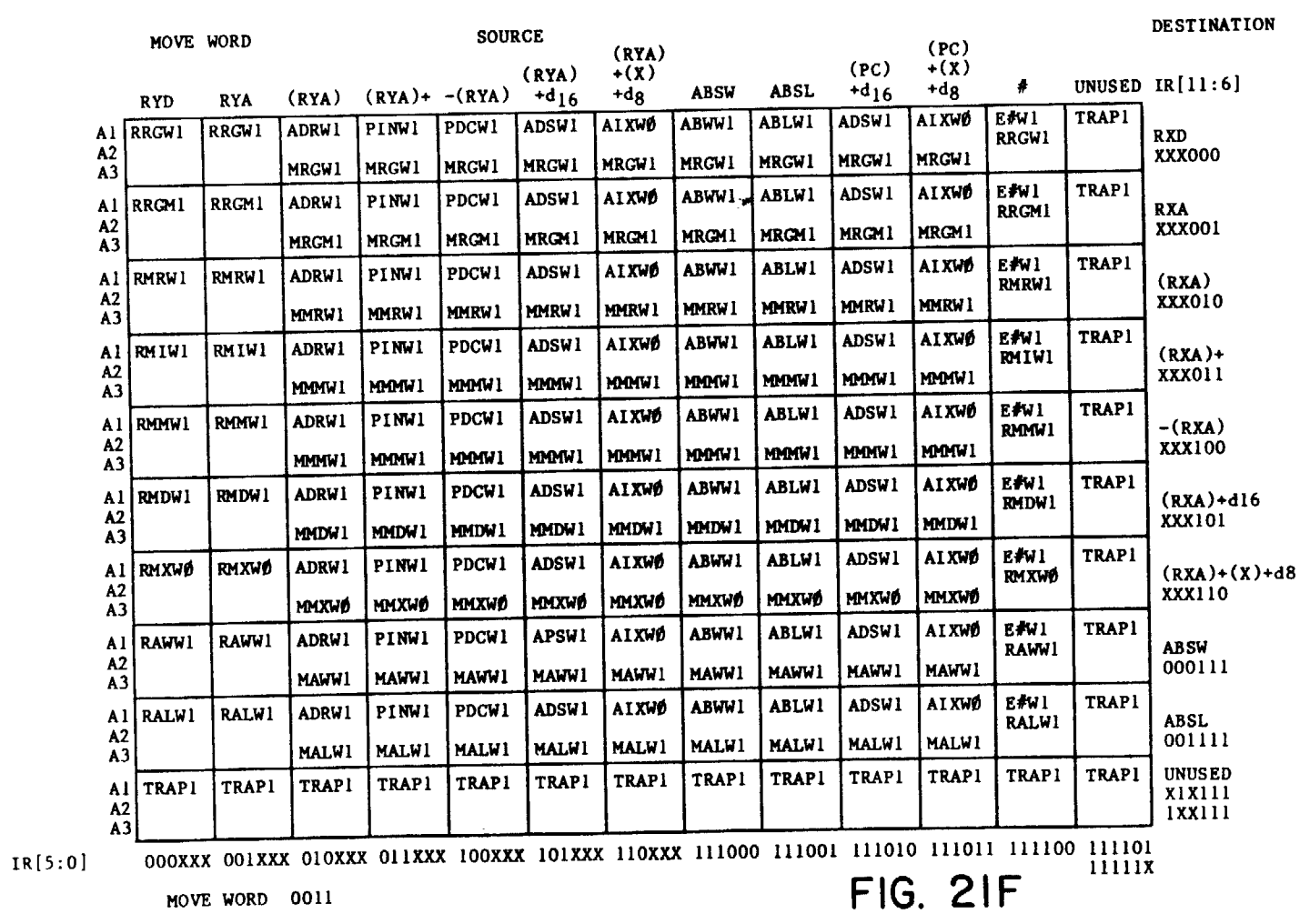
Figure 21P:
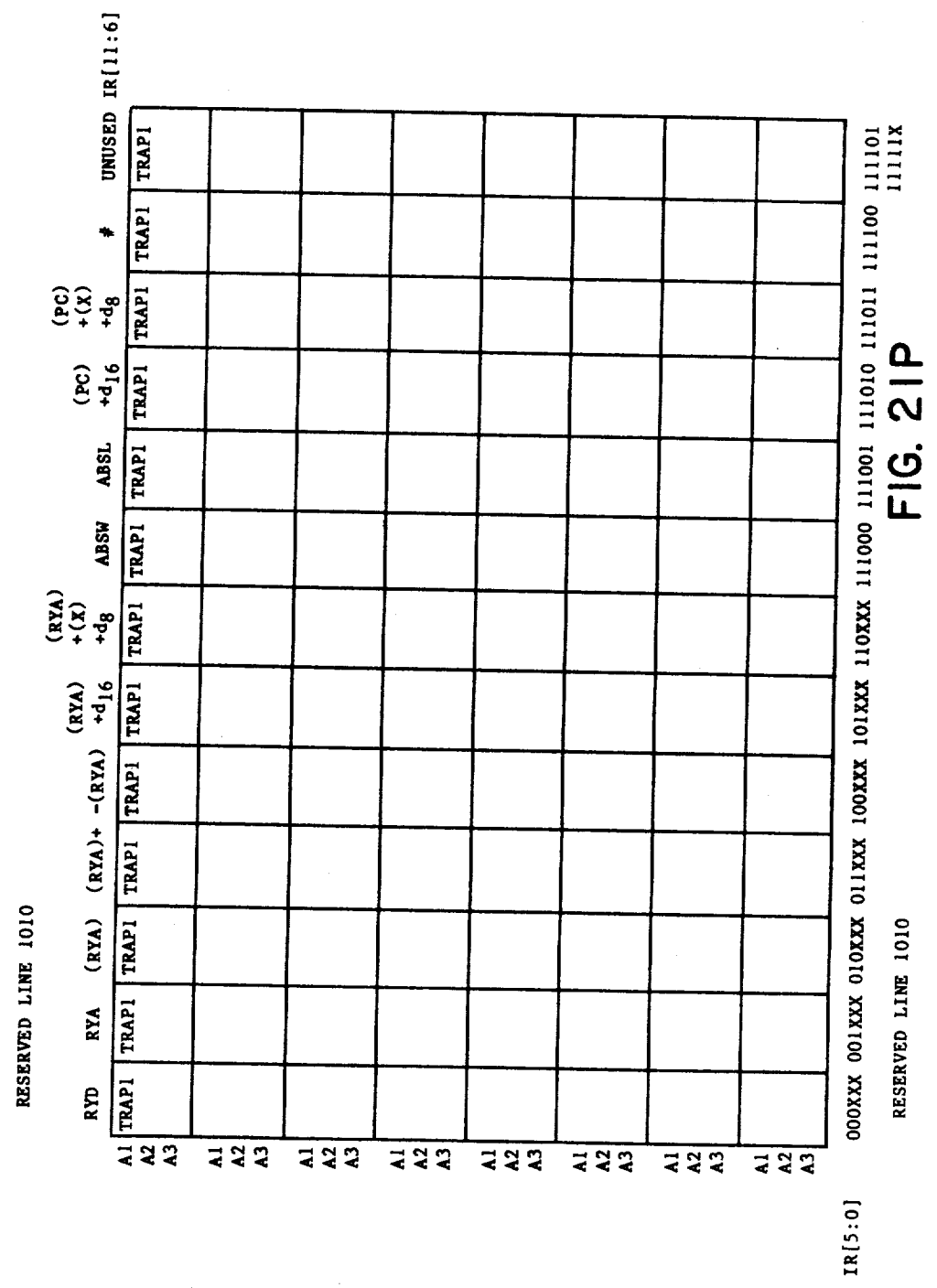

FIGS. 21A-21N and 21P-21U are tables which illustrate the $A_1$, $A_2$, and $A_3$ starting addresses generated by the instruction register sequence decoder for each of the macroinstructions.

DETAILED DESCRIPTION OF A PREFERRED EMBODIMENT

Figure 1:
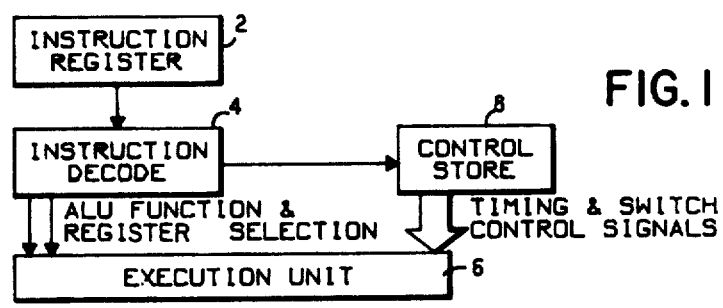
FIG. 1 is a simplified block diagram of applicants' data processor employing a microprogrammed control store.

In FIG. 1, a simplified block diagram of a data processor is shown which employs a microprogrammed control structure to effect execution of macroinstructions received by the data processor. Instruction register 2 stores a macroinstruction received from a program memory. The stored macroinstruction is output by instruction register 2 to instruction decode block 4. Instruction decode block 4 derives information from the instruction such as a function to be performed by an arithmetic-logic unit (ALU) within execution unit block 6, as well as the registers which will provide data to the ALU and the registers which will store the result formed by the ALU. Instruction decode block 4 is also coupled to a control store block 8 which provides timing and control signals to execution unit 6.

The execution of a particular macroinstruction may require several execution unit time periods, or microcycles, such that various transfers and functions are performed by execution unit 6 during each of the execution unit time periods. The timing and control signals provided by control store block 8 insure that the proper transfers and operations occur during each of the execution unit time periods.

STRUCTURAL OVERVIEW OF PREFERRED EMBODIMENT

Figure 2:
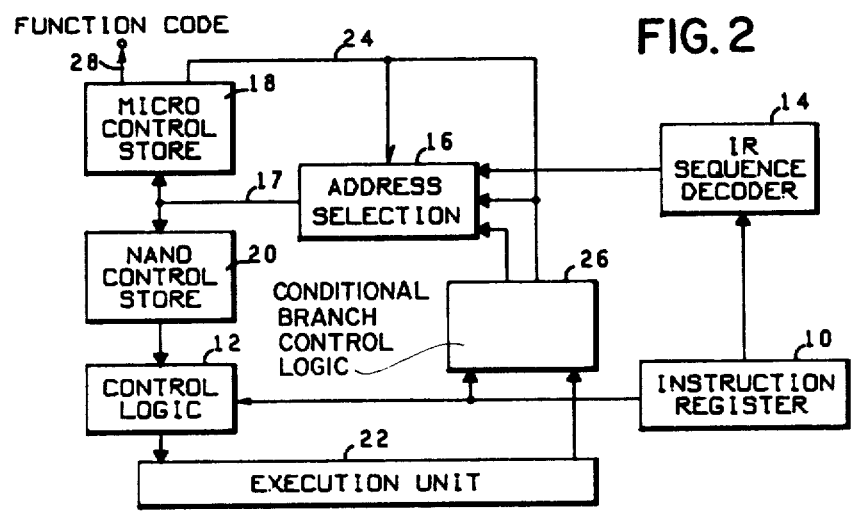
FIG. 2 is a more detailed block diagram of a data processor of the type shown in FIG. 1 according to a preferred embodiment of the invention.

In FIG. 2, a more detailed block diagram is shown which illustrates a preferred embodiment of the present invention. Instruction register 10 receives a macroinstruction from a program memory and stores this instruction. Instruction register 10 is coupled to control logic block 12 which extracts from the stored macroinstruction information which is static over the time period during which the stored macroinstruction is executed. Examples of macroinstruction static information are source and destination registers, ALU operation (addition, subtraction, multiplication, exclusive-OR), and immediate values contained within the instruction word such as address displacements and data constants.

Instruction register 10 is also coupled to instruction register sequence decoder block 14. In response to the macroinstruction stored by instruction register 10, instruction register sequence decoder 14 generates one or more starting addresses. Instruction register sequence decoder 14 is coupled to address selection block 16 for providing the one or more starting addresses. Line 17 couples the output of address selection block 16 to a control store which includes micro control store 18 and nano control store 20. In response to the address selected onto line 17, nano control store 20 selects a nanoword which contains field-encoded control words for directing action in the execution unit. Nano control store 20 is coupled to control logic 12 which decodes the various fields in the nano control word in combination with the macroinstruction static information received directly from instruction register 10. The output of control logic 12 is coupled to execution unit 22 for controlling the various operations and data transfers which may be performed within execution unit 22.

Micro control store 18 is responsive to the selected address on line 17 for selecting a microword. Line 24 couples an output of micro control store 18 to address selection block 16 and to conditional branch control logic block 26. The selected microword contains information which generally determines the source of the next micro instruction address to be selected. The selected microword may also provide the address of the next micro instruction.

Execution unit 22 stores various condition code flags which are set or reset depending upon the status of ALU operations such as positive/negative result, zero result, overflow, and carry-out. In the event that the selection of the next micro instruction address is dependent upon one or more of these condition code flags, the microword provided by micro control store 18 also includes information provided to conditional branch control logic 26 for specifying which of the condition code flags will be used to determine the selection of the next micro instruction. In some cases, the macroinstruction itself specifies the condition code flags which are to be used to select the next micro instruction (for example, a conditional branch macroinstruction such as branch on zero). For this reason, instruction register 10 is also coupled to conditional branch control logic 26. Execution unit 22 is coupled to conditional branch control logic 26 for providing the various condition code flags. Conditional branch control logic 26 is coupled to address selection block 16 for specifying a portion of the next micro instruction address.

Micro control store 18 has a second output which is coupled to line 28. The selected microword includes a function code field which specifies the function of the current micro instruction. Line 28 provides the function code field to peripheral devices external to the data processor for communicating information about the current micro instruction.

In general, instruction register sequence decoder 14 provides a starting address for micro control store 18 which then produces a sequence of addresses for the nano control store 20. The associated nanowords are decoded by the control logic 12 and mixed with timing information. The resulting signals generated by control logic 12 are used to drive control points in execution unit 22.

In FIG. 3, a simplified block diagram of execution unit 22 (in FIG. 2) is shown. The execution unit is a segmented two-bus structure divided into three sections by bidirectional bus couplers. The left-most segment contains the high order word for the address and data registers and a simple 16-bit arithmetic unit. The middle segment contains the low order word for the address registers and a simple 16-bit arithmetic unit. The right-most segment contains the low order word for the data registers and an arithmetic and logic unit. The execution unit also contains an address temporary register and a data temporary register each of which is 32 bits wide. In addition there are also several other temporary registers and special function units which are not visible to a programmer.

With reference to FIG. 3, a first digital bus 10' and a second digital bus 12' have been labeled ADDRESS BUS DATA and DATA BUS DATA, respectively. A group of 16-bit data registers, illustrated by block 14', is coupled to digital buses 10' and 12' such that block 14' can provide a 16-bit data word to either digital bus 10' or digital bus 12'. Similarly block 14' may receive from either bus 10' or bus 12' a 16-bit data word which is to be stored in one of the registers. It is to be understood that each of the digital buses 10' and 12' is adapted for transmitting 16 bits of digital information. The 16-bit registers contained by block 14' comprise the least significant 16 bits of a corresponding plurality of 32-bit data registers.

Blocks 16' and 18' are also coupled to digital buses 10' and 12'. Block 16' contains special function units not directly available to the programmer. Among the special function units are a priority encoder, used to load and store multiple registers, and a decoder, used to perform bit manipulation. Block 18' contains an arithmetic and logic unit which receives a first 16-bit input from bus 10' and a second 16-bit input from bus 12' and generates a 16-bit result. The 16-bit result may then be transferred onto either bus 10' or bus 12'.

Also shown in FIG. 3 is a third digital bus 20' and a fourth digital bus 22'. Bus 20' and bus 22' have been labeled ADDRESS BUS LOW and DATA BUS LOW, respectively. Block 24' is coupled to both bus 20' and bus 22' and contains a plurality of 16-bit address registers. These registers comprise the least significant 16 bits of a corresponding plurality of 32-bit address registers. Block 24' can provide a 16-bit address word to either bus 20' or 22'. Similarly block 24' can receive a 16-bit address word from either bus 20' or bus 22' for storage in one of the 16-bit address registers.

Block 26' is also coupled to bus 20' and bus 22' and contains an arithmetic unit for performing computations. Block 26' can receive a first 16-bit input from bus 20' and a second 16-bit input from bus 22' and generates a 16-bit result. The 16-bit result produced by ARITHMETIC UNIT LOW 26' may be transferred onto bus 20' or onto bus 22'. ARITHMETIC UNIT LOW 26' also produces a carry-out signal (not shown) which may be used in computations involving the most significant 16 bits of a 32-bit address word. Although not shown in FIG. 3, a field translate unit (ftu) is also coupled to bus 20' and bus 22' and may be used to transfer digital information between the execution unit and other sections of the data processor. First and second bidirectional bus switches 28' and 30' are shown coupled between bus 10' and bus 20' and between bus 12' and bus 22', respectively.

Also shown in FIG. 3 is a fifth digital bus 32' and a sixth digital bus 34'. Bus 32' and bus 34' have been labeled ADDRESS BUS HIGH and DATA BUS HIGH, respectively. Block 36' is coupled to both bus 32' and bus 34' and contains a plurality of 16-bit address registers and another plurality of 16-bit data registers. The address registers within block 36' comprise the most significant 16 bits of the 32-bit address registers formed in conjunction with the registers contained by block 24'. The 16-bit data registers within block 36' comprise the most significant 16 bits of a plurality of 32-bit data registers formed in conjunction with the data registers contained by block 14'.

Block 38' is also coupled to bus 32' and bus 34' and contains an arithmetic unit for performing computations upon the most significant 16 bits of either address or data words. Block 38' receives a first 16-bit input from bus 32' and a second 16-bit input from bus 34' and generates a 16-bit result. The 16-bit result produced by ARITHMETIC UNIT HIGH 38' may be transferred onto bus 32' or bus 34'. As previously mentioned, ARITHMETIC UNIT HIGH 38' can be responsive to a carry out produced by block 26' such that a carry out from the least significant 16 bits is considered a carry in to the most significant 16 bits. Third and fourth bidirectional bus switches 40' and 42' are shown coupled between bus 32' and bus 20' and between bus 34' and bus 22', respectively.

Thus it may be seen that the register file for the data processor is divided into three sections. Two general buses (ADDRESS BUS, DATA BUS) connect all of the words in the register file. The register file sections (HIGH, LOW, DATA) are either isolated or concatenated using the bidirectional bus switches. This permits general register transfer operations across register sections. A limited arithmetic unit is located in the HIGH and LOW sections, and a general capability arithmetic and logical unit is located in the DATA section. This allows address and data calculations to occur simultaneously. For example, it is possible to do a register-to-register word addition concurrently with a program counter increment (the program counter is located adjacent to the address register words, and carry out from the ARITHMETIC UNIT LOW 26' is provided as carry in to ARITHMETIC UNIT HIGH 38'). Further details of the execution unit are set forth in co-pending application "Execution Unit For Data Processor Using Segmented Bus Structure" bearing Ser. No. 961,798, filed Nov. 17, 1978, invented by Gunter et al and assigned to the assignee of the present invention, which is hereby incorporated by reference.

Figure 4:
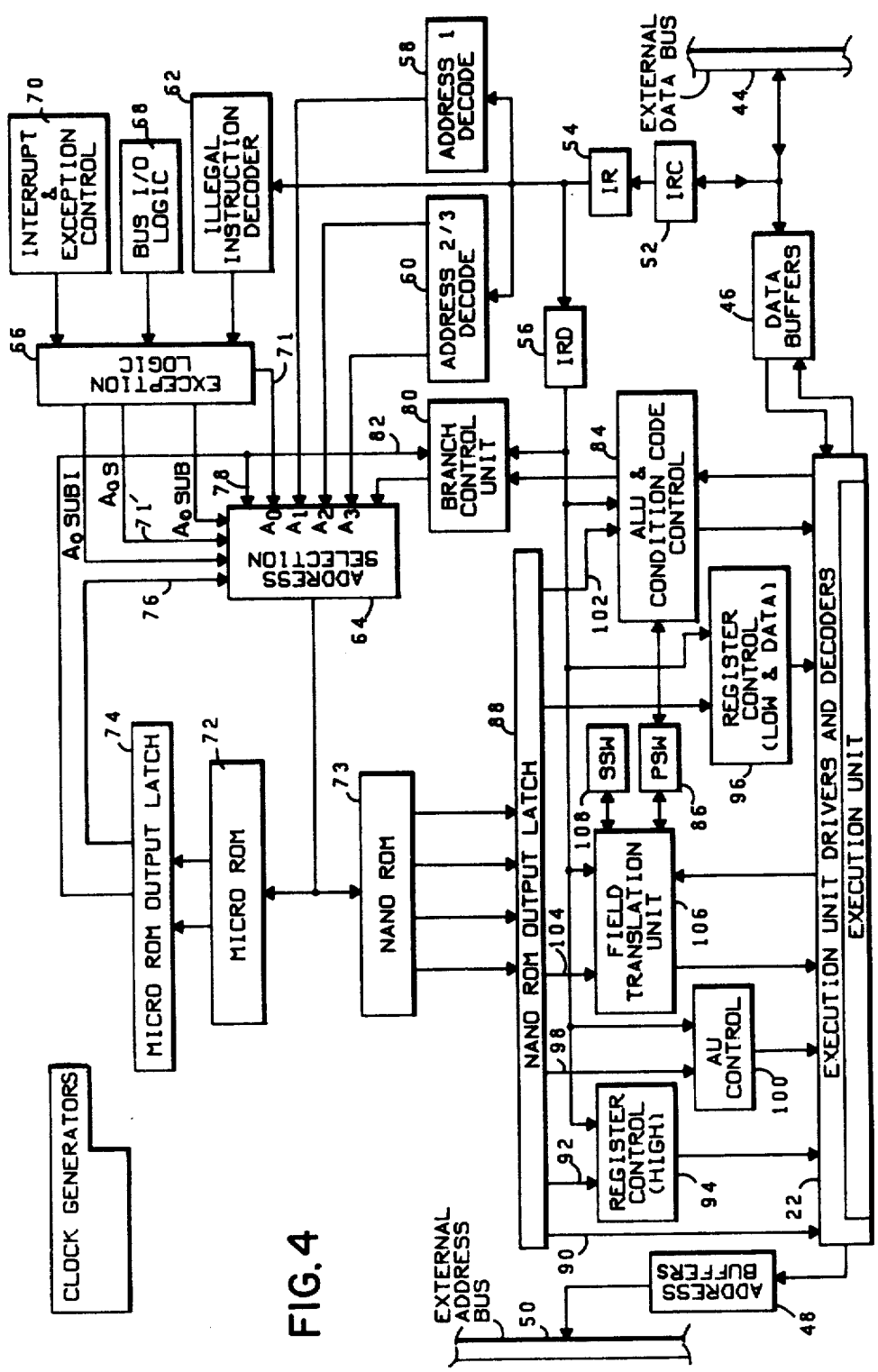
FIG. 4 is a block diagram which illustrates the data processor shown in FIG. 2 in further detail.

In FIG. 4, a detailed block diagram is shown of the data processor generally illustrated in FIG. 2. A bidirectional external data bus 44 is a 16-bit bus to which the data processor is coupled for transmitting data to and receiving data from peripheral devices. The data processor includes data buffers 46 coupled between external data bus 44 and execution unit 22 for transferring data between the execution unit and the external data bus. Execution unit 22 includes drivers and decoders which are shown generally along the periphery of execution unit 22. Execution unit 22 is also coupled to address buffers 48 which are in turn coupled to external address bus 50. An address provided by execution unit 22 to external address bus 50 typically specifies the location from which the data on bus 44 was read or the location to which the data on bus 44 is to be written. In the preferred embodiment, external address bus 50 is 24-bits wide such that a memory addressing range of more than 16 mega-bytes is provided.

External data bus 44 is also coupled to the input of 16-bit IRC register 52. The output of IRC register 52 is coupled to the input of 16-bit IR register 54. The output of IR register 54 is coupled to the input of 16-bit IRD register 56. Also coupled to the output of IR register 54 are the inputs to block 58 (ADDRESS 1 DECODER) and block 60 (ADDRESS 2/3 DECODER) as well as the input to block 62 (ILLEGAL INSTRUCTION DECODER). The use of IRC register 52, IR register 54, and IRD register 56 allows the data processor to operate in a pipelined manner; IRC register 52 stores the next macroinstruction, and IR register 54 stores the macroinstruction currently being decoded, while IRD register 56 stores the macroinstruction currently being executed. The output of block 58 is coupled to the $A_1$ input of address selector 64. A first output of block 60 is coupled to the $A_2$ input of address selector 64 and a second output of block 60 is coupled to the $A_3$ input of address selector 64. The output signals provided by block 58 and block 60 are microroutine starting addresses associated with a macroinstruction stored by IR register 54 as will be later explained in further detail.

The output of Illegal Instruction Decoder 62 is coupled to exception logic block 66. Also coupled to block 66 are block 68 (BUS I/O LOGIC) and block 70, (INTERRUPT AND EXCEPTION CONTROL). A first output of exception logic block 66 is coupled by line 71 to the $A_O$ input of address selector 64 for providing a special microroutine starting address. A second output of exception block 66 is coupled by line 71' ($A_0S$) to another input of address selector 64 for providing a second special microroutine starting address. Two additional outputs of exception logic block 66, $A_0SUB$ and $A_0SUBI$, respectively, are also coupled to address selector 64.

The output of address selector 64 is coupled to the input of micro ROM 72 and the input of nano ROM 73 for providing a selected address. The output of micro ROM 72 is coupled to micro ROM output latch 74 which stores the microword selected by micro ROM 72 in response to the address selected by address selector 64. The output of micro ROM output latch 74 is coupled to address selector 64 by lines 76 and 78 and to branch control unit 80 by line 82. Line 76 can provide a direct branch address as an input to address selector 64 while line 78 can specify to address selector 64 the source of the next address to be selected. In the event of a conditional branch, line 82 specifies the manner in which branch control unit 80 is to operate. Branch control unit 80 is also coupled to address selector 64 in order to modify the selection of the next micro/nano store address in order to accomplish conditional branching in a microroutine, as will be further explained hereinafter.

IRD register 56 has an output coupled to branch control unit 80 for supplying branch control information directly from a macroinstruction word. Branch control unit 80 is also coupled to an output of ALU AND CONDITION CODE CONTROL block 84 for receiving various condition code flags. PSW register 86 is coupled to block 84 and stores several of the condition code flags. Execution unit 22 is also coupled to block 84 for supplying other condition code flags.

Still referring to FIG. 4, nano ROM 73 is coupled to nano ROM output latch 88 for supplying a nanoword associated with the address selected by address selector 64. Various bit fields of the nanoword stored by latch 88 are used to control various portions of execution unit 22. Line 90 is coupled directly from latch 88 to execution unit 22 for controlling such functions as transferring data and addresses between the execution unit 22 and external buses 44 and 50. Line 92 is coupled from latch 88 to register control block 94. IRD register 56 is also coupled to register control block 94. Bit fields within IRD register 56 specify one or more registers (source, destination) which are to be used in order to implement the current macroinstruction. On the other hand, bit fields derived from latch 88 and supplied by line 92 specify the proper micro cycle during which source and destination registers are to be enabled. The output of block 94 is coupled to execution unit 22 for controlling the registers located in the HIGH section of the execution unit (block 36' in FIG. 3). In a similar manner, register control block 96 also has inputs coupled to latch 88 and IRD register 56 and is coupled to execution unit 22 for controlling the registers located in the LOW and DATA sections of the execution unit.

Line 98 couples latch 88 to AU control block 100 for supplying a bit field extracted from the nano word. Block 100 is also coupled to IRD register 56. Bit fields in the macroinstruction stored by IRD register 56 specify an operation to be performed by the ARITHMETIC UNIT HIGH and ARITHMETIC UNIT LOW in execution unit 22 (block 38' in FIG. 3). Information supplied by line 98 specifies the proper micro cycle during which the inputs and outputs of the ARITHMETIC UNIT HIGH and ARITHMETIC UNIT LOW are enabled. The output of AU control block 100 is coupled to execution unit 22 for controlling the arithmetic units in the HIGH and LOW sections.

Line 102 couples latch 88 to ALU AND CONDITION CODE CONTROL block 84. IRD register 56 is also coupled to block 84. Bit fields derived from the macroinstruction stored in IRD register 56 indicate the type of operation to be performed by the ALU in execution unit 22. Bit fields derived from the nanoword stored in latch 88 specify the proper micro cycles during which the input and outputs of the ALU are to be enabled. An output of block 84 is coupled to execution unit 22 for controlling the ALU. Block 84 also provides an output to PSW register 86 for controlling the condition code flags stored therein.

Line 104 couples latch 88 to FIELD TRANSLATION UNIT 106. IRD register 56 is also coupled to FIELD TRANSLATION UNIT 106. Also coupled to FIELD TRANSLATION UNIT 106 are PSW register 86 and special status word (SSW) register 108. PSW register 86 stores information such as the current priority level of the data processor for determining which interrupts will be acknowledged. PSW register 86 also specifies whether or not the processor is in the TRACE mode of operation and whether the processor is currently in a supervisor or user mode. SSW register 108 is used to monitor the status of the data processor and is useful for recovering from error conditions. FIELD TRANSLATION UNIT 106 can extract a bit field from the macroinstruction stored in IRD register 56 for use by the execution unit such as supplying an offset which is to be combined with an index register. FTU 106 can also supply bit fields extracted from PSW register 86 and SSW register 108 to the execution unit 22. FTU 106 can also be used to transfer a result from execution unit 22 into PSW register 86.

INSTRUCTION REGISTER SEQUENCE DECODER

Figure 5:
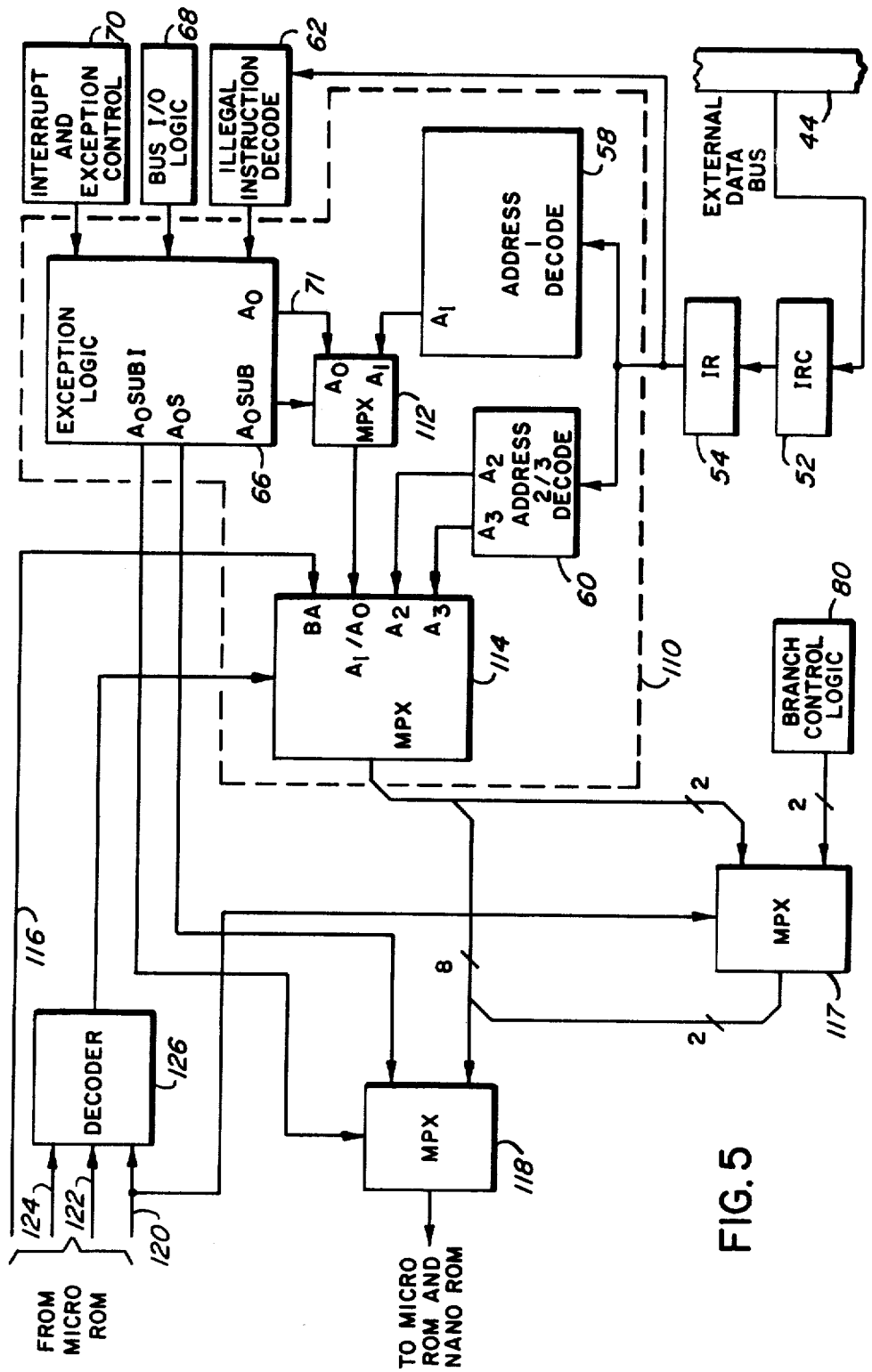
FIG. 5 is an expansion of a portion of the block diagram shown in FIG. 4 and illustrates an instruction register sequence decoder within the data processor.

In FIG. 5, a portion of FIG. 4 which includes an Instruction Register Sequence Decoder has been expanded in greater detail. Blocks in FIG. 5 which correspond to those already shown in FIG. 4 have been identified with identical reference numerals. Blocks 58, 60, and 66 are included within dashed block 110 which forms the Instruction Register Sequence Decoder. Instruction Register 54 (IR) receives a macroinstruction from a program memory via bus 44 and IRC register 52 and stores this instruction. The output of IR register 54 is coupled to illegal instruction decoder 62 which detects invalid macroinstruction formats. The output of IR register 54 is also coupled to an ADDRESS 1 DECODER 58 and ADDRESS 2/3 DECODER 60. Decoders 58 and 60 are programmed logic array (PLA) structures in the preferred embodiment. PLA structures are well known by those skilled in the art. For example, see "PLAs Enhance Digital Processor Speed and Cut Component Count", by George Reyling, *Electronics,* Aug. 8, 1974, p. 109. In response to the macro instruction stored by register 54, decoder 58 provides a first starting address at an output $A_1$ which is coupled to multiplexer 112.

Exception logic block 66 is coupled to the output of illegal instruction decoder 62, the output of BUS I/O logic block 68 and the output of interrupt and exception block 70. Bus I/O logic block 68 is used to detect bus and address errors. A bus error may indicate to the data processor that a peripheral device (e.g., a memory) addressed by the data processor has not responded within an allowable period of time. An address error may indicate that an illegal address has been placed on the external address bus.

Interrupt and exception block 70 indicates such things as the occurrence of interrupts, the occurrence of a reset condition, and a trace mode of operation. An interrupt condition may occur when a peripheral device indicates that it is ready to transmit data to the data processor. The reset condition may indicate that the power supply to the data processor has just been activated such that internal registers must be reset or that a reset button has been depressed in order to recover from a system failure. A trace mode of operation may indicate that a tracing routine is to be performed after the execution of each macroinstruction in order to facilitate instruction-by-instruction tracing of a program being debugged.

Illegal instruction decode block 62 indicates illegal macroinstruction formats as well as privilege violations.

An illegal instruction format is one to which the data processor is not designed to respond. The privilege violation condition refers to a feature of the data processor which allows operation in supervisor and user modes. Certain instructions may be executed only when the data processor is in a supervisor mode, and the privilege violation condition arises upon the attempted execution of one of these special instructions while in the user mode of operation.

All of the above mentioned special conditions require that the data processor temporarily stop executing macroinstructions in order to execute special microinstruction routines for dealing with the occurrence of the particular special condition. If some of the special conditions (e.g., interrupt, trace) arise, the data processor proceeds normally until it reaches the next instruction boundary, i.e., the processor completes the execution of the current macroinstruction prior to branching to the special microinstruction routine. However, when other special conditions (e.g., address error, bus error, reset) arise, the data processor immediately branches to one of the special microinstruction routines without completing the current macroinstruction, since the occurrence of the special condition may prevent successful execution of the current macroinstruction.

Still referring to FIG. 5, exception logic block 66 includes an output $A_0$ which is coupled over line 71 to multiplexer 112 for supplying a special microroutine starting address. Exception logic block 66 also includes output $A_0$SUB which is coupled to multiplexer 112 for determining whether starting address $A_0$ or starting address $A_1$ is to be selected as the output of multiplexer 112. Starting address $A_0$ is selected upon the occurrence of special conditions of the type which await the completion of the execution of the current macroinstruction before causing control to be transferred to the special microinstruction routine.

The output of multiplexer 112 is coupled to the $A_1/A_0$ input of multiplexer 114. Decoder 60, in response to the macroinstruction stored by register 54, provides second and third starting addresses at output $A_2$ and $A_3$ which are coupled to the $A_2$ and $A_3$ inputs of multiplexer 114, respectively. Multiplexer 114 also includes a BA input which is coupled to line 116 for receiving a branch address from the micro ROM. Each of the addresses received by multiplexer 114 is 10-bits wide.

The output of multiplexer 114 provides a selected address having 10-bits and is coupled to a first input of multiplexer 117 for supplying two of the ten output bits. The output of multiplexer 114 is also coupled to a first input of multiplexer 118 for supplying the other eight bits of the selected address directly to multiplexer 118. Branch control logic 80 is coupled to a second input of multiplexer 117 for supplying two branch bits. The output of multiplexer 117 is coupled to multiplexer 118 for supplying two selected bits to be used in conjunction with the eight bits supplied directly from multiplexer 114, thereby allowing for a four-way branch.

Exception logic 66 includes an output $A_0$S which is coupled to a second input of multiplexer 118 for supplying a second special microroutine starting address. Exception logic 66 also includes an output $A_0$SUBI which is coupled to the control input of multiplexer 118 and which causes special address $A_0$S to be selected at the output of multiplexer 118 in the event that an address error, bus error, or reset condition has been detected. In the absence of such a condition, multiplexer 118 provides at its output the address selected by multiplexer 114 in combination with multiplexer 117. The output of multiplexer 118 is coupled to the address input ports of the micro ROM and nano ROM (72, 73 in FIG. 4).

FIG. 5 also includes three conductors 120, 122, and 124 which are coupled to the output of the micro ROM latch (latch 74 in FIG. 4), each of the conductors receiving a bit in the selected micro word. Conductor 120 is coupled to a control input of multiplexer 117 for indicating a conditional branch point in the micro instruction routine. Conductors 120, 122, and 124 are coupled to decoder 126, and the output of decoder 126 is coupled to a control input of multiplexer 114 for causing the proper address to be selected at the output of multiplexer 114. The relationship between the microword bits conducted by conductors 120, 122, and 124 and the address selected by multiplexers 114 and 117 will be described in further detail hereinafter. It will be sufficient to realize at this point that the signals conducted by conductors 120, 122, and 124, and the address conducted by line 116 are all derived from the microword addressed during the previous micro cycle.

Figure 6:
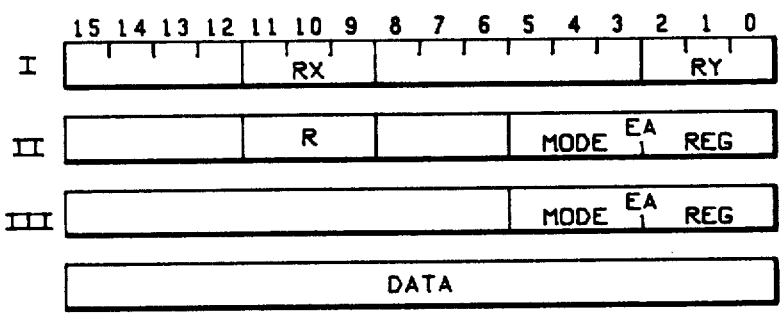
FIG. 6 illustrates several formats for macroinstructions which are processed by the data processor.

In order to understand the advantages provided by the instruction register sequence decoder, it will be helpful to describe the various types of macroinstructions which can be executed by the data processor illustrated in FIG. 2. In FIG. 6, three different types of macroinstruction formats are illustrated (I, II, III). Instruction I is a register-to-register type instruction in which bits 0, 1, and 2 specify a source register ($R_Y$) and bits 9, 10, and 11 specify a destination register ($R_X$). The remainder of the bits in the 16-bit instruction word identify the type of operation to be performed (add, subtract, etc.) and identify this instruction as one which uses register-to-register type addressing.

In instruction format II, bits 0 through 5 are an effective address field or simply an effective address (EA). The EA is composed of two 3-bit subfields which are the mode specification field and the register specification field. In general, the register specification field selects a particular register; the mode specification field determines whether the selected register is an address register or a data register and also specifies the manner in which the address of the desired operand is to be computed based upon the specified register. For a typical type II instruction, the EA field specifies the source operand, while bits 9, 10, and 11 specify one of the internal registers as the destination operand. The remainder of the bits in the 16-bit instruction specify the type of operation to be performed and indicate that this instruction is a type II instruction.

In type III instructions, the instruction may be composed of two or more 16-bit words wherein bits 0 through 5 of the first 16-bit word specify the effective address of a destination operand as previously described for type II instructions. However, the remainder of the bits in the first word of type III instructions indicate that the instruction includes a second 16-bit word which contains the data to be used in conjunction with the destination operand in order to perform the operation. Type III instructions use effective addressing to obtain the destination operand and so-called "immediate addressing" to obtain a second operand which is stored in a memory location immediately following the memory location from which the first word of the instruction was obtained.

In order to execute type I instructions, the data processor can immediately begin performing a microinstruction routine specifically designed to execute the type of operation indicated by the instruction word, since the operands are already contained by internal registers of the data processor. For type II instructions, however, a generalized effective address microinstruction routine must be performed in order to access the operand referenced by the EA field prior to executing a specific microinstruction routine used to perform the operation indicated by the macroinstruction. For immediate-type instructions, a pre-fetch operation results in the immediate operand being stored in both IRC register 52 and in a data bus input latch located within DATA BUFFERS block 46 (see FIG. 4). Thus, in type III instructions, a first generalized microinstruction routine must be performed in order to transfer the immediate operand from the data bus input latch to a temporary register in the execution unit and in order to repeat the pre-fetch operation such that the next macroinstruction is loaded into IRC register 52. Then, the generalized routine described with regard to type II instructions must be performed in order to obtain the operand referenced by the EA field. Finally, after the EA microinstruction routine has been completed, a specific microinstruction routine must be executed in order to perform the operation indicated by the first word of the instruction. The effective address microinstruction routines can be generalized because all type II and type III instructions use the same EA format. Similarly, the immediate addressing microinstruction routine can be generalized because all type III instructions access immediate operands in the same manner.

With reference to FIG. 5, the operation of decoders 58 and 60 and exception logic 66 within the instruction register sequence decoder 110 will be described by referring to FIGS. 7A, 7B, 7C, and 7D. In normal operation, multiplexer 114 chooses starting address $A_1/A_0$ to point to the first microinstruction routine required to execute the macroinstruction presently stored in IR register 54. Starting address $A_1/A_0$ is selected at instruction boundaries because the very last microinstruction performed during the execution of the previous macroinstruction indicates, by way of decoder 126, that $A_1$ should be selected as the next starting address.

In the event that a special condition arises during the execution of a macroinstruction, exception logic 66 enables the $A_0SUB$ output such that the multiplexer 112 will substitute starting address $A_0$ in place of starting address $A_1$ when execution of the current macroinstruction is completed. Some of the special conditions require initiation of a special microinstruction routine without waiting for the execution of the previous macroinstruction to be completed. In this case, exception logic 66 enables the $A_0SUBI$ output which immediately causes starting address $A_0S$ on line 71' to be selected by multiplexer 118 as the next address for the micro control store in order to cause a branch to a special microroutine.

As shown in FIG. 7A, starting addresses $A_0$ and $A_0S$ reference one of several special microinstruction routines in order to deal with the specific special condition that has arisen. A common feature of each of the special microroutines is that the last microword in each routine causes the signals conducted by conductors 120, 122, and 124 in FIG. 5 to specify to multiplexer 114 that starting address $A_1$ is the next address to be input to the micro control store.

As is shown in FIG. 7B, starting address $A_1$ may reference a generalized immediate routine, a generalized effective address routine, or a specific operation routine depending upon the type of instruction presently stored in the instruction register. Each of these routines accomplishes a separate function, and the transfer of control from one routine to another may be referred to as functional branching. For example, starting address $A_1$ will reference a specific operation routine if the instruction register has stored a type I instruction (see FIG. 6). In this event, the $A_2$ and $A_3$ addresses output by $A_2/A_3$ decoder 60 in FIG. 5 are "don't care" conditions, which simplifies the PLA structure used to implement the decoder. Starting address $A_1$ will reference an effective address routine or an immediate routine if the instruction stored by the instruction register is a type II instruction or a type III instruction, respectively. In addition to performing the desired operation, each of the specific operation routines is effective to transfer a prefetched macroinstruction word from IRC register 52 to IR register 54 and to fetch a subsequent macroinstruction word and store it in IRC register 52. The macroinstruction word is prefetched far enough in advance to ensure that the starting addresses output from $A_1$ and $A_2/A_3$ decoders 58 and 60 are valid at the appropriate time. In addition, the last microword in each of the specific operation routines specifies that starting address $A_1$ is to be selected as the next address input to the micro control store. Each of the effective address routines concludes with a microword which specifies that starting address $A_3$ is to be selected as the next address. Starting address $A_3$ always points to a specific operation routine, as is shown in FIG. 7D. The last microword in all immediate routines causes starting address $A_2$ to be selected as the next address.

As is shown in FIG. 7C, starting address $A_2$ may reference either an effective address routine or a specific operation routine. A type III instruction (see FIG. 6) would result in starting address $A_2$ causing a branch to an effective address routine. Although not shown in FIG. 6, another type of instruction may require immediate addressing without also including an effective address field. For this type of instruction, starting address $A_2$ would reference a specific operation routine.

Thus, in order to execute a type III instruction, starting address $A_1$ is selected first which initiates a generalized microinstruction routine for processing an immediate operand. The last microword in the immmediate microroutine selects $A_2$ as the next starting address which causes a direct branch to an effective address microroutine for acquiring a second operand. At the completion of the effective address routine, starting address $A_3$ is selected which causes a direct branch to a microinstruction routine for performing the desired operation and for transferring the next macroinstruction into the instruction register. At the completion of the specific operation routine, starting address $A_1$ is selected in order to begin execution of the next macroinstruction.

In Appendix F, all of the macroinstructions which are performed by the preferred embodiment of the data processor are described. In Appendix G, a breakdown of the op-codes is listed for all of the macroinstructions listed in Appendix F. FIGS. 22A–22U tabulate the starting addresses A1, A2, and A3 for each macroinstruction op-code. The starting addresses tabulated in FIGS. 22A—22U are given in terms of the label of the microword addressed. The microword labels are tabulated in Appendix A. In FIGS. 22A–22U, the 4-bit code in the upper left corner corresponds to bits 15-12 of the macroinstruction. The 6-bit code to the right of each row corresponds to bits 11-6 of the macroinstruction. The 6-bit code at the bottom of each column corresponds to bits 5-0 of the macroinstruction. The columns generally correspond to the various addressing modes for each macroinstruction. RYD and RYA indicate that the operand is the contents of the designated address or data register. (RYA) indicates that the address of the operand is in the designated address register. (RYA)+ and −(RYA) indicate a post-increment and pre-decrement mode wherein the designated address register is either incremented after or decremented before the operand address is used. (RYA)+$d_{16}$ and (RYA)+(X)+$d_8$ refer to adding a 16-bit displacement to the designated address register in order to specify the operand address or adding an index register and an 8-bit displacement to the designated address register in order to specify the operand address. ABSW and ABSL indicate that the operand address is either the 16-bit word or 32-bit double-word which follows the first word of the macroinstruction in the program memory. (PC)+$d_{16}$ and (PC)+(X)+$d_8$ indicate that the operand address is either the contents of the program counter plus a 16-bit displacement or the contents of the program counter plus an index register plus an 8-bit displacement. The column labelled "#" specifies that the operand is an immediate value which may be a 16-bit word or a 32-bit double-word which follows the first word of the macroinstruction in the program memory.

TWO-LEVEL MICROPROGRAMMED CONTROL UNIT

In FIG. 4, a two-level microprogrammed control unit is illustrated which includes micro ROM 72 and nano ROM 73. The micro ROM is used to direct sequencing in the control unit. Micro ROM 72 in FIG. 4 contains 544 microwords each having 17 bits. The micro ROM is addressed by the 10-bit output of address selection block 64 such that up to 1024 microwords could be addressed. However, the preferred embodiment of the data processor requires only 544 microwords. The microwords are arranged in either of two formats which are illustrated in FIG. 8. Format I in FIG. 8 is the format for all types of microwords other than those which allow conditional branching, while format II is the format for microwords which provide conditional branching. In format I, bit 1 is a "0", while in format II, bit 1 is a "1" such that bit 1 distinguishes the two possible formats. For conditional branch type microwords (format II), bits 2 thru 6 comprise a conditional branch choice field (CBC) and specify one of 32 possible branch conditions. Also in conditional branch type microwords, bits 7 thru 14 comprise a next micro ROM base address (NMBA) for the micro and nano control stores. As will be explained hereinafter, the 8-bit NMBA field is augmented by 2 additional bits supplied by branch control logic in order to specify the next address for the control stores.

For microwords having format I, bits 2 and 3 comprise a type field (TY) which specifies the source of the next address for the control stores. The address is selected either from one of the 3 possible addresses provided by the instruction register sequence decoder or from a direct branch address provided by bits 5 thru 14 of the microword which comprise a 10-bit next micro ROM address field (NMA). Referring briefly to FIG. 5, the NMA and NMBA bit fields are supplied by line 116 to the BA input of multiplexer 114. Conductors 120, 122 and 124 couple bits 1, 2, and 3, respectively, to decoder 126 such that the proper source is selected by multiplexer 114 as the next address. The selection of the source of the next address is determined by the TY field according to the table shown below.

| TY (type) | bit 3 | bit 2 | abbrev | source |
|---|---|---|---|---|
| | 0 | 0 | db | NMA |
| | 0 | 1 | a1 | Address 1 |
| | 1 | 0 | a2 | Address 2 |
| | 1 | 1 | a3 | Address 3 |

Fields common to both microword formats are the function code field (FC), comprised by bits 15 and 16, and the load instruction field (I), corresponding to bit 0. The FC field specifies the function of the current microinstruction for peripheral devices external to the data processor. The significance of the FC field is indicated in the table below.

| FC (function) code) | bit 16 | bit 15 | abbrev | operation |
|---|---|---|---|---|
| | 0 | 0 | n | No Access |
| | 0 | 0 | u | Unknown Access Type |
| | 0 | 1 | d | Data Access |
| | 1 | 0 | i | Instruction Access |
| | 1 | 1 | a | Interrupt Acknowledge |

The I field (bit 0) is used to specify the micro cycle during which the instruction register is to be updated. When bit 0 is a "1", then the output of IRC register 52 is enabled into IR register 54 (see FIG. 4). Generally, this transfer is not made until the execution of the macroinstruction has proceeded into an operation type microroutine (FIGS. 7a–7d) such that the instruction register sequence decoder can begin to generate starting addresses for the next macroinstruction to be executed.

For microwords of the type having format II, bit 4 is included in the CBC field for selecting the appropriate branch condition. However, for microwords of the type having format I, bit 4 is not included in any of the previously described bit fields. In the preferred embodiment of the data processor, bit 4 is used in conjunction with bit 0 to control not only the loading of the instruction register but also the updating of a trap vector number (TVN) encoder. Referring briefly to FIG. 5, exception logic block 66 includes a series of latches for storing the status of the various special conditions such as interrupt pending, trace pending, address error, etc. The outputs of these latches are coupled to a decoder which generates the $A_0$ and $A_0S$ starting addresses. Two different latch enable signals are provided for independently latching two groups of these latches. The first group of latches monitors the special conditions which do not await an instruction boundary before diverting control in the micro ROM. The second group of latches monitors the remainder of the special conditions. To update the TVN encoder, both groups of latches are clocked such that the output of each of these latches corresponds to the signals presented to the inputs of these latches. To partially update the TVN encoder, only one of the two clock enable signals is pulsed such that only those latches coupled to this clock enable signal are allowed to take note of signals currently presented to their inputs. For microwords of the type having format I, the loading of the instruction register and the updating of the TVN encoder are specified according to the table shown below.

| C,1 | bit 4 | bit 0 | abrev | result |
|---|---|---|---|---|
| | 0 | 0 | db | update neither IR nor TVN |
| | 0 | 1 | dbi | IRC to IR, update TVN |
| | 1 | 0 | dbc | IRC to IR, don't update TVN |
| | 1 | 1 | dbl | IRC to IR, partially update TVN |

The 544 microwords stored in the micro ROM are tabulated in appendix A which follows the detailed description of the invention. The table in appendix A lists for each micro word a LABEL, the corresponding function code (FC), the associated next micro control store address (NMA) for direct branch type microwords, a TYPE for selecting the source of the next address, and a conditional branch choice (CBC) for conditional branch type microwords. Also indicated in this table under the column entitled ORIGIN are instances where a microword is associated with the same nanoword in the nano control store as is a previously listed microword. The table further includes a column entitled ROW which indicates those microwords which are destinations of conditional branch type microwords. The placement of these microwords, which serve as destinations for conditional branches, is restricted since the branch address is comprised of an 8-bit base address plus a 2-bit branch field generated by branch control logic. Thus, two microwords which serve as alternate destinations for a particular conditional branch type microword must be placed in the same logical row of the micro ROM. The table also includes a column entitled DESTINATIONS which lists the microwords which are potential destinations for each of the conditional branch type microwords.

As is shown in FIG. 4, the nano control store, or nano ROM, is addressed by the same address which is used to address the micro control store, or micro ROM. Access in the nano control store is either to a single word or a logical row of words (with subsequent conditional selection of a single word in that row). Access to the nano control store is concurrent with access to the micro control store. However, while there is a one-to-one mapping in the micro control store between addresses and unique microwords, there is a many-to-one mapping of control store addresses to unique nanowords. It is possible therefore for several unique microwords to share the same nanoword.

A nanoword consists of fields of functionally encoded control signals which are decoded by the control logic (block 12 in FIG. 2) to drive the control points in the execution unit for operation of bus switches, source and destination registers, temporary locations, special function units, and input/output devices. In the data processor constructed according to the preferred embodiment of the invention, each nanoword is 68 bits wide and is decoded to drive approximately 180 control points within the execution unit. The number of unique nanowords in the nano control store is 336, while the number of unique microwords in the micro control store is 544.

Since each nanoword is uniquely specified by its address, it would be possible to directly decode addresses to the nano control store in order to generate control words. This would eliminate the need for the nano control store but would greatly increase the amount of decoding logic in control block 12 of FIG. 2. At the other extreme, each control point could have an associated bit in the nanoword and no decoding of the nanoword would be necessary at all. In practice, some chip area between the control store and the execution unit must be allocated to combine timing information and to align control word outputs with associated control points within the execution unit. It is possible to provide about three gate levels of decoding in this chip area at very little cost. The control word in the preferred embodiment of the data processor is field-encoded in a manner which permits functional definition of fields and relatively simple decoding.

Minimization of the number of unique control words, or nano words, is facilitated by moving operands and addresses into temporary locations early in the instruction routine. This tends to make later cycles in different instructions look more alike. Instruction set design and programming of the control unit also influence the number of nanowords. Additionally, there is a trade-off between execution efficiency and the number of unique nanowords required. The more time allowed for execution, the better the chance of making various instructions look alike.

Figure 9:
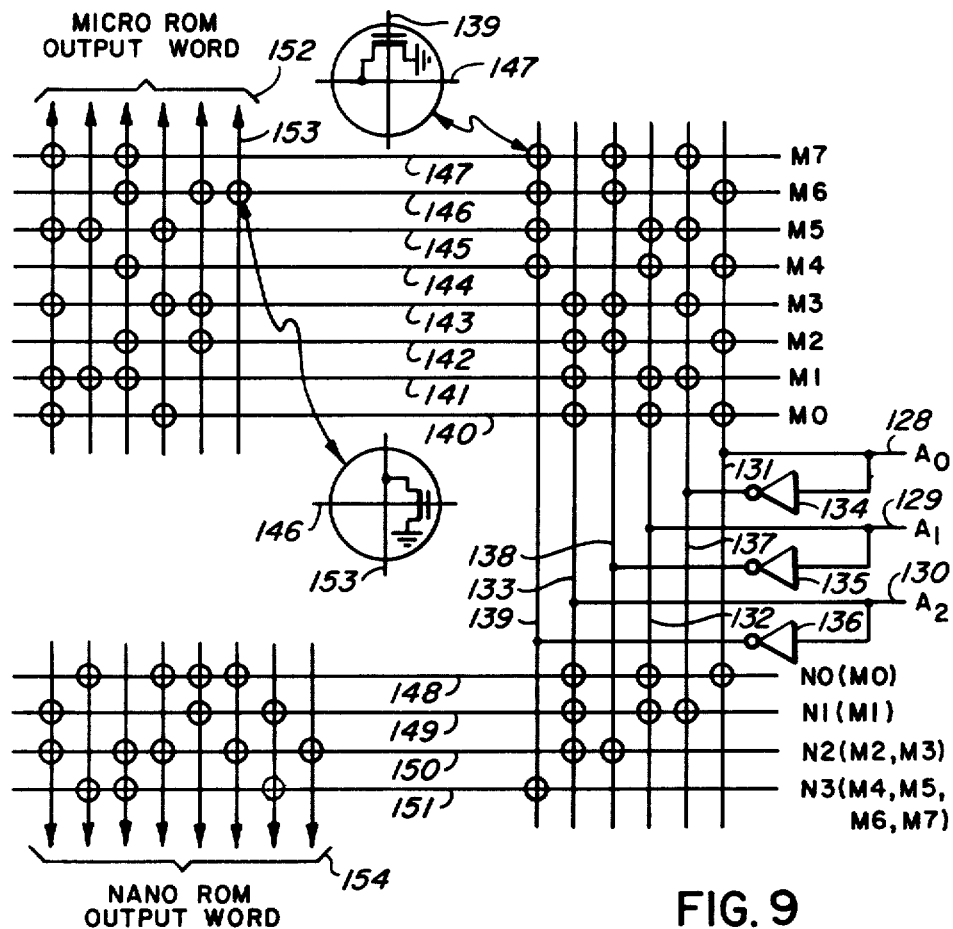
FIG. 9 illustrates a simplified programmed logic array (PLA) structure which can be used to implement the micro control store and nano control store for the data processor.

In FIG. 9, circuitry is illustrated for constructing a control store having a micro ROM and a nano ROM which are addressed simultaneously by the same address. For the purpose of simplifying the illustration, the control store in FIG. 9 receives a 3-bit address which accesses a 6-bit microword in the micro ROM and an 8-bit nanoword in the nano ROM. Three address bits ($A_0$, $A_1$, $A_2$) are received by conductors 128, 129, and 130 which are coupled to address conductors 131, 132, and 133, respectively. Conductors 128, 129, and 130 are also coupled to the inputs of inverters 134, 135, and 136, respectively. The output of inverter 134, the output of inverter 135, and the output of inverter 136 is each coupled to address conductor 137, 138, and 139, respectively. The micro ROM includes eight word lines (140-147) which are labeled M0 thru M7 in FIG. 9. Similarly, the nano ROM includes 4 word lines (148-151) which are labeled N0 thru N3. A micro ROM word line decoder is formed at the intersection of address conductors 131-133 and 137-139 and micro ROM word lines 140-147. At particular intersections of an address conductor and a word line, a bubble is illustrated such as that shown at the intersection of address conductor 139 and word line 147. The expanded drawing of the bubble at this intersection shown in FIG. 9 illustrates that a MOSFET is coupled between the word line and ground such that the word line is grounded when the address conductor is enabled. A plurality of microword columns designated generally at 152, and including column 153, intersects the micro ROM word lines 140-147 for generating a micro ROM output word. At particular intersections of the microword columns and word lines, a bubble is indicated such as that shown at the intersection of word line 146 and column 153. The expanded drawing of the bubble corresponding to this intersection illustrated in FIG. 9 indicates that a MOSFET is coupled between column 153 and ground for causing the column to be grounded when the word line is selected.

Similarly, in the nano ROM, the intersection of address conductors 131-133 and 137-139 with nano ROM word lines 148-151 forms a nano ROM word line decoder. A plurality of columns designated generally 154 intersects the nano ROM word lines for generating a nano ROM output word.

The micro ROM and nano ROM word line decoders in FIG. 9 are constructed such that the selection of word line 140 (M0) in the micro ROM also causes the selection of word line 148 (N0) in the nano ROM. Similarly, the selection of word line 141 (M1) causes the selection of word line 149 (N1). However, the selection of either word line 142 or word line 143 (M2, M3) in the micro ROM will cause word line 150 (N2) to be selected in the nano ROM. Also, the selection of any of word lines 144, 145, 146, and 147 (M4-M7) in the micro ROM will cause word line 151 (N3) to be selected in the nano ROM.

To summarize the operation of the circuitry in FIG. 9, the same address is presented to the decoders of both the micro ROM and the nano ROM. For any input address, there will be no more than one word line in each ROM which remains high. The line which remains high will cause the appropriate output value to be generated as the micro ROM output word and the nano ROM output word according to the coding at the intersection of the selected word line and the output columns. Each word line in the micro ROM is represented by only one input address. Each word line in the nano ROM however may represent one, two, or four possible different input addresses. In the preferred embodiment of the data processor, a word line in the nano ROM may represent as many as eight different input addresses. Each of the word lines in the micro ROM has a corresponding word line in the nano ROM. However, the number of bits in the microword generated by the micro ROM is completely independent from the number bits in the nanoword generated by the nano ROM. It is this feature which results in an overall reduction in the size of the control store.

In FIGS. 10A-10D, the location of each microword within the micro ROM is illustrated. Each of the microword labels listed in Appendix A is shown at a particular address within FIGS. 10A-10D. Slightly fewer than half of the locations are blank since only 544 of the possible 1,024 locations are used in the preferred embodiment.

In FIGS. 11A-11F, the location of each of the nanowords within the nano ROM is illustrated. The label used for each of the nanowords is the same as the label associated with a microword at a corresponding address within the micro ROM. As an example, assume that the current micro control store address (A9-A0) is the 10-bit code 01 11 10 00 10. This address references the location labeled ablw1 in the micro ROM as is shown in FIG. 10B. This same address references the location labeled ablw1 in the nano ROM as shown in FIG. 11D. As is indicated in the column labeled ORIGIN in Appendix A, other microwords which refer to the same nanoword location include abll1, ralw1, rall1, jsal1, jmal1, paal1, and unlk2.

Figure 12:
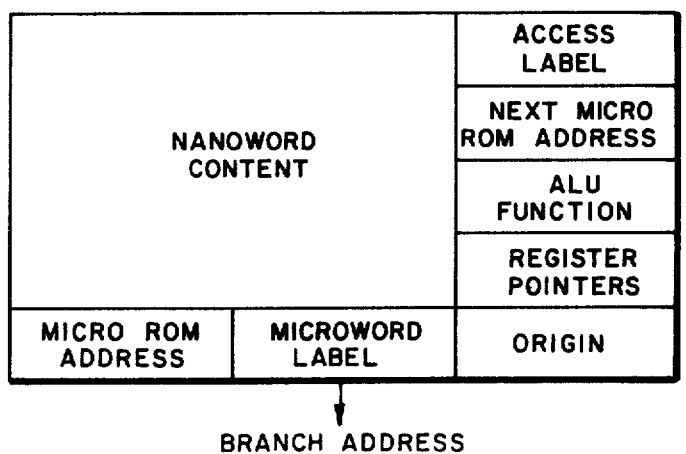
FIG. 12 is a key block which explains the microword blocks illustrated in FIGS. 13A-13CN.

In FIG. 12, a block is illustrated which may serve as a key for interpreting the microword blocks illustrated in FIGS. 13A-13CN. The portion of the key block labeled MICROROM ADDRESS in FIG. 12 is a hexadecimal number corresponding to the 10-bit address in the micro ROM where the particular microword is located. The portions of the key block labeled MICRO WORD LABEL and ORIGIN correspond to the identification of each microword used in Appendix A. The portion of the key block labeled NEXT MICROROM ADDRESS specifies how the next micro control store address is to be selected, whether a branch will be direct or conditional and whether the instruction register and trap vector number (TVN) encoder will be updated. The key to the coding used in this portion of the key block is given below.

| NEXT MICROROM ADDRESS | |
|---|---|
| Key | Meaning |
| a1 | starting address $A_1$ |
| a2 | starting address $A_2$ |
| a3 | starting address $A_3$ |
| bc | conditional branch |
| bci | conditional branch, (IRC) IR |
| db | direct branch |
| dbc | direct branch, (IRC)→ IR, update TVN |
| dbi | direct branch, (IRC)→ IR |
| dbl | direct branch, (IRC)→ IR, partially update TVN |

The portion of the key block labeled ACCESS LABEL is used to convey information about the access class, access mode, and access type for each microword block. The first character in the access label can be one of four types as explained in the table below.

| ACCESS CLASS | |
|---|---|
| character | meaning |
| i | initiate |
| f | finish |
| n | no access |
| t | total |

Initiate indicates that the data processor has begun an external access operation during the current microcycle but that the data processor need not wait for the external access operation to be completed before proceeding to the next microword block. Finish indicates that an access was initiated on a previous microcycle and that the external access operation may be completed during the current microcycle. No access indicates that an access operation is not pending during the current micorocycle. Total indicates that the data processor must both initiate and finish an access to an external device during the current microcycle. The data processor includes circuitry (not shown) for interfacing the data processor to external devices. This circuitry is designed to transmit and receive handshake signals which allow the data processor to recognize the completion of an access operation. This circuitry inhibits the data processor from proceeding to the next microcycle for the finish and total access classes until the access operation has been successfully completed.

The second character in the access label can be one of three characters shown below.

| ACCESS MODE | |
|---|---|
| character | meaning |
| p | process only |
| r | read |
| w | write |

Process only indicates that no access is pending during the current microcycle. Read and write indicate whether the data processor is to receive or transmit information during the external access operation.

The remaining two characters of the access label correspond to the access type according to the table below.

| ACCESS TYPE | |
|---|---|
| characters | meaning |
| ak | interrupt acknowledge |
| im | immediate |
| in | instruction |
| ix | immediate or instruction |
| op | operand |
| uk | unknown |

Interrupt acknowledge indicates that the current external access operation is to obtain a vector number from an external peripheral device which has interrupted the data processor. Immediate and instruction indicate that the external access operation pending during the current microcycle is to obtain an immediate word or instruction word, respectively. The "ix" designation indicates that the word being accessed during the current microcycle is either an immediate word or an instruction word since the particular micorword block may be encountered in either of these circumstances. Operand indicates that the pending external access operation involves data being read by or written from the data processor. The designation unknown indicates that it can not be determined whether the pending external access operation involves an immediate word, an instruction word, or an operand word. It should be realized by those skilled in the art that from the information contained within the access label, the function code (FC) field, shown as bits 15 and 16 in FIG. 8, is determined.

The portion of the key block in FIG. 12 labeled REGISTER POINTERS is a 4-character key which specifies the destination and source registers in the execution unit which are enabled during the current microcycle. The first two characters are one of the six possibilities listed below.

| DESTINATION REGISTER DECODE | |
|---|---|
| characters | meaning |
| dt | data temporary register |
| dx | don't care |
| rx | Rx field in macroinstruction |
| sp | user or supervisor stack pointer |
| uk | unknown |
| us | user stack pointer |

Similarly, the third and fourth characters in the REGISTER POINTERS key designate the source register which can be one of the six possibilities listed below.

| SOURCE REGISTER DECODE | |
|---|---|
| characters | meaning |
| dt | data temporary register |
| dy | don't care |
| pc | program counter |
| ry | Ry field in macroinstruction |
| py | program counter or Ry field |
| uk | unknown |

The significance of the portion of the key block in FIG. 12 labeled ALU FUNCTION will be explained hereinafter. The largest portion of the key block is labeled NANOWORD CONTENT which indicates the transfers of information which are enabled within the execution unit during each microcycle. For those microword blocks in which the microword label is not the same as the origin, the execution unit transfers enabled by the nanoword will be the same as those listed for the microword block which is deemed to be the origin. The abbreviations used within the nanoword content portion of each microword block are explained in Appendix B which follows the detailed description.

Appendix H illustrates the operations performed by each of the microwords. Each of the microword blocks is interpreted according to the key block shown in FIG. 12.

Use of temporary storage and routine sharing are the two basic techniques used to facilitate microroutine minimization. Temporary storage can be used to advantage if operands and addresses are moved into temporary locations early in the instruction microroutine. This makes later control words in the routine more homogenous and often permits routines to join, which can save considerable space in the control store. Routine sharing is facilitated by the following:

1. Incomplete translation of macroinstruction words by the control store allows extracted fields in the macroinstruction words to specify ALU functions and register selection. Instructions for various functions which require similar computational operations share the same microroutine.

2. During execution of immediate type macroinstructions, the immediate value is fetched and placed in a data temporary register, thereby allowing macroinstructions involving immediate values to share the register-to-memory and register-to-register microroutines already available.

3. The functional branching concept already described allows the various addressing modes to be shared by most single and dual operand macroinstructions which require an operand not already contained within the data processor.

The general micro and nano control store concept allows different microroutine sequences (made up of relatively short control words) to share many of the same nano control words (which are much wider). Each macroinstruction received by the instruction register is emulated by a sequence of microwords. Only one copy of each unique nanowood need be stored in the nano control store, no matter how many times it is referred to by various microroutines.

CONDITIONAL BRANCH LOGIC

Two distinct types of conditional branches are implemented in the control unit of the data porcessor. One type of conditional branch is that which is implicit in an instruction and which must be specified uniquely by a microword. Examples of this first type of conditional branch are iterative routines such as multiply and divide operations which require several different conditional branches during execution of the macroinstruction although the macroinstruction does not specify these branches directly. The second type of conditional branch is that which is explicit to the macroinstrucion. Set conditionally ($S_{CC}$) and branch on condition ($B_{CC}$) are examples of the second type of macroinstruction.

Figure 13:
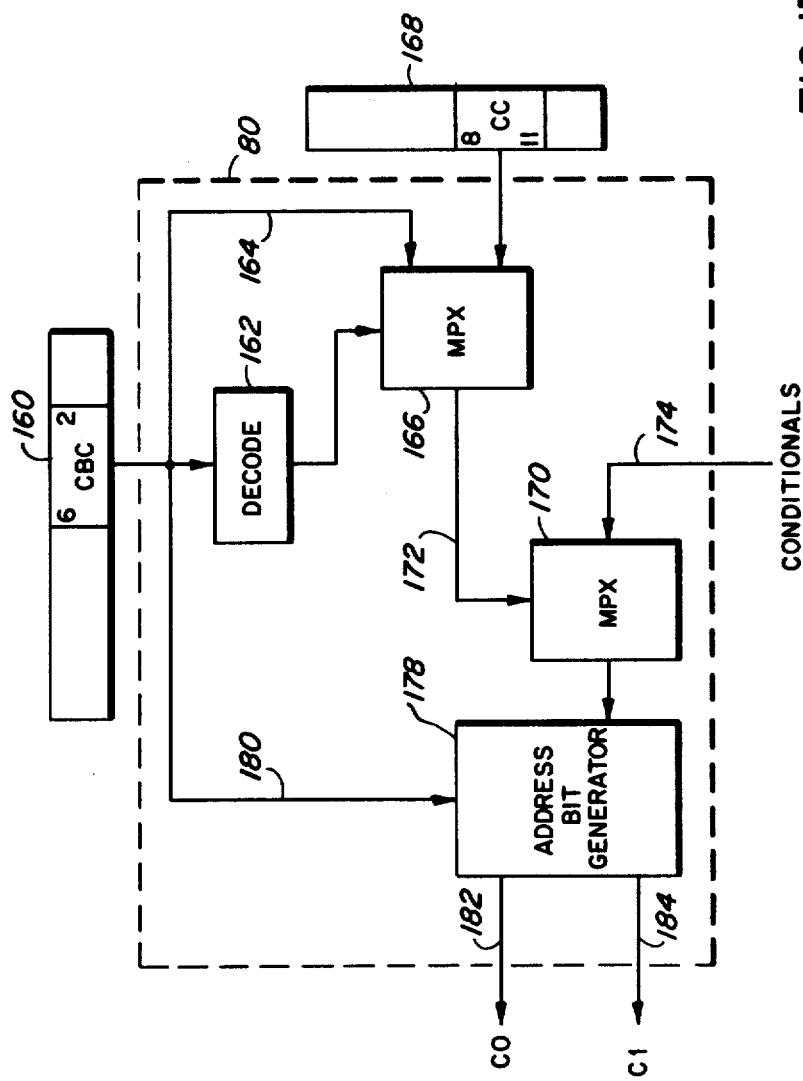
FIG. 13 is a block diagram which illustrates the conditional branch logic unit used within the data processor for controlling conditional branches within the control store.

In FIG. 13, a block diagram is shown which illustrates the overall function of a conditional branch control network. Block 160, which corresponds to the micro ROM output latch 74 in FIG. 4, stores a microword which includes a 5-bit CBC field (bits 6-2) for controlling a conditional branch operation, as was explained with regard to FIG. 8, format II. The portion of block 160 which contains the CBC field is coupled to a decoder 162 which determines whether the branch condition is implicit in the macroinstruction or is explicit in the macroinstruction. The portion of block 160 which contains the CBC field is also coupled by line 164 to a first input of multiplexer 166. The second input of multiplexer 166 is coupled to block 168, which corresponds to IRD register 56 in FIG. 4. The 4-bit CC field (bits 11-8) in block 168 correspond to the macroinstruction bit field which specifies the conditions to be tested when executing the set conditionally $S_{CC}$ and branch on condition $B_{CC}$ macroinstructions. The output of decoder 162 is coupled to a selection input of multiplexer 166 for selecting either the CBC field in the microword or the CC field in the macroinstruction as the output of multiplexer 166. By allowing the CBC field to defer the selection of conditions to the macroinstruction word itself, a single routine in the macro control store can be used to execute all of the explicit conditional branch type macroinstructions.

The output of multiplexer 166 is coupled to a selection input of multiplexer 170 by line 172. Multiplexer 170 is also coupled to line 174 for receiving conditional signals from various portions of the data processor. Multiplexer 170 selects the appropriate conditional signals for transmission to address bit generator 178. The portion of block 160 which contains the CBC field is also coupled to a control input of address bit generator 178 by line 180. Address bit generator 178 provides a 2-bit output (C0, C1) on lines 182 and 184. Output lines 182 and 184 are coupled from branch control logic 80 to multiplexer 116, as shown in FIG. 5. In response to the signal coupled to the control input by line 180, the address bit generator selects one of two possible output combinations for C0 and C1 associated with the conditional signals selected by multiplexer 170.

Conditional branches present a problem because the accesses to the micro and nano control store for the next control word are overlapped with execution of the current control word. To compensate for the time delay, a cycle is allowed in programming the microroutines. In addition, the microroutines are programmed to make the mose likely path the most efficient. For example, decrement and branch if not zero instruction is assumed to heavily favor the branch situation, so the microroutine computes the destination address and initiates a fetch during the execution of the decrement, test, and replace computation.

Conditional branch delays are further reduced by providing a base address in the microword (NMBA in FIG. 8, format II) which can be used to initiate access to a logical row of control words. Subsequent selection of the appropriate word within the row is specified by the C0 and C1 bits output from conditional branch logic 80 in FIG. 13. In the preferred embodiment, a logical row includes four control words, one of which is selected by C0 and C1. This allows single level implementation of four-way branches. In the preferred implementation of the data processor, no macroinstruction requires more than a four-way branch at any point in the microroutine. Since a logical row is accessed for conditional branches, all of the destination control words must be on the same logical row, which somewhat restricts the location of words within the micro and nano control stores.

An illustration of a four-way conditional branch is associated with the microword labeled mu1m4 in Appendix A. For the microword labeled mu1m4, the column entitled DESTINATIONS includes mu1m6, mu1m4, mu1m3, and mu1m5 as potential branch destinations. Referring briefly to FIG. 10A, it will be seen that each of the four potential destinations has an address which corresponds to 00 XX 10 10 01 (A9-A0). The address for each of the destinations is the same except for bit 7 and bit 6. Thus, these four microwords are located within one logical row of the micro control store and one microword within the row is selected by bits 6 and 7 of the control store address. Similarly, in the nano control store, the nanowords corresponding to the four potential destinations comprise one logical row within the nano control store. Thus, the C0 and C1 bits provided by address bit generator 178 in FIG. 13 ultimately become bit 7 and bit 6 of the micro control store address.

In Appendix C which follows the detailed description, a table lists the various conditional branch choices used by the microwords in the preferred embodiemnt of the data processor. The column labeled CBC contains the hexadecimal code for the CBC bit field (bits 6-2 of the microword). The column entitled VARIABLE specifies the conditional signal or signals upon which the branch is dependent. The column entitled SOURCE specifies the physical location from which the conditional signal or signals are derived. In Appendix D, the abbreviations used in the VARIABLE and SOURCE columns ae further explained. The column entitled VALUES shows the possible logical states of the variables upon which the branch is conditioned. The columns entitled C1 and C0 show the logical values output on conductors 184 and 182 (see FIG. 13) for each of the values or combination of values. In the column entitled REMARKS, information is given for those variables which are comprised of more than one basic conditional signal. In these instances, the order in which the basic conditional signals are listed in the REMARKS column corresponds to the order in which the bits are arranged in the VALUES column. For example, the variable nz1 is a combination of the basic conditional signals n and z such that C1 equals "0" and C0 equals "1" when n equals "1" and z equals "0".

In Appendix E a table of variables is listed which corresponds to the various branch tests which can be specified by bits 11-8 of the conditional branch ($B_{CC}$) and set conditionally ($S_{CC}$) macroinstructions. The cc column gives the hexadecimal equivalent of the four-bit field in the macroinstruction. The "abbreviation" and "meaning" columns specify the desired branch condition while the column entitled CONDITION indicates the logical combination of basic condition code signals required to implement the desired branch condition.

Figure 14A:
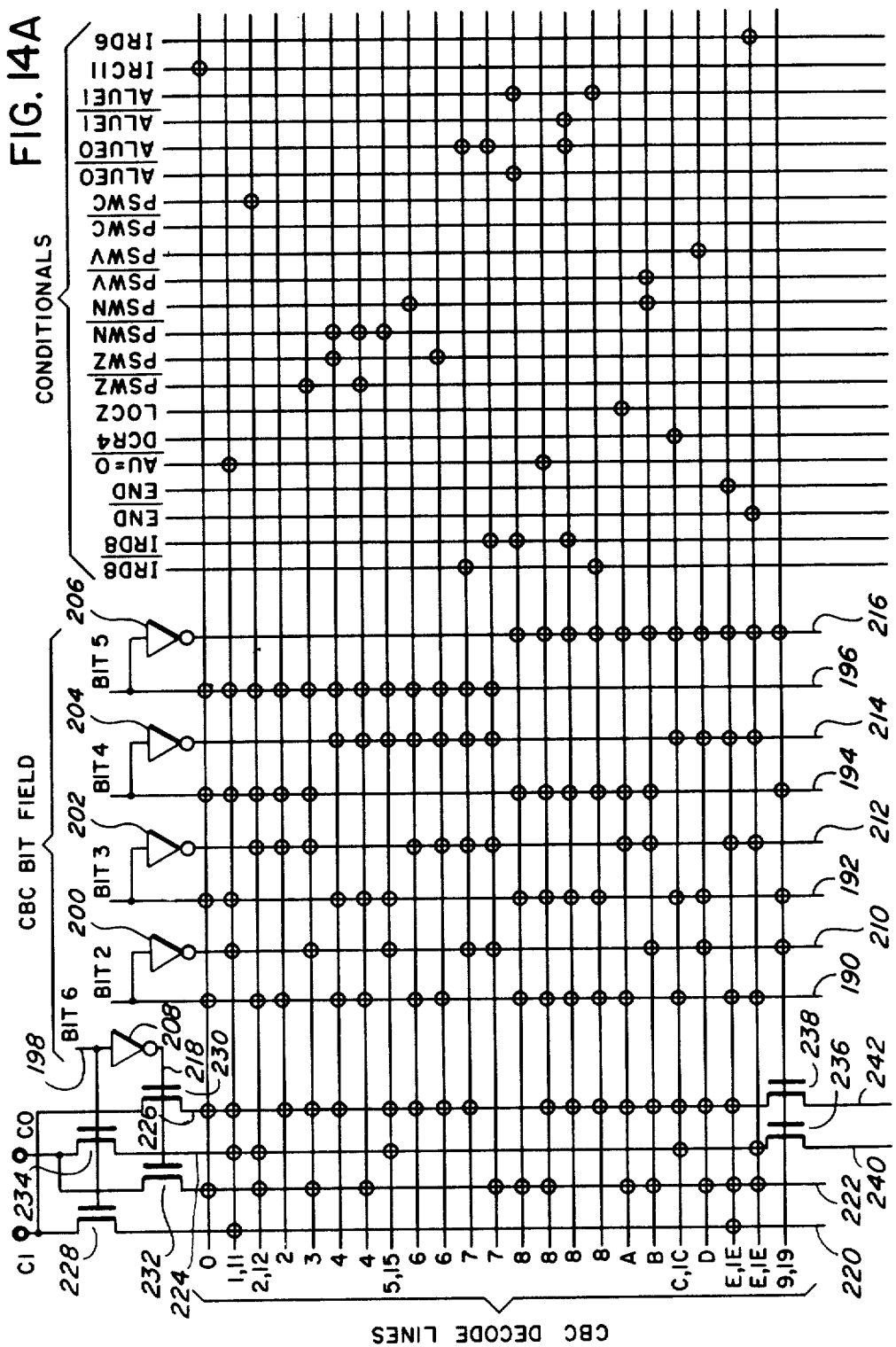

In FIGS. 14A-14B, a circuit drawing is shown which implements the branch control logic within dashed block 80 of FIG. 13. Bits 2-6 of the microword (CBC FIELD) are received by conductors 190, 192, 194, 196 and 198. Conductors 190-198 are coupled to inverters 200, 204, 206 and 208 for providing the complement of each of the bits in the CBC field on conductors 210, 212, 214, 216 and 218. Conductors 190, 192, 194 and 196 and complement conductors 210, 212, 214 and 216, corresponding to the four lesser significant bits of the CBC field, are decoded in a PLA structure similar to the one described in FIG. 9. These conductors are intersected by conductors which have been generally designated CBC decode lines which are labeled at the left-most portion of FIG. 14A. The label associated with each CBC decode line is the hexadecimal equivalent of the CBC bit field which enables that particular decode line. Some of the decode lines are labeled with two numbers such as "1, 11" indicating that the decode line is enabled regardless of the logic state of bit 6 in the CBC field. In other instances, two or more of the decode lines may have the same label, indicating that all such decode lines may be enabled simultaneously.

Also intersecting the CBC decode lines are a plurality of conductors designated generally CONDITIONALS, including IRD8, $\overline{\text{IRD8}}$ and END through IRD6. The conditional signals conducted by these lines are provided by various portions of the data processor as explained in Appendix D. The intersection of the conditionals conductors with the CBC decode lines allows the logic state of the one or more decode lines selected by CBC bits 2-5 to be determined by the conditional signals.

Also intersecting the CBC decode line are conductors 220, 222, 224 and 226. Each of these conductors will be pulled to ground level if any of the CBC decode lines with which it intersects (where an intersection is designated by a bubble) is at a high level. Conductor 220 is coupled to output terminal C1 by MOSFET 228 which is enabled when CBC bit 6 is a logic "1". Similarly, conductor 226 is coupled to output terminal C1 by MOSFET 230 which has its gate coupled to the output of inverter 208 and is enabled when CBC bit 6 is a logic "0". Conductors 222 and 224 are coupled to output terminal C0 by MOSFETS 232 and 234, respectively, which have their gate terminals coupled to conductors 218 and 198, respectively. MOSFET 232 is enabled when CBC bit 6 is a logic "0", and MOSFET 234 is enabled when CBC bit 6 is a logic "1". The logic values output on terminals C1 and C0 correspond to those listed in Appendix C.

The CBC decode line labeled "9, 19" in FIG. 14A corresponds to the rows labeled 9 and 19 in Appendix C where the conditional branch is determined by the cc field of the macroinstruction. CBC decode line "9, 19" is coupled to the gate terminals of MOSFETS 236 and 238 which are enabled whenever CBC decode line "9, 19" is enabled. MOSFETS 236 and 238 couple conductors 224 and 226 to conductors 240 and 242, respectively. Conductors 240 and 242 are intersected by conductors designated generally cc decode lines in FIG. 14B. The cc decode lines are intersected by a group of lines designated generally CC BIT FIELD which conduct signals provided by bit 11 through bit 8 of the IRD register and signals which are the complement of these bits. These bits of the IRD register correspond to the cc field in $B_{CC}$ and $S_{CC}$ macroinstructions. The lines designated CC BIT FIELD and the lines previously designated CONDITIONALS overlap in that the IRD8 and $\overline{\text{IRD8}}$ lines serve as conditional signals for the CBC decode lines. The cc decode lines are intersected by a subset (PSWZ, PSWN, PSWV, PSWC and their complements) of the conditionals conductors which intersected the CBC decode lines. Each of the cc decode lines is labeled at the left-most portion of FIG. 15B such that the labels are the hexadecimal equivalent of the 4-bit cc field which selects that particular cc decode line. A cc decode line is at a high level only if it is selected by the cc bit field and the logic expression in Appendix E for the associated cc field is true. When a cc decode line is at a high level, conductors 240 and 242 are pulled to ground such that conductors 224 and 226 are also grounded provided that CBC decode line 9,19 is enabled.

Thus the conditional branch choice specified by output terminals C1 and C0 may be determined by the CBC field in the microword or directly by the cc field in the macroinstruction. Also, by deferring the final selection of the C1 and C0 output signals to CBC bit 6, the structure allows two different conditional branch microinstructions to share a single common destination. An example of this latter feature is illustrated by the microword blocks labeled bbci1 and bbcw1 in Appendix H, page BH. The branch destination for both of these microword blocks is microword block bbci3 if the condition specified by the cc field is TRUE. However, the branch destination from bbci1 and bbci2 if the condition is FALSE while the branch destination from bbcw1 is bbcw3 if the condition is FALSE. In the example, the CBC field of one of the microwords bbci1 and bbcw1 would be 9 (hex) while the CBC field of the other microword would be 19 (hex). Thus, bits 2 through 5 of the CBC field select a condition to be tested while bit 6 of the CBC field selects one of a set of possible output states associated with the selected condition for transmission to the C1 and C0 output terminals.

ALU AND CONDITION CODE CONTROL UNIT

Figure 15:
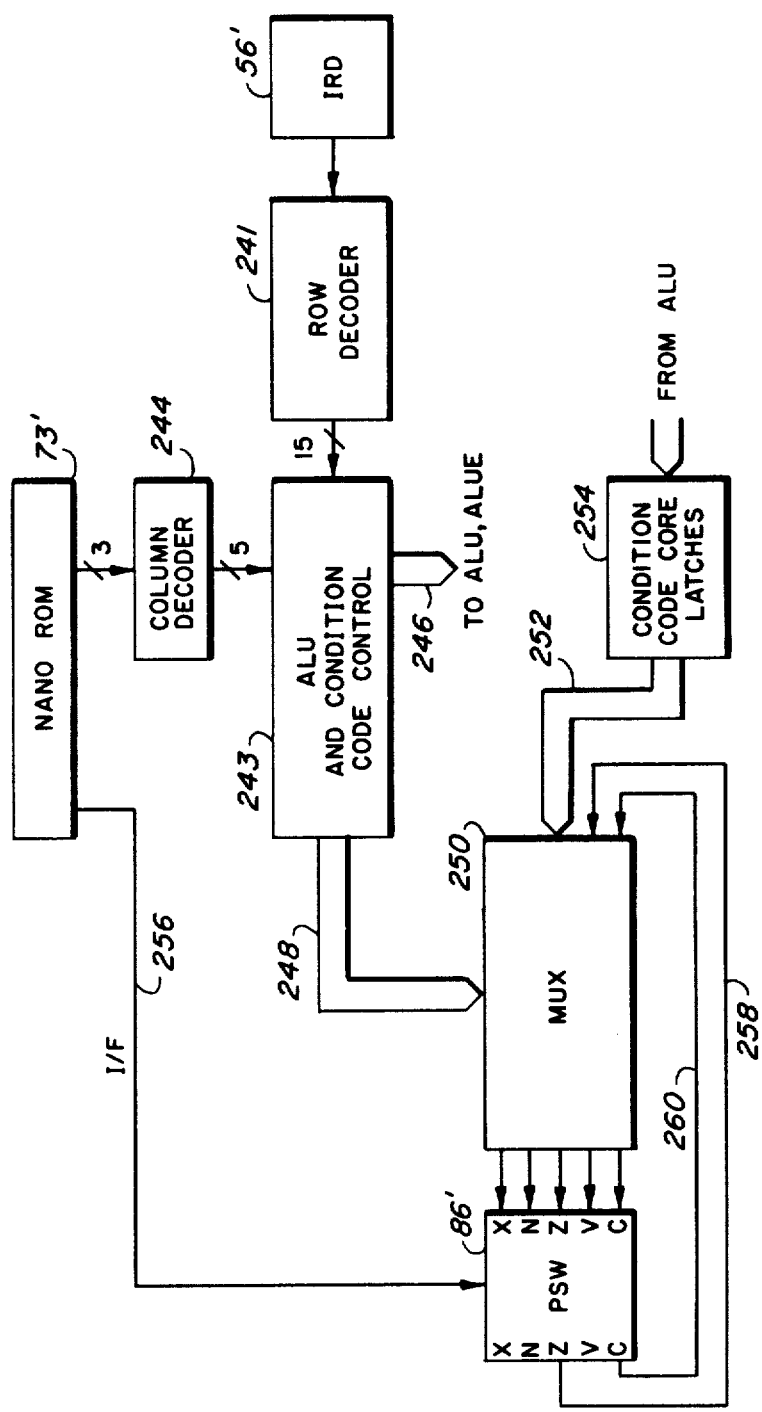
FIG. 15 is a block diagram illustrating the function of an ALU and Condition Code Control unit employed by the data processor for controlling the function of the ALU and controlling the setting of the condition codes.

FIG. 15 is a block diagram of an ALU and condition code control unit which may be used with a microprogrammed data processor. IRD register 56' corresponds to IRD register 56 in FIG. 4 and stores a macroinstruction. Row decoder 241 is coupled to the output of IRD register 56', and the output of row decoder 241 is coupled to ALU and condition code control block 243 by 15 row selection lines. Row decoder 241 is responsive to the macroinstruction stored by IRD register 56' in order to enable one of the 15 row selection lines. ALU and condition code control block 243 is arranged as a matrix of 15 rows and 5 columns, and row decoder 241 selects one of the 15 rows within block 243.

Nano ROM 73' corresponds to nano ROM 73 shown in FIG. 4. Three bits of the output of nano ROM 73' are coupled to column decoder 244. The ouptut of column decoder 244 is coupled to ALU and condition control blocks 243 by five column selection lines which select one of the five columns within the row selected by row decoder 241.

Generally, macroinstructions are executed by performing a sequence of operations in the execution unit. The particular set of operations required to perform a macroinstruction is macroinstruction-static, that is, it remains fixed during the execution the macroinstruction, and is specified by decoding the instruction type from the IRD register 56'. The set of operations to be performed by the ALU for any particular macroinstruction is stored within one of the 15 rows within block 243. Each operation in the row defines both the ALU activity and the loading of the condition codes. Nano ROM 73' provides state information for the proper sequencing of the operations within the selected row. During each microcycle, column decoder 244 selects the column within the selected row which contains the operation next to be performed in the sequence of operations. Thus ALU and condition code control block 243 combines the state information of the nano control store with the function information extracted from the instruction register in order to execute each macroinstruction. Block 243 provides timing and control to the ALU, ALU extender (ALUE) and to the condition code registers within the program status word (PSW). If the sets of operations for the various macroinstructions are properly ordered in the array contained by block 243, then the execution of most classes of macroinstruction can utilize the same nano control store sequences. For the same effective address and data types, the ADD, SUBTRACT, AND, OR, and EXCLUSIVE OR macroinstructions share the identical control store sequences.

Still referring to FIG. 15, ALU and condition code control block 243 has a first set of output lines designated 246 which are coupled to the ALU and ALUE within the execution unit (not shown). Control block 243 also provides a second group of output lines designated 248 which are coupled to a multiplexer 250. Multiplexer 250 includes a first group of inputs which are coupled by lines 252 to the output of condition code core latches 254. The input to the condition code core latches 254 is coupled to logic within the ALU (not shown) which derives status information about the operation most recently performed by the ALU. The status information latched by the condition core latches 254 is selectively coupled to program status word register 86' by multiplexer 250 under the control of the signals provided by lines 248. PSW register 86' corresponds to PSW register 86 in FIG. 4. PSW register 86' also has an input coupled to I/F line 256 which is coupled to nano ROM 73' for determining when PSW register 86' is updated. Multiplexer 250 also includes second and third inputs which are coupled by lines 258 and 260 to the Z and C outputs of PSW register 86'. Briefly described, the purpose for conductor 258 is to allow the data processor to test for a zero result in a 32-bit (double word) operation by combining the zero result for the first 16 bits with the zero result of the second 16 bits. The purpose for conductor 260 is to allow the data processor to provide a carry during decimal arithmetic.

FIG. 16 is a table of all the operations which can be performed by the ALU in conjunction with the ALU extender (ALUE). The column entitled "ALU Function" lists the function performed by each operation and, in the case of shift operations, the pattern in which the bits are shifted. In the "ALU Function" column, the symbols "a" and "d" refer to the input ports of the ALU coupled to the address bus and data bus respectively, within the data section of the execution unit. The symbol "r" refers to the ALU result. The symbol "x" refers to an arithmetic carry (PSWX) rather than the standard carry (PSWC). A symbol which has a primed notation indicates that the complement of the indicated symbol is selected. The column entitled "Into C Bit" indicates the source of the carry output signal. The symbol "cm" refers to the carry generated from the most significant position of the ALU. The symbol "msb" refers to the most significant bit of the result. For shift right and rotate right functions, the source of the carry output signal is bit 0 of the address bus in the DATA section since this bit is coupled to the least significant input of the shift network for such function. The remainder of the columns in FIG. 16 correspond to logic signals which are generated by the ALU and condition code control unit in order to control the ALU to perform the desired function.

In FIG. 17, an ALU function and condition code table is illustrated which corresponds to the array of 15 rows and 15 columns already described with regard to ALU and condition code control block 243 in FIG. 15. In the right-most column of this table, all of the macroinstructions which require an ALU function or which affect the state of the condition codes are listed adjacent to the row which contains the set of operations required by the particular macroinstruction. Within each of the five columns in the table, the left-most entry specifies one of the operations found in the table in FIG. 16. The right-most entry contains selection signals for controlling the condition codes stored by the PSW register. The condition code control information is a five character code corresponding to the X, N, Z, V, and C condition code bits in the PSW register. The significance of these condition codes is explained below.

| Abbrev. | Meaning |
|---|---|
| X | Extend bit used for multiprecision arithmetic |
| N | Positive/negative: most significant bit of result |
| Z | Zero result |
| V | Overflow |
| C | Carry |

The key for understanding the meaning of the condition code control information listed in the table is shown below:

| Abbreviation | Meaning |
|---|---|
| K | Condition code not changed |
| D | Don't care |
| O | Condition code always reset |
| N | Update PSWN with latest N status |
| Z | Update PSWZ with latest Z status |
| V | Update PSWV with latest V status |
| C | Update PSWC with latest C status |
| $\overline{C}$ | Update PSWC with complement of latest C status |
| C* | Update PSWC with PSWC "OR" ed with carry generated during decimal correction. |
| $\overline{C}$* | Update PSWC with complement of the above. |
| A | Update PSWX, PSWC with arithmetic shift carry status |
| V' | Update PSWV with latest status of N exclusive-OR C; used for arithmetic shift left. |

If the condition code control field is left blank in the table, then the condition codes are not affected. In column 1, the condition code control information for rows 2-5 and 8-11 include two entries. The reason for having two entries is that the first entry is selected by the nano ROM in some cases while the second entry is selected by the nano ROM in other cases. The nano control word output from the nano ROM includes a 2-bit field (NCC0, NCC1) corresponding to an initiate bit and a finish bit. For columns 2-4, the same condition code control information is used if either of the initiate or finish bits is set. For column 1 of the table the first entry is selected when only the initiate bit is set. However, where only the finish bit is set, then the second entry for the condition code control information is used.

Referring briefly to FIG. 12, the description of the portion of the key block labeled "ALU FUNCTION" has been deferred until now. One, two, or three characters may appear in the ALU function portion of the microword block in Appendix H. For each of the microword blocks, the first character indicates the column of the table shown in FIG. 18 which is to be selected in order to perform the desired operation. The symbols 1-5 correspond to columns 1 through 5 in this table. The symbol "x" indicates a don't care condition. In addition, the symbol 6, which occurs in microword blocks used to perform a divide algorithm, indicates that column 4 is enabled but that the "1ss" ALU function will shift a logic "1" into the least significant bit of the ALUE instead of a logic "0" as is the case when a "4" appears.

If two or more characters appear in the "ALU function" portion of the microword block, then the second character refers to the finish and initiate identification for condition code control. The symbol "f" corresponds to finish and would therefore cause the second entry in column 1 of the table shown in FIG. 17 to be used in order to control the setting of the condition code bits in the PSW register. The symbol "i" specifies initiate and would select the first entry in column 1 of the table shown in FIG. 18 for controlling the setting of the condition code bits in the PSW register. The symbol "n" indicates that the condition codes are not affected for the particular operation. Finally, for those microword blocks which contain a three character code for the "ALU FUNCTION" portion, the third character is the symbol "f" which indicates to the execution unit that a byte (8 bits) transfer is involved. An example is the microword block labeled mrgw1 shown in Appendix H, page H. In these instances, only the low order 8 bits of the address bus in the DATA section of the execution unit are driven by the selected source such that only the low order 8 bits of the selected destination are changed while the upper 8 bits of the selected destination are not disturbed. Otherwise, word operation and byte operation type macroinstructions share the same basic microinstruction routines.

Referring again to FIG. 17, it should be noted that in the "addx" operation in row 3, column 2, the arithmetic carry added to the operands is the core latch copy of X rather than PSWX such that the most recent X status is used. Also in row 1, column 4, the operation performed is an "1ss" operation wherein the logic state of the bit shifted into the ALUE is determined by whether column 4 or column 6 is selected by the nano control store, though column 6 does not appear as a separate column in the table. Also, in row 7, column 4, the input to the most significant bit of the ALU is PSWC, or PSWN exclusive-or PSWV, depending on whether the multiplication is unsigned or signed, respectively.

Figure 18:
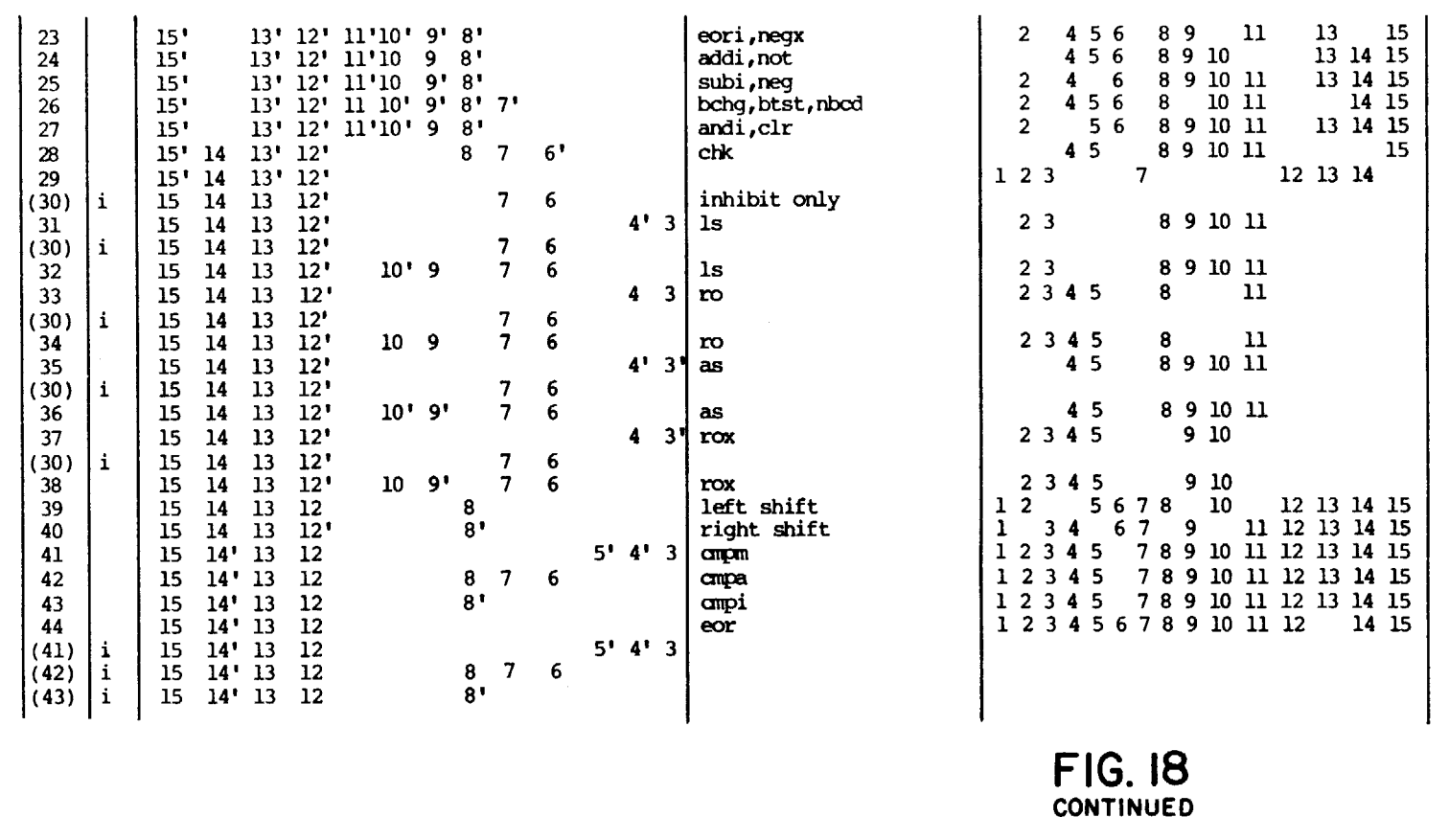

In FIG. 18, a table illustrates the decoding of the macroinstruction stored by the IRD register in order to select one of the fifteen rows in the matrix contained by the ALU and condition code control block. The macroinstructions have been grouped into 45 combinations (0–44) as determined by the bit pattern shown in the section of the table entitled Instruction Decode. In the portion of the table entitled "Row Inhibits", the numbers which appear in a given row of the table correspond to the rows in the ALU and condition code control matrix which are to be disabled whenever a macroinstruction is encountered which has the bit pattern shown in the corresponding row of the instruction decode portion of the table.

Figure 19A:
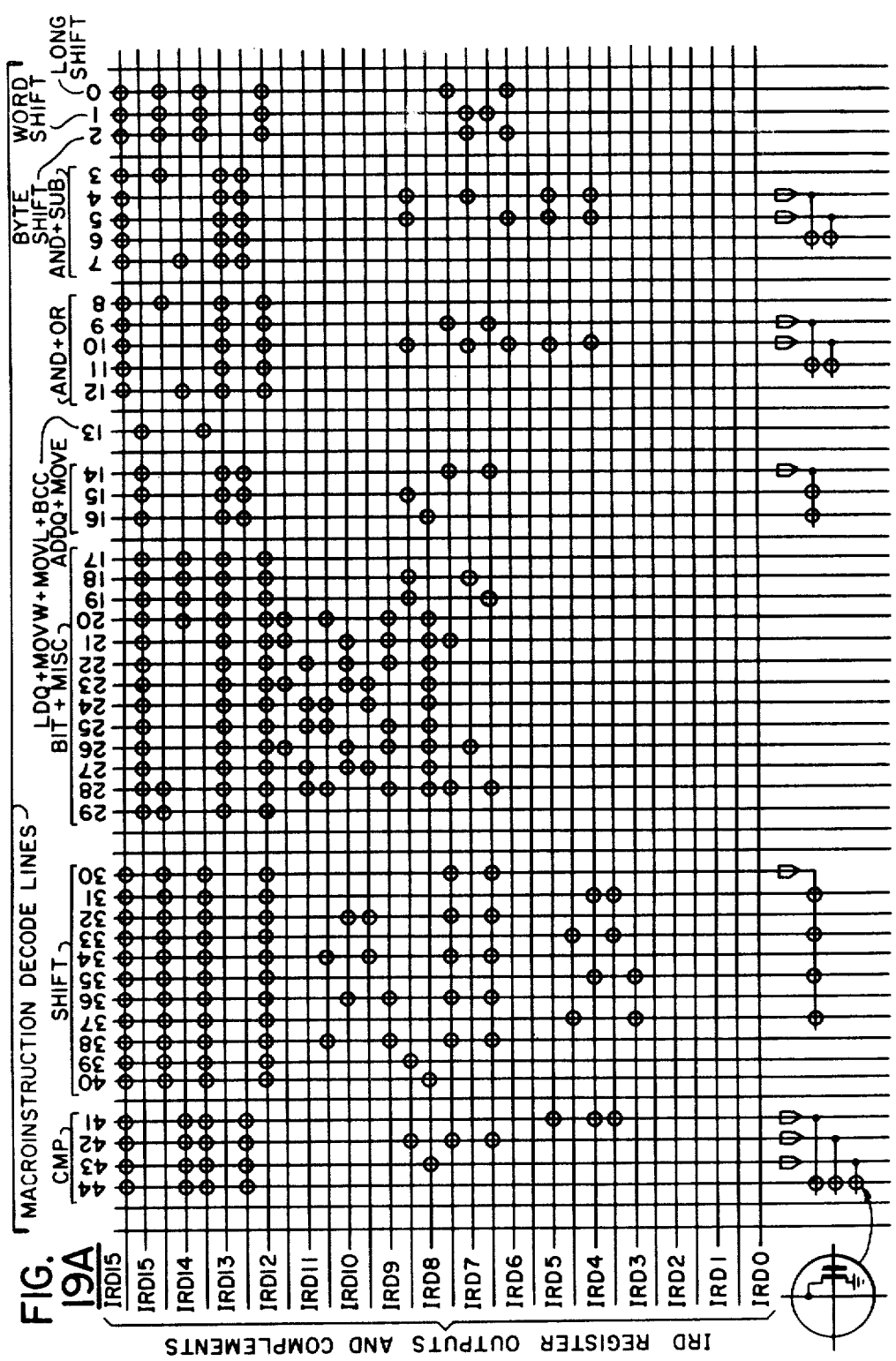
FIGS. 19A-19B illustrate PLA decoding structures responsive to the macroinstruction opcode bit fields for generating row selection lines in accordance with the table shown in FIG. 19.
Figure 19:
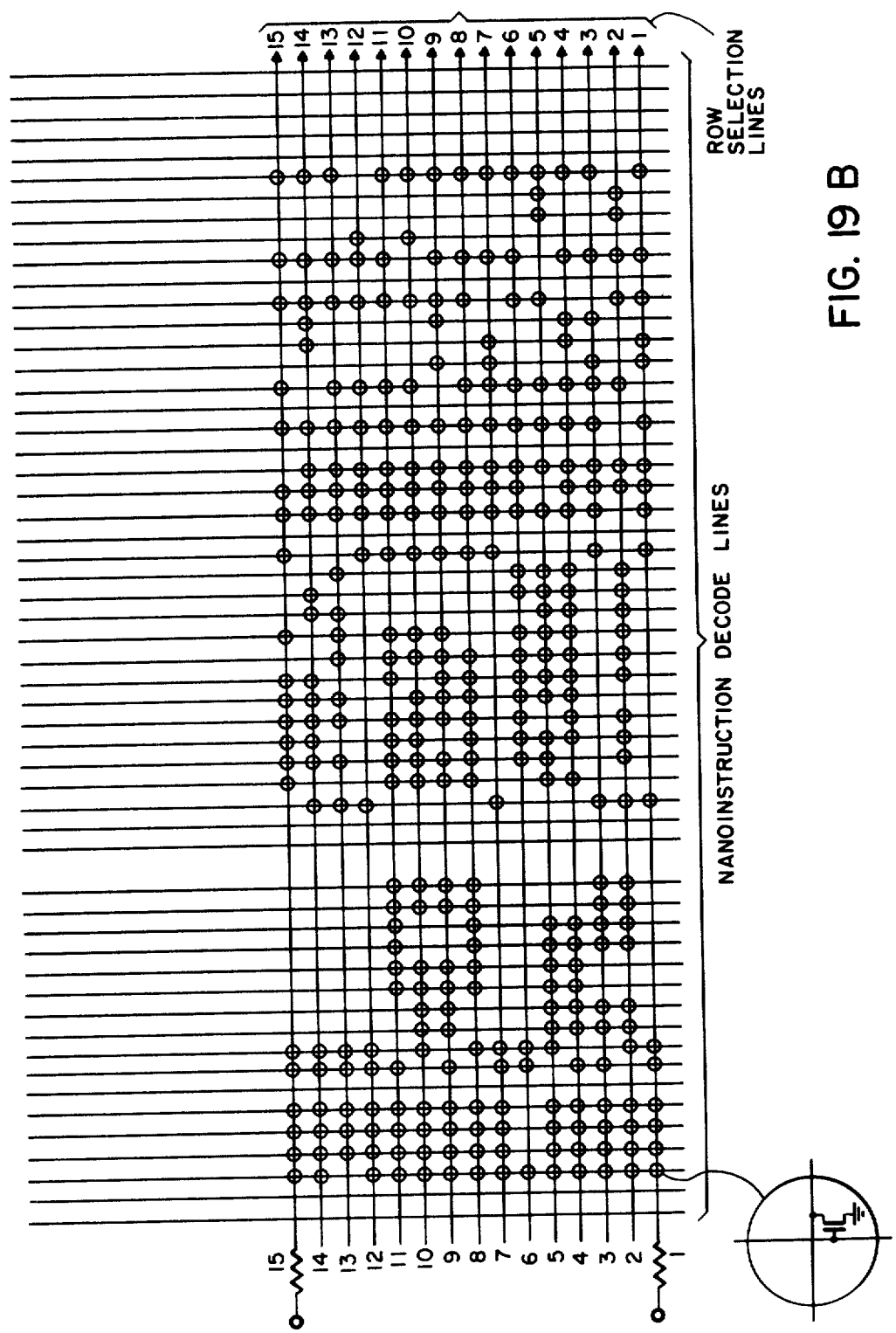

In FIGS. 19A-19B, a programmed logic array structure is illustrated for performing the decoding function described in the table of FIG. 19. In FIG. 19A, a group of lines designated IRD REGISTER OUTPUTS AND COMPLEMENTS is illustrated. Each of these lines conducts the true or complement signal of a macroinstruction bit stored in the IRD register. Intersecting this first group of lines is a second group of lines designated generally MACROINSTRUCTION DECODE LINES which continue from FIG. 19A onto FIG. 20B. The macroinstruction decode lines are labeled with a reference numeral which corresponds to a row in the table of FIG. 18. At the intersection of a line in the first group with a line in the second group (the intersection being represented by a bubble), a MOSFET device pulls the line in the second group to ground whenever a line in the first group is a logic "1". In some cases, one of the macroinstruction decode lines intersects another of the macroinstruction decode lines. For example, macroinstruction decode line 43 is shown intersecting with macroinstruction decode line 44. At this intersection, a MOSFET device operates to pull macroinstruction decode line 44 to ground whenever macroinstruction decode line 43 is a logic "1". Similarly, macroinstruction decode lines 41 and 42 also intersect macroinstruction decode line 44. Referring briefly to the table in FIG. 18, the row numbered 44 is followed by rows set off in parenthesis and labeled 41, 42 and 43. This notation is used to indicate that rows 41, 42 and 43 further decode row 44.

In FIG. 19B, the macroinstruction decode lines are intersected by a third group of lines designated generally ROW SELECTION LINES and labeled 1 through 15. The row selection lines correspond to the 15 lines coupled to the output of row decoder 241 in FIG. 15. The decoding function performed by the PLA structure shown in FIG. 19B is effective to select one of the 15 rows in the ALU and condition code control matrix based on the information supplied by the macroinstruction decode lines.

Figure 20A:
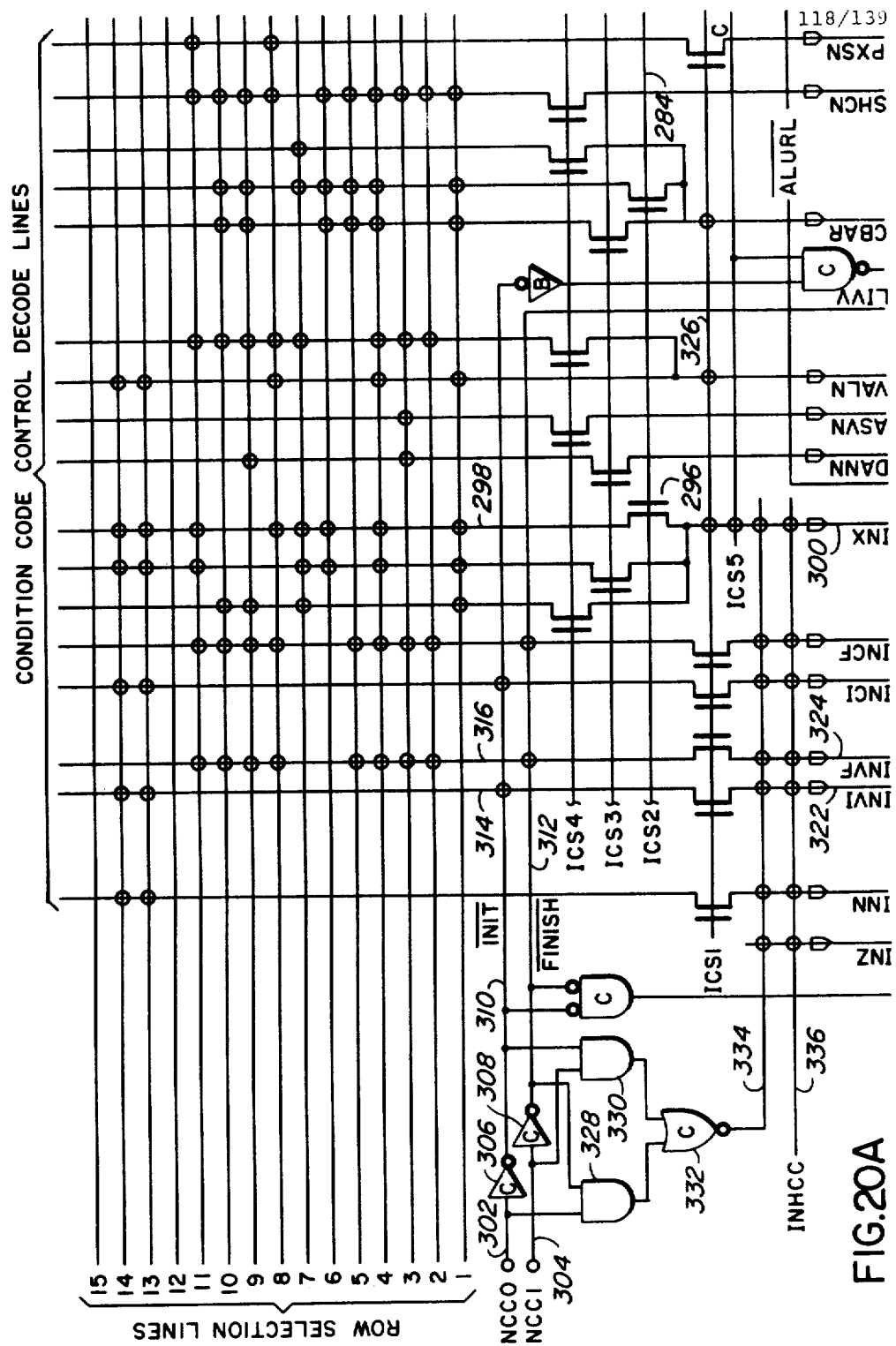
FIGS. 20A-20B illustrate circuitry for implementing the 15-row by 5-column table shown in FIG. 18 for generating the control signals used to specify the ALU function and to control setting of the condition codes.
Figure 20B:
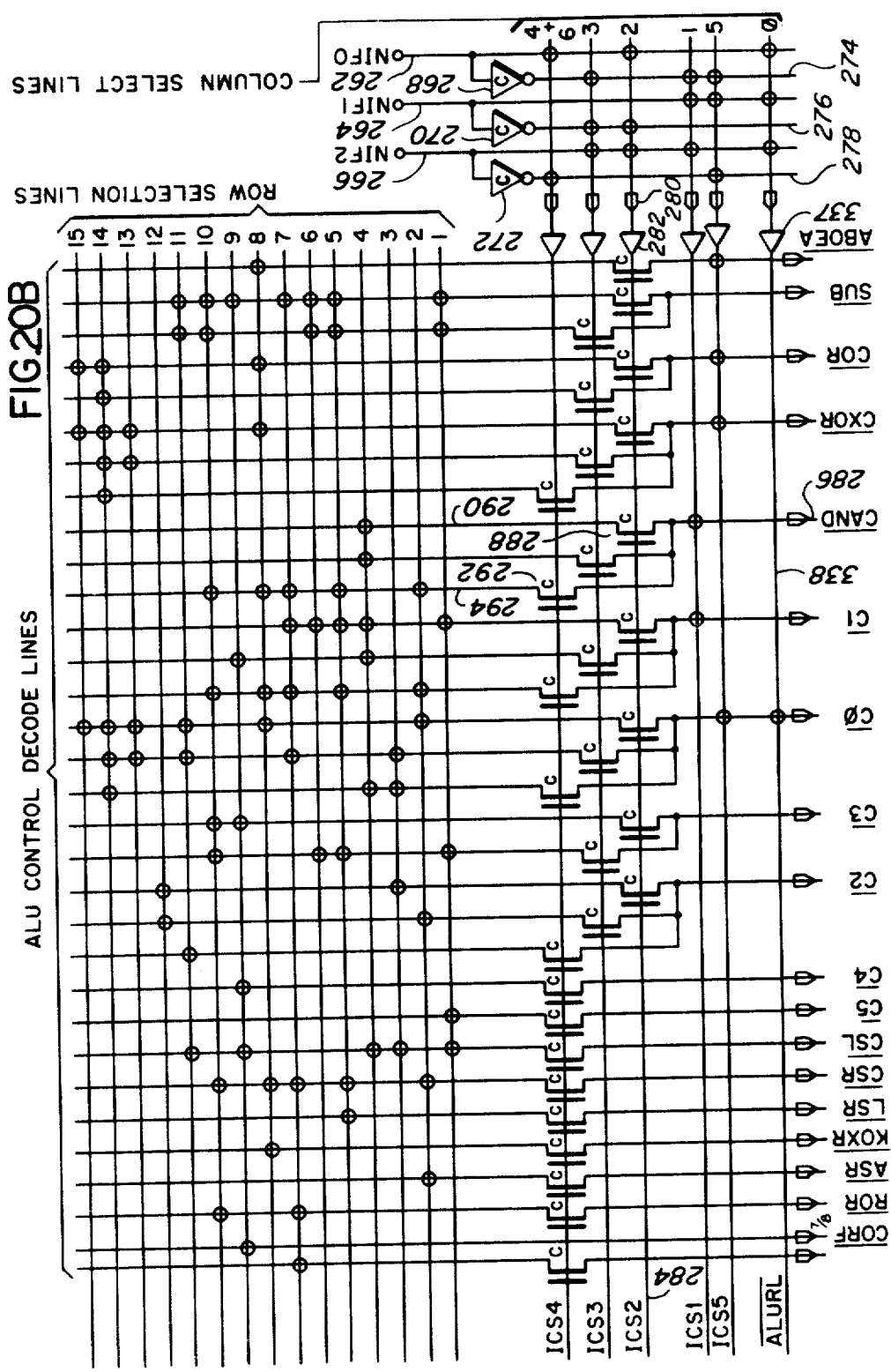

FIGS. 20A and 20B illustrate the circuit implementation of ALU and condition code control block 243 in FIG. 15. A first group of lines designated ROW SELECTION LINES is illustrated in the upper portion of FIG. 20A and FIG. 20B. This group of row selection lines corresponds to the 15 row selection lines output by the PLA structure shown in FIG. 19B. The row selection lines are intersected by a first group of lines designated ALU CONTROL DECODE LINES in FIG. 20B in order to control the signals which select the ALU function. Shown in FIG. 20B are conductors 262, 264, and 266 which receive a 3-bit field provided by the output of the nano ROM. Inverters 268, 270, and 272 are coupled to conductors 262, 264, and 266, respectively, for providing the complement signals on lines 274, 276, and 278. Lines 262, 264, 266, 274, 276 and 278 are intersected by lines designated COLUMN SELECT LINES and labeled 1,2,3,4+6,5 in order to decode the 3-bit field supplied from the nano ROM. The five lines designated column select lines correspond to the five lines coupled to the output of column decoder 244 in FIG. 16. Column selection line 2 is coupled to a load device 280 for holding column selection line 2 at a high level whenever column selection line 2 is enabled. Column selection line 2 is also coupled to a buffer device 282, and the output of buffer 282 is coupled to line 284 labeled ICS2. The other column selection lines are similarly buffered in order to drive lines ICS1, ICS3, ICS4, and ICS5.

Line 286 in FIG. 20B provides ALU control signal $\overline{\text{CAND}}$. Referring briefly to FIG. 16, one of the columns in the table is labeled cand' and the table illustrates those operations for which the signal is active. Signal $\overline{\text{CAND}}$ is active low and the intersection of line 286 with line ISC1 causes $\overline{\text{CAND}}$ to be active whenever column 1 is selected. In FIG. 17, it will be noted that column 1 always calls for an "and" function to be performed by the ALU, and from the table in FIG. 16 it will be seen that the "and" function is one of those operations for which signal cand' is to be active. If column 2 is selected rather than column 1, then line 284 is at a high level and MOSFET 288 is enabled such that line 286 is coupled to decode line 290. In this case, line 290 is grounded such that signal $\overline{\text{CAND}}$ is active only when the row 4 selection line is enabled. Referring briefly to FIG. 17, it will be seen that within column 2 of the table, row 4 contains the only operation ("and") which requires cand' to be active. On the other hand, if column 4+6 is selected, then MOSFET 292 is enabled such that line 286 is shorted to decode line 294. Line 294 is grounded for making signal $\overline{\text{CAND}}$ active whenever row selection lines 2,5,7,8 or 10 are selected. Again referring to FIG. 18, it will be noted that the corresponding rows in column 4 of the table call for operations for which signal cand' is to be active. The remainder of the control signals which control the ALU are generated in a similar manner.

The row selection lines are also intersected by a second group of lines designated CONDITION CODE CONTROL DECODE LINES in FIG. 20A in order to generate the control signals which determine the setting of the condition code bits. The buffered column selection line ICS1-ICS5 in FIG. 20A determine which of the condition code control decode lines is coupled to the various control signals. For example, when line 284 (ICS2) is at a high level, MOSFET 296 couples decode line 298 to INX control line 300 for controlling the setting of the X bit in the program status word register (PSWX). In this example, INX control line 300 will be disabled whenever row selection lines 1,4,6,7,8,11,13, or 14 are selected. Referring briefly to the table in FIG. 17 for column 2, it will be noted that for the rows mentioned above, the symbol "k" appears for the X bit position indicating that the PSWX bit should not be changed.

Also shown in FIG. 20A are conductors 302 and 304 which receive control signals NCC0 and NCC1 which are 2 bits provided by the output of the nano control store and correspond to the initiate and finish signals previously referred to in the description of the table in FIG. 17. Conductors 302 and 304 are coupled to the input of inverters 306 and 308, respectively, for generating the signals $\overline{\text{INIT}}$ and $\overline{\text{FINISH}}$ on lines 310 and 312, respectively. Line 310 intersects decode line 314 and line 312 intersects decode line 316 such that decode line 314 is enabled when $\overline{\text{INIT}}$ is a logic "0" and decode line 316 is enabled when $\overline{\text{FINISH}}$ is a logic "0". MOSFET devices 318 and 320 couple decode lines 314 and 316 to control lines 322 and 324, respectively, and are enabled when line 326 (ICS1) is at a high level indicating that column 1 has been selected. Control lines 322 (INVI) and 324 (INVF) are gated by circuitry (not shown) in order to control the setting of the overflow bit in the program status word register (PSWV). Decode line 314 is grounded whenever rows 13 or 14 are selected while decode line 316 is grounded whenever row 2-5 or 8-11 are selected. Referring briefly to the table in FIG. 18 in column 1, it will be noted that for an initiate type operation, the V bit in the program status word register is unchanged only in rows 13 and 14 while for the finish type operation, the V bit in the program status word register is unchanged in rows 2-5 and 8-11.

Lines 302, 304, 310, 312 are also coupled to a gating network which includes AND gates 328 and 330 and NOR gate 332 for generating a gated signal on line 334. If the signals received by conductors 302 and 304 are both logic "0", then line 334 is enabled and causes the condition code control signals to be disabled such that the condition codes in the program status word register are unchanged. This case corresponds to those microword blocks in appendix H for which the ALU function portion indicates that the condition codes are not affected. Conductor 336 (INHCC) also intersects the condition code control lines such that these control lines are disabled when line 336 is a logic "1". Line 336 is coupled to a decoder (not shown) which detects those macroinstructions which do not affect the condition codes. In the case of these macroinstructions, line 336 is enabled in order to inhibit the condition codes in the PSW register from being affected.

Referring again briefly to FIG. 20B, a sixth column select line appears which is labeled 0 and which is coupled to the input of buffer 337 for driving conductor 338 ($\overline{\text{ALURL}}$). The significance of this signal will now be explained. Whenever at least one of the nano control store output bits (NIF0-NIF2) received by conductors 262, 264 and 266 is a logic "1" then one of the column select lines 1-5 is enabled indicating that the ALU is to perform an operation. In this event, a temporary storage register or latch within the ALU is updated. However, during certain microcycles, no ALU function is to be performed and the latch within the ALU should not be updated. For these microcycles, conductors 262-266 receive logic "0" signals such that column select line 0 is enabled. The $\overline{\text{ALURL}}$ signal conducted by line 338 signifies this case and inhibits activity within the ALU latch.

APPENDIX A
LIST OF MICROWORDS

| ROUTINE | LABEL | FC | NMA | TYPE | CBC | ORIGIN | ROW | DESTINATIONS |
|---------|-------|----|----|------|-----|--------|-----|--------------|
| o#w1 | o#w1 | i | | a2 | | | | |
| ablw1 | ablw1 | i | ablw2 | db | | | | |
| | ablw2 | i | ablw3 | db | | | | |
| | ablw3 | d | | a3 | | | | |
| abww1 | abww1 | i | ablw3 | db | | | | |
| adrw1 | adrw1 | d | adrw2 | db | | | | |
| | adrw2 | u | | a3 | | | | |
| adsw1 | adsw1 | i | adsw2 | db | | | | |
| | adsw2 | u | adrw2 | db | | | | |
| e#w1 | e#w1 | i | | a2 | | | | |
| aixw0 | aixw0 | n | aixw1 | db | | | | |
| | aixw1 | i | | bc | i11 | | | aixw2 aixw4 |
| | aixw2 | i | adsw2 | db | | aiai1 | | |
| | aixw4 | i | adsw2 | db | | aiai1 | | |
| pinw1 | pinw1 | d | pinw2 | db | | | | |
| | pinw2 | d | | a3 | | | | |
| pdcw1 | pdcw1 | n | pdcw2 | db | | | | |

-continued

APPENDIX A
LIST OF MICROWORDS

| ROUTINE | LABEL | FC | NMA | TYPE | CBC | ORIGIN | ROW | DESTINATIONS |
|---------|-------|----|----|------|-----|--------|-----|--------------|
|  | pdcw2 | d |  | a3 |  |  |  |  |
| o#l1 | o#l1 | i | o#w1 | db |  |  |  |  |
| abll1 | abll1 | i | abll2 | db |  | ablw1 |  |  |
|  | abll2 | i | abll3 | db |  | ablw2 |  |  |
|  | abll3 | d | adrl2 | db |  |  |  |  |
| abwl1 | abwl1 | i | abll3 | db |  | abww1 |  |  |
| adrl1 | adrl1 | d | adrl2 | db |  |  |  |  |
|  | adrl2 | d |  | a3 |  |  |  |  |
| adsl1 | adsl1 | i | adsl2 | db |  | adsw1 |  |  |
|  | adsl2 | u | adsl3 | db |  | abll3 |  |  |
|  | adsl3 | u |  | a3 |  |  |  |  |
| e#l1 | e#l1 | i | e#w1 | db |  |  |  |  |
| aixl0 | aixl0 | n | aixl1 | db |  | aixw0 |  |  |
|  | aixl1 | i |  | bc | il1 | aixw1 |  | aixl2 aixl5 |
|  | aixl2 | i | adsl2 | db |  | aixw2 | aiai2 |  |
|  | aixl5 | i | adsl2 | db |  | aixw4 | aiai2 |  |
| pinl1 | pinl1 | d | pinl2 | db |  | adrl1 |  |  |
|  | pinl2 | d | pinl3 | db |  |  |  |  |
|  | pinl3 | d |  | a3 |  |  |  |  |
| pdcl1 | pdcl1 | n | pdcl2 | db |  |  |  |  |
|  | pdcl2 | d | adrl2 | db |  |  |  |  |
| mrgw1 | mrgw1 | i | mmrw3 | dbi |  |  |  |  |
| mrgm1 | mrgm1 | i | mmrw3 | dbi |  |  |  |  |
| malw1 | malw1 | i | malw2 | db |  |  |  |  |
|  | malw2 | d | malw3 | dbi |  |  |  |  |
|  | malw3 | i | b | db |  |  | mabb1 |  |
| maww1 | maww1 | i | maww2 | db |  |  |  |  |
|  | maww2 | d | b | db |  |  |  |  |
| mmrw1 | mmrw1 | d | mmrw2 | db |  |  |  |  |
|  | mmrw2 | i | mmrw3 | dbi |  |  | mmst1 |  |
|  | mmaw2 | i | mmrw3 | dbi |  |  | mmst1 |  |
|  | mmrw3 | i |  | a1 |  |  |  |  |
| mmdw1 | mmdw1 | i | maww2 | db |  |  |  |  |
| mmxw0 | mmxw0 | n | mmxw1 | db |  |  |  |  |
|  | mmxw1 | i |  | bc | il1 |  |  | mmxw2 mmxw3 |
|  | mmxw2 | i | maww2 | db |  |  | mmmm1 |  |
|  | mmxw3 | i | maww2 | db |  |  | mmmm1 |  |
| mmiw1 | mmiw1 | d | mmiw2 | dbi |  | mmrw1 |  |  |
|  | mmiw2 | i |  | a1 |  |  |  |  |
| mmmw1 | mmmw1 | i | mmmw2 | dbi |  |  |  |  |
|  | mmmw2 | d |  | a1 |  |  |  |  |
| asxw1 | asxw1 | n | asxw2 | db |  | pdcw1 |  |  |
|  | asxw2 | d | asxw3 | db |  |  |  |  |
|  | asxw3 | d | asxw4 | db |  |  |  |  |
|  | asxw4 | d | asxw5 | dbi |  |  |  |  |
|  | asxw5 | i | morw2 | db |  |  |  |  |
| asxl1 | asxl1 | n | asxl2 | db |  | pdcw1 |  |  |
|  | asxl2 | d | asxl3 | db |  |  |  |  |
|  | asxl3 | d | asxl4 | db |  | asxw2 |  |  |
|  | asxl4 | d | asxl5 | db |  | asxw3 |  |  |
|  | asxl5 | d | asxl6 | db |  | asxl2 |  |  |
|  | asxl6 | d | asxl7 | db |  |  |  |  |
|  | asxl7 | d | asxl8 | dbi |  |  |  |  |
|  | asxl8 | i | morw2 | db |  |  |  |  |
| mrgl1 | mrgl1 | i | mrgl2 | dbi |  | mrgw1 |  |  |
|  | mrgl2 | i |  | a1 |  |  |  |  |
| mall1 | mall1 | i | mall2 | db |  |  |  |  |
|  | mall2 | d | mall3 | db |  |  |  |  |
|  | mall3 | d | malw3 | dbi |  |  |  |  |
| mawl1 | mawl1 | i | mawl2 | db |  | maww1 |  |  |
|  | mawl2 | d | mawl3 | db |  |  |  |  |
|  | mawl3 | d | b | db |  |  |  |  |
| mmrl1 | mmrl1 | d | mmrl2 | db |  |  |  |  |
|  | mmrl2 | d | mmrw2 | dbi |  |  |  |  |
| mmdl1 | mmdl1 | i | mawl2 | db |  | mmdw1 |  |  |
| mmxl0 | mmxl0 | n | mmxl1 | db |  | mmxw0 |  |  |
|  | mmxl1 | i |  | bc | il1 | mmxw1 |  | mmxl2 mmxl3 |
|  | mmxl2 | i | mawl2 | db |  | mmxw2 | mmmm2 |  |
|  | mmxl3 | i | mawl2 | db |  | mmxw3 | mmmm2 |  |
| mmil1 | mmil1 | d | mmil2 | db |  | mmrl1 |  |  |
|  | mmil2 | d | mmiw2 | dbi |  | mmrl2 |  |  |
| mmml1 | mmml1 | i | mmml2 | dbi |  | mmmw1 |  |  |
|  | mmml2 | d | mmmw2 | db |  |  |  |  |
| rrgw1 | rrgw1 | i | rrgw2 | dbi |  |  |  |  |
|  | rrgw2 | i |  | a1 |  |  |  |  |
| rrgm1 | rrgm1 | i | rrgl2 | dbi |  |  |  |  |
| ralw1 | ralw1 | i | ralw2 | db |  | ablw1 |  |  |
|  | ralw2 | i | maww2 | db |  |  |  |  |
| raww1 | raww1 | i | maww2 | db |  |  |  |  |

-continued

APPENDIX A
LIST OF MICROWORDS

| ROUTINE | LABEL | FC | NMA | TYPE | CBC | ORIGIN | ROW | DESTINATIONS |
|---|---|---|---|---|---|---|---|---|
| rmrw1 | rmrw1 | d | mmrw2 | dbi | | | | |
| rmdw1 | rmdw1 | i | rmdw2 | db | | | | |
| | rmdw2 | d | b | dbi | | | | |
| rmxw0 | rmxw0 | n | rmxw1 | db | | aixw0 | | |
| | rmxw1 | i | | bc | i11 | mmxw1 | | rmxw2 rmxw3 |
| | rmxw2 | i | rmdw2 | db | | aixw2 | rmrm1 | |
| | rmxw3 | i | rmdw2 | db | | aixw4 | rmrm1 | |
| rmiw1 | rmiw1 | d | mmiw2 | dbi | | rmrm1 | | |
| rmmw1 | rmmw1 | i | mmmw2 | dbi | | | | |
| rrgl1 | rrgl1 | i | rrgl2 | dbi | | rrgw1 | | |
| | rrgl2 | i | | al | | | | |
| rall1 | rall1 | i | rall2 | db | | ablw1 | | |
| | rall2 | i | rall3 | db | | ralw2 | | |
| | rall3 | d | mawl3 | db | | | | |
| rawl1 | rawl1 | i | rall3 | db | | raww1 | | |
| rmrl1 | rmrl1 | d | rmrl2 | db | | | | |
| | rmrl2 | d | rmrl3 | dbi | | | | |
| | rmrl3 | i | | al | | | | |
| rmdl1 | rmdl1 | i | rmdl2 | db | | rmdw1 | | |
| | rmdl2 | d | rmdl3 | db | | rall3 | | |
| | rmdl3 | d | rmrl3 | dbi | | rmdw2 | | |
| rmxl0 | rmxl0 | n | rmxl1 | db | | aixw0 | | |
| | rmxl1 | i | | bc | i11 | mmxw1 | | rmxl2 rmxl3 |
| | rmxl2 | i | rmdl2 | db | | aixw2 | rmrm2 | |
| | rmxl3 | i | rmdl2 | db | | aixw4 | rmrm2 | |
| rmil1 | rmil1 | d | rmil2 | db | | rmrl1 | | |
| | rmil2 | d | rmil3 | dbi | | | | |
| | rmil3 | i | | al | | | | |
| rmml1 | rmml1 | i | rmml2 | dbi | | rmmw1 | | |
| | rmml2 | d | mmmw2 | db | | | | |
| morw1 | morw1 | i | morw2 | dbi | | | | |
| | morw2 | d | | al | | maww2 | | |
| morl1 | morl1 | i | morl2 | dbi | | morw1 | | |
| | morl2 | d | morw2 | db | | | | |
| romw1 | romw1 | i | rrgw2 | dbi | | | | |
| romm1 | romm1 | i | rorm2 | dbi | | romw1 | | |
| roml1 | roml1 | i | roml2 | dbi | | romw1 | | |
| | roml2 | i | roml3 | db | | | | |
| | roml3 | d | | al | | | | |
| rorw1 | rorw1 | i | rrgw2 | dbi | | | | |
| rorl1 | rorl1 | i | rorl2 | dbi | | rorw1 | | |
| | rorl2 | i | rorl3 | db | | | | |
| | rorl3 | n | roml3 | db | | | | |
| roaw1 | roaw1 | i | roaw2 | dbi | | | | |
| | roaw2 | i | | al | | | rosc1 | |
| roal1 | roal1 | i | roal2 | dbi | | roaw1 | | |
| | roal2 | i | roal3 | db | | | | |
| | roal3 | n | roal4 | db | | | | |
| | roal4 | n | | al | | | | |
| rorm1 | rorm1 | i | rorm2 | dbi | | rorw1 | | |
| | rorm2 | i | rorm3 | db | | rorl2 | | |
| | rorm3 | n | roml3 | db | | | | |
| dvur1 | dvur1 | n | dvum2 | db | | | | |
| | dvur2 | n | dvur3 | db | | | | |
| | dvur3 | n | trap3 | db | | | | |
| dvum1 | dvum1 | n | dvum2 | db | | | | |
| | dvum2 | n | | bc | z | | | dvum3 dvur2 |
| | dvum3 | n | | bc | c | | trdv1 | dvum4 dvum5 |
| | dvum4 | i | dvuma | dbi | | | dvdv1 | |
| | dvumz | i | dvuma | dbi | | | dvdv1 | |
| | dvuma | i | | al | | | dvdv1 | |
| | dvum5 | n | | bc | n | | dvdv1 | dvum8 dvum7 |
| | dvum6 | n | | bc | n | | dvdv2 | dvum8 dvum7 |
| | dvum7 | n | | bc | auz | | dvdv3 | dvum6 dvum9 |
| | dvum8 | n | | bc | auz | dvum7 | dvdv3 | dvumb dvumc |
| | dvum9 | n | dvumd | db | | | dvdv2 | |
| | dvumd | i | dvum0 | dbi | | | dvdv5 | |
| | dvumb | n | | bc | c | | dvdv4 | dvum6 dvume |
| | dvumc | n | | bc | c | dvum9 | dvdv4 | dvumd dvumf |
| | dvume | n | dvum5 | db | | | dvdv2 | |
| | dvumf | i | dvum0 | dbi | | | dvdv5 | |
| | dvum0 | i | | al | | | | |
| dvs01 | dvs01 | n | dvs03 | db | | dvur1 | | |
| dvs02 | dvs02 | n | dvs03 | db | | dvum1 | | |
| | dvs03 | n | | bc | nz1 | | | dvs04 dvs05 dvur2 dvur2 |
| | dvs04 | n | dvs06 | db | | dvum3 | trdv1 | |
| | dvs05 | n | dvs06 | db | | | trdv1 | |
| | dvs06 | n | | bc | n | | | dvs07 dvs10 |
| | dvs07 | n | dvs08 | db | | | dvdv6 | |

-continued

APPENDIX A
LIST OF MICROWORDS

| ROUTINE | LABEL | FC | NMA | TYPE | CBC | ORIGIN | ROW | DESTINATIONS |
|---------|-------|----|----|------|-----|--------|-----|--------------|
|  | dvs08 | n |  | bc | c | dvume |  | dvumz dvs09 |
|  | dvs09 | n | dvs0c | db |  | dvum5 |  |  |
|  | dvs10 | n | dvs11 | db |  |  | dvdv6 |  |
|  | dvs11 | n | dvs08 | db |  |  |  |  |
|  | dvs0a | n | dvs0c | db |  | dvum6 |  |  |
|  | dvs0c | n |  | bc | auz | dvum7 | dvdv7 | dvs0d dvs0e |
|  | dvs0d | n |  | bc | c | dvumb | dvdv9 | dvs0a dvs0f |
|  | dvs0e | n |  | bc | c | dvumb | dvdv9 | dvs13 dvs12 |
|  | dvs0f | n | dvs09 | db |  | dvume | dvdv8 |  |
|  | dvs12 | n | dvs14 | db |  | dvum5 | dvdve |  |
|  | dvs13 | n | dvs14 | db |  |  | dvdve |  |
|  | dvs14 | n | dvs15 | db |  |  |  |  |
|  | dvs15 | n |  | bc | n |  |  | dvs16 dvs1d |
|  | dvs16 | n |  | bc | n |  | dvdva | dvs17 dvs1a |
|  | dvs17 | i |  | bci | n |  | dvdvb | leaa2 dvuma |
|  | dvs1a | n | dvs1b | db |  | dvs03 | dvdvb |  |
|  | dvs1b | n |  | bc | nz2 |  |  | dvum4 dvs1c dvs1c dvs1c |
|  | dvs1c | i | leaa2 | dbi |  |  | dvdv1 |  |
|  | dvs1d | n |  | bc | n | dvs16 | dvdva | dvs1f dvs1e |
|  | dvs1e | n |  | bc | n | dvs1b | dvdvd | dvs1c dvum4 |
|  | dvs1f | n | dvs20 | dbi |  | dvs03 | dvdvd |  |
|  | dvs20 | i |  | bc | nz2 | dvs17 |  | dvuma leaa2 leaa2 leaa2 |
| trap1 | trap1 | n | trap2 | db |  | trac1 | trch1 |  |
|  | trap2 | n | trap3 | db |  |  |  |  |
|  | trap3 | d | trap4 | db |  |  |  |  |
|  | trap4 | d | trap5 | db |  |  |  |  |
|  | trap5 | d | trap6 | db | itlx4 |  |  |  |
|  | trap6 | i | jma11 | db | ldmd4 |  |  |  |
| bser1 | bser1 | n | bser2 | dbc |  |  |  |  |
|  | bser2 | n | bser3 | db | trac2 |  |  |  |
|  | bser3 | d | bser4 | db | trap3 |  |  |  |
|  | bser4 | d | bser5 | db |  |  |  |  |
|  | bser5 | d | bser6 | db | trap3 |  |  |  |
|  | bser6 | d | trap3 | db |  |  |  |  |
| itlx1 | itlx1 | n | itlx2 | db | trac1 |  |  |  |
|  | itlx2 | n | itlx3 | db |  |  |  |  |
|  | itlx3 | n | itlx4 | db |  |  |  |  |
|  | itlx4 | d | itlx5 | db |  |  |  |  |
|  | itlx5 | a | itlx6 | db |  |  |  |  |
|  | itlx6 | n | itlx7 | dbl | dvumb |  |  |  |
|  | itlx7 | n | trap4 | db |  |  |  |  |
| trac1 | trac1 | n | trac2 | db |  |  |  |  |
|  | trac2 | n | trap3 | db |  |  |  |  |
| mpow1 | mpow1 | i | mpow2 | db | adsw1 |  |  |  |
|  | mpow2 | d | mpow3 | dbi |  |  |  |  |
|  | mpow3 | d | b | db |  |  |  |  |
| mpol1 | mpol1 | i | mpol2 | db | adsw1 |  |  |  |
|  | mpol2 | d | mpol3 | dbi |  |  |  |  |
|  | mpol3 | d | mpow2 | db |  |  |  |  |
| mpiw1 | mpiw1 | i | mpiw2 | db | adsw1 |  |  |  |
|  | mpiw2 | d | mpiw3 | db |  |  |  |  |
|  | mpiw3 | d | mpiw4 | dbi |  |  |  |  |
|  | mpiw4 | i |  | al |  |  |  |  |
| mpil1 | mpil1 | i | mpil2 | db | adsw1 |  |  |  |
|  | mpil2 | d | mpil3 | db | mpiw2 |  |  |  |
|  | mpil3 | d | mpil4 | db |  |  |  |  |
|  | mpil4 | d | mpiw3 | db |  |  |  |  |
| cmmw1 | cmmw1 | d | cmmw2 | db |  |  |  |  |
|  | cmmw2 | d | cmmw3 | db |  |  |  |  |
|  | cmmw3 | d | cmmw4 | dbi |  |  |  |  |
|  | cmmw4 | i |  | al |  |  |  |  |
| cmml1 | cmml1 | d | cmml2 | db | cmmw1 |  |  |  |
|  | cmml2 | d | cmml3 | db | cmmw2 |  |  |  |
|  | cmml3 | d | cmml4 | db |  |  |  |  |
|  | cmml4 | d | cmml5 | dbi | cmmw3 |  |  |  |
|  | cmml5 | d | cmml6 | db |  |  |  |  |
|  | cmml6 | i | cmml7 | db |  |  |  |  |
|  | cmml7 | i |  | al |  |  |  |  |
| exge1 | exge1 | i | exge2 | dbi |  |  |  |  |
|  | exge2 | i | rcal3 | db |  |  |  |  |
| asbb1 | asbb1 | n | asbb2 | db | pdcw1 |  |  |  |
|  | asbb2 | d | asbb3 | db | asxw2 |  |  |  |
|  | asbb3 | d | asbb4 | db | asxw3 |  |  |  |
|  | asbb4 | d | asbb5 | dbi | asxw4 |  |  |  |
|  | asbb5 | i | asbb6 | db |  |  |  |  |
|  | asbb6 | i | morw2 | db |  |  |  |  |
| rbrb1 | rbrb1 | i | rbrb2 | dbi | rorw1 |  |  |  |
|  | rbrb2 | i | rbrb3 | db | asbb6 |  |  |  |
|  | rbrb3 | n |  | al |  |  |  |  |

-continued

APPENDIX A
LIST OF MICROWORDS

| ROUTINE | LABEL | FC | NMA | TYPE | CBC | ORIGIN | ROW | DESTINATIONS |
|---------|-------|----|----|------|-----|--------|-----|--------------|
| b | b | i | mmrw3 | dbi | | | | |
| maqw1 | maqw1 | i | morw2 | dbi | | | | |
| maql1 | maql1 | i | morl2 | dbi | | magn1 | | |
| raqw1 | raqw1 | i | roaw2 | dbi | | | | |
| raql1 | raql1 | i | roal2 | dbi | | raqw1 | | |
| rlql1 | rlql1 | i | mmrw3 | dbi | | | | |
| halt1 | halt1 | d | halt1 | db | | dvumb | | |
| stop1 | stop1 | n | | al | | | | |
| cpmm1 | cpmm1 | i | cprm2 | dbi | | romw1 | | |
| cpdw1 | cpdw1 | i | mmrw3 | dbi | | | | |
| cpdl1 | cpdl1 | i | cpdl2 | dbi | | cpdw1 | | |
| | cpdl2 | i | | al | | | | |
| rcaw1 | rcaw1 | i | rcaw2 | dbi | | roaw1 | | |
| | rcaw2 | i | | al | | | | |
| rcal1 | rcal1 | i | rcal2 | dbi | | roaw1 | | |
| | rcal2 | i | rcal3 | db | | | | |
| | rcal3 | n | | al | | | | |
| cpmw1 | cpmw1 | i | rcaw2 | dbi | | romw1 | | |
| cpml1 | cpml1 | i | cpml2 | dbi | | romw1 | | |
| | cpml2 | i | rcal3 | db | | | | |
| cprw1 | cprw1 | i | rcaw2 | dbi | | rorw1 | | |
| cprl1 | cprl1 | i | cprl2 | dbi | | rorw1 | | |
| | cprl2 | i | rcal3 | db | | | | |
| cprm1 | cprm1 | i | cprm2 | dbi | | rorw1 | | |
| | cprm2 | i | rcal3 | db | | | | |
| stiw1 | stiw1 | n | stiw2 | db | | trac1 | | |
| | stiw2 | n | stiw3 | db | | | | |
| | stiw3 | n | stiw4 | db | | | | |
| | stiw4 | n | malw3 | db | | | | |
| rstw1 | rstw1 | n | stiw4 | db | | | | |
| mstw1 | mstw1 | n | stiw4 | db | | | | |
| stmw1 | stmw1 | i | stmw2 | dbi | | | | |
| | stmw2 | i | morw2 | db | | | | |
| strw1 | strw1 | i | strw2 | dbi | | trac1 | | |
| | strw2 | i | rcal3 | db | | | | |
| tsmw1 | tsmw1 | i | mmrw3 | dbi | | | | |
| tsrw1 | tsrw1 | i | mmrw3 | dbi | | rrgw1 | | |
| tsml1 | tsml1 | i | tsml2 | dbi | | tsmw1 | | |
| | tsml2 | i | | al | | | | |
| tsrl1 | tsrl1 | i | tsrl2 | dbi | | rrgw1 | | |
| | tsrl2 | i | | al | | | | |
| susp1 | susp1 | i | extr2 | dbi | | exge1 | | |
| lusp1 | lusp1 | i | leaa2 | dbi | | leaa1 | | |
| swap1 | swap1 | i | swap2 | dbi | | | | |
| | swap2 | i | | al | | | | |
| rset1 | rset1 | n | rset2 | db | | stop1 | | |
| | rset2 | n | rset3 | dbi | | | | |
| | rset3 | a | rset4 | db | | | rsrs1 | |
| | rset4 | a | | bc | auz | dvumb | | rset3 rset5 |
| | rset5 | i | | al | | | rsrs1 | |
| rstp1 | rstp1 | n | rstp2 | dbc | | | | |
| | rstp2 | n | rstp3 | db | | | | |
| | rstp3 | i | rstp4 | db | | | | |
| | rstp4 | i | rstp5 | db | | rstp3 | | |
| | rstp5 | i | jmal1 | db | | | | |
| mvlr1 | mulr1 | i | mulm2 | dbi | | | | |
| mulm1 | mulm1 | i | mulm2 | dbi | | | | |
| | mulm2 | i | | bc | ms0 | rorl2 | | mulm4 mulm3 mulm4 mulm5 |
| | mulm3 | n | mulm4 | db | | | mumu1 | |
| | mulm4 | n | | bc | m01 | | mumu1 | mulm6 mulm4 mulm3 mulm5 |
| | mulm5 | n | mulm4 | db | | | mumu1 | |
| | mulm6 | n | | al | | | mumu1 | |
| nnmw1 | nnmw1 | i | morw2 | dbi | | | | |
| nnrw1 | nnrw1 | i | roaw2 | dbi | | | | |
| nnml1 | nnml1 | i | nnml2 | dbi | | nnmw1 | | |
| | nnml2 | i | morw2 | db | | | | |
| nnrl1 | nnrl1 | i | nnrl2 | dbi | | nnrw1 | | |
| | nnrl2 | i | roal4 | db | | | | |
| nbcr1 | nbcr1 | i | nbcr2 | dbi | | nnrw1 | | |
| | nbcr2 | i | nbcr3 | db | | asbb6 | | |
| | nbcr3 | n | | al | | | nbsr1 | |
| nbcm1 | nbcm1 | i | asbb6 | dbi | | | | |
| extr1 | extr1 | i | extr2 | dbi | | | | |
| | extr2 | i | | al | | | | |
| jsal1 | jsal1 | i | jsal2 | db | | ablw1 | | |
| | jsal2 | i | jsaw2 | db | | | | |
| jsrd1 | jsrd1 | n | jsrd2 | db | | | | |
| | jsrd2 | i | jsrd3 | db | | | | |
| | jsrd3 | i | jsaw2 | db | | | | |

-continued

APPENDIX A
LIST OF MICROWORDS

| ROUTINE | LABEL | FC | NMA | TYPE | CBC | ORIGIN | ROW | DESTINATIONS |
|---|---|---|---|---|---|---|---|---|
| jsaw0 | jsaw0 | n | jsaw1 | db | | | | |
| | jsaw1 | i | jsaw2 | db | | | | |
| | jsaw2 | d | jsaw3 | db | | | | |
| | jsaw3 | d | b | dbi | | | | |
| jsra1 | jsra1 | i | jsaw2 | db | | | | |
| jsrx0 | jsrx0 | n | jsrx1 | db | | aixw0 | | |
| | jsrx1 | n | | bc | il1 | | | jsrx2 jsrx3 |
| | jsrx2 | n | jsrd2 | db | | | jsjs1 | |
| | jsrx3 | n | jsrd2 | db | | | jsjs1 | |
| jmaw1 | jmaw1 | n | jmal2 | db | | jsaw0 | | |
| jmpa1 | | b | | db | | | | |
| jmpa1 | i | | | | | | | |
| jmal1 | jmal1 | i | jmal2 | db | | ablw1 | | |
| | jmal2 | i | b | db | | | | |
| jmpd1 | jmpd1 | n | bbci3 | db | | jsrd1 | | |
| jmpx0 | jmpx0 | n | jmpx1 | db | | aixw0 | | |
| | jmpx1 | n | | bc | il1 | jsrx1 | | jmpx2 jmpx3 |
| | jmpx2 | n | bbci3 | db | | jsrx2 | jmjm1 | |
| | jmpx3 | n | bbci3 | db | | jsrx3 | jmjm1 | |
| dcnt1 | dcnt1 | n | dcnt2 | db | | | | |
| | dcnt2 | i | | bci | ze | | | dcnt4 dcnt3 |
| | dcnt3 | i | dcnt5 | db | | rcaw2 | dcdc1 | |
| | dcnt4 | i | b | db | | rorl2 | dcdc1 | |
| | dcnt5 | i | mmrw3 | db | | b | | |
| bbci1 | bbci1 | n | | bc | cc | dcnt1 | mabb1 | bbci2 bbci3 |
| | bbci2 | n | b | db | | rcal3 | | |
| | bbci3 | i | b | db | | | | |
| bbcw1 | bbcw1 | n | | bc | cc | | | bbcw3 bbci3 |
| | bbcw3 | n | malw3 | db | | rcal3 | mabb1 | |
| laal1 | laal1 | i | laal2 | db | | o#l1 | | |
| | laal2 | i | b | db | | o#w1 | | |
| laaw1 | laaw1 | i | b | db | | | | |
| leaa1 | leaa1 | i | leaa2 | dbi | | | | |
| | leaa2 | i | | al | | | dvdv1 | |
| lead1 | lead1 | i | lead2 | db | | | | |
| | lead2 | i | b | db | | | | |
| leax0 | leax0 | n | leax1 | db | | aixw0 | | |
| | leax1 | i | | bc | il1 | aixw1 | | leax2 leax3 |
| | leax2 | i | leax4 | db | | | lelx1 | |
| | leax3 | i | leax4 | db | | | lelx1 | |
| | leax4 | n | b | db | | | | |
| peax0 | peax0 | n | peax1 | db | | aixw0 | | |
| | peax1 | i | | bc | il1 | aixw1 | | peax2 peax3 |
| | peax2 | i | peax4 | db | | aixw2 | pepx1 | |
| | peax3 | i | peax4 | db | | aixw4 | pepx1 | |
| | peax4 | n | peax5 | db | | | | |
| | peax5 | i | peax6 | db | | | | |
| | peax6 | d | morw2 | db | | bsri2 | | |
| paal1 | paal1 | i | paal2 | db | | ablw1 | | |
| | paal2 | i | paaw2 | db | | | | |
| paaw1 | paaw1 | i | paaw2 | db | | | | |
| | paaw2 | d | mawl3 | db | | bsri2 | | |
| peaa1 | pedda1 | i | peax6 | dbi | | | | |
| pead1 | pead1 | i | pead2 | db | | | | |
| | pead2 | i | pead3 | dbi | | | | |
| | pead3 | i | peax6 | db | | | | |
| bsri1 | bsri1 | n | bsri2 | db | | | | |
| | bsri2 | d | bsri3 | db | | | | |
| | bsri3 | d | malw3 | db | | | | |
| bsrw1 | bsrw1 | n | bsrw2 | db | | | | |
| | bsrw2 | d | bsrw3 | db | | bsri2 | | |
| | bsrw3 | d | malw3 | db | | | | |
| unlk1 | unlk1 | d | unlk2 | db | | ldmr2 | | |
| | unlk2 | d | unlk3 | dbi | | ablw1 | | |
| | unlk3 | i | unlk4 | db | | | | |
| | unlk4 | i | | al | | | | |
| link1 | link1 | i | link2 | db | | | | |
| | link2 | i | link3 | db | | jsrd3 | | |
| | link3 | d | link4 | dbi | | | | |
| | link4 | d | mmiw2 | db | | | | |
| chkr1 | chkr1 | i | chkr2 | dbi | | | | |
| | chkr2 | i | | bc | nv | | | trap1 trap1 chkr3 trap1 |
| | chkr3 | n | | bc | n | dvumb | trch1 | chkr4 trap1 |
| | chkr4 | n | | al | | | trch1 | |
| chkm1 | chkm1 | i | chkr2 | dbi | | | | |
| rtr1 | rtr1 | d | rtr2 | db | | cmmw3 | | |
| | rtr2 | d | rtr3 | db | | malw3 | | |
| | rtr3 | d | rtr4 | db | | smaw2 | | |
| | rtr4 | d | jmal2 | db | | | | |

-continued

APPENDIX A
LIST OF MICROWORDS

| ROUTINE | LABEL | FC | NMA | TYPE | CBC | ORIGIN | ROW | DESTINATIONS |
|---|---|---|---|---|---|---|---|---|
| rts1 | rts1 | d | rts2 | db | | cmmw3 | | |
| | rts2 | d | rts3 | db | | ablw1 | | |
| | rts3 | i | b | db | | | | |
| bcsm1 | bcsm1 | i | bcsm2 | dbi | | | | |
| | bcsm2 | d | | al | | | | |
| bcsr1 | bcsr1 | i | bcsr2 | dbi | | exge1 | | |
| | bcsr2 | i | | bc | d4 | | | bcsr4 bcsr3 |
| | bcsr3 | n | bcsr5 | db | | | bcbc1 | |
| | bcsr4 | n | | al | | | bcbc1 | |
| | bcsr5 | n | | al | | | | |
| bclm1 | bclm1 | i | bclm2 | dbi | | | | |
| | bclm2 | i | bcsm2 | db | | | | |
| bclr1 | bclr1 | i | bclr2 | dbi | | exge1 | | |
| | bclr2 | i | | bc | d4 | bcsr2 | | bclr4 bclr3 |
| | bclr3 | n | bclr5 | db | | bcsr3 | bcbc2 | |
| | bclr4 | n | bcsr4 | db | | | bcbc2 | |
| | bclr5 | n | bcsr5 | db | | bclr4 | | |
| btsm1 | btsm1 | i | mmrw3 | dbi | | | | |
| btsr1 | btsr1 | i | btsr2 | dbi | | exge1 | | |
| | btsi1 | i | btsr2 | dbi | | | | |
| | btsr2 | i | | bc | d4 | | | bcsr4 btsr3 |
| | btsr3 | n | | al | | | bcbc1 | |
| tasr1 | tasr1 | i | tasr2 | dbi | | | | |
| | tasr2 | i | | al | | | | |
| tasm1 | tasm1 | n | tasm2 | db | | | | |
| | tasm2 | d | b | db | | | | |
| smal1 | smal1 | i | smal2 | db | | malw3 | | |
| | smal2 | i | smal3 | db | | ablw1 | | |
| | smal3 | i | smaw3 | db | | | | |
| stmx1 | stmx1 | i | stmx2 | db | | | | |
| | stmx2 | n | stmx3 | db | | aixw1 | | |
| | stmx3 | i | | bc | i11 | | | stmx4 stmx5 |
| | stmx4 | i | | bc | enl | aixw2 | stst1 | stmr5 mmrw2 stmr4 mmrw2 |
| | stmx5 | i | | bc | enl | aixw4 | stst1 | stmr5 mmrw2 stmr4 mmrw2 |
| sman1 | smaw1 | i | smaw2 | db | | malw3 | | |
| | smaw2 | i | smaw3 | db | | | | |
| | smaw3 | i | | bc | enl | | | stmr5 mmrw2 stmr4 mmrw2 |
| stmd1 | stmd1 | i | stmd2 | db | | malw3 | | |
| | stmd2 | i | stmd3 | db | | smaw2 | | |
| | stmd3 | i | | bc | enl | | | stmr5 mmrw2 stmr4 mmrw2 |
| stmr1 | stmr1 | i | stmr2 | db | | rtr2 | | |
| | stmr2 | i | | bc | enl | | | stmr5 mmrw2 stmr4 mmrw2 |
| | stmr4 | d | stmr6 | db | | | mmst1 | |
| | stmr5 | d | | bc | enl | stmr6 | mmsti | stmr5 mmrw2 stmr4 mmrw2 |
| | stmr6 | d | | bc | enl | | | stmr5 mmrw2 stmr4 mmrw2 |
| ldmx0 | ldmx0 | i | ldmx1 | db | | malw3 | | |
| | ldmx1 | n | ldmx2 | db | | aixw0 | | |
| | ldmx2 | i | | bc | i11 | aixw1 | | ldmx3 ldmx4 |
| | ldmx3 | i | ldmx5 | db | | | ldld1 | |
| | ldmx4 | i | ldmx5 | db | | | ldld1 | |
| | ldmx5 | u | ldmx6 | db | | adsw2 | | |
| | ldmx6 | u | | bc | enl | | | ldmr4 mmaw2 ldmr3 mmaw2 |
| lmaw1 | lmaw1 | i | lmaw2 | db | | malw3 | | |
| | lmaw2 | i | ldmr2 | db | | | | |
| ldmd1 | ldmd1 | i | ldmd2 | db | | malw3 | | |
| | ldmd2 | i | ldmd3 | db | | lead1 | | |
| | ldmd3 | i | ldmd4 | db | | | | |
| | ldmd4 | u | | bc | enl | | | ldmr4 mmaw2 ldmr3 mmaw2 |
| lmal1 | lmal1 | i | lmal2 | db | | malw3 | | |
| | lmal2 | i | lmal3 | db | | e#l1 | | |
| | lmal3 | i | ldmr2 | db | | e#w1 | | |
| ldmr1 | ldmr1 | i | ldmr2 | db | | malw3 | | |
| | ldmr2 | d | | bc | enl | | | ldmr4 mmaw2 ldmr3 mmaw2 |
| | ldmr3 | u | ldmr5 | db | | o#l1 | mmst1 | |
| | ldmr4 | u | | bc | enl | | mmst1 | ldmr4 mmaw2 ldmr3 mmaw2 |
| | ldmr5 | u | | bc | enl | | | ldmr4 mmaw2 ldmr3 mmaw2 |
| sccr1 | sccr1 | i | | bci | cc | sccb1 | | roaw2 sccr2 |
| | sccr2 | i | nbcr3 | db | | sccb2 | rosc1 | |
| sccb1 | sccb1 | i | | bci | cc | | | sccb3 sccb2 |
| | sccb2 | i | morw2 | db | | | scsc1 | |
| | sccb3 | i | morw2 | db | | smaw3 | scsc1 | |
| trpv1 | trpv1 | i | | bci | v | bclm1 | | trpv2 trpv3 |
| | trpv2 | i | | al | | | tvtv1 | |
| | trpv3 | i | trap3 | db | | | tvtv1 | |
| popm1 | popm1 | i | popm2 | db | | malw3 | | |
| | popm2 | d | | bci | enl | ldmr2 | | popm4 popm6 popm3 popm6 |
| | popm3 | d | popm5 | db | | o#l1 | popo1 | |
| | popm4 | d | | bc | enl | ldmr4 | popo1 | popm4 popm6 popm3 popm6 |
| | popm5 | d | | bc | enl | ldmr5 | | popm4 popm6 popm3 popm6 |

-continued
APPENDIX A
LIST OF MICROWORDS

| ROUTINE | LABEL | FC | NMA | TYPE | CBC | ORIGIN | ROW | DESTINATIONS |
|---------|-------|----|----|------|-----|--------|-----|--------------|
|  | popm6 | i | mmrw3 | db |  |  | popo1 |  |
| push1 | push1 | i | push2 | db |  | rtr2 |  |  |
|  | push2 | i |  | bc | enl |  |  | push5 push3 push4 push3 |
|  | push3 | i | mmrw3 | dbi |  | popm6 | puph1 |  |
|  | push4 | d | push6 | db |  |  | puph1 |  |
|  | push5 | d |  | bc | enl |  | puph1 | push5 push3 push4 push3 |
|  | push6 | d |  | bc | enl |  |  | push5 push3 push4 push3 |
| srrw1 | l srrw1 | i | srrw2 | dbi |  |  |  |  |
|  | srrw2 | i |  | bc | auz |  |  | srrw3 nbcr3 |
|  | srrw3 | n |  | bc | auz |  | nbsr1 | ssrw3 nbcr3 |
| sril1 | sril1 | i | srrl2 | dbi |  | sriw1 |  |  |
| sriw1 | sriw1 | i | srrw2 | dbi |  |  |  |  |
| srrl1 | srrl1 | i | srrl2 | dbi |  | srrw1 |  |  |
|  | srrl2 | i |  | bc | auz | srrw2 |  | srrl3 srrl4 |
|  | srrl3 | n |  | bc | auz | srrw3 | srsr1 | srrl3 srrl4 |
|  | srrl4 | n | srrl5 | db |  |  | srsr1 |  |
|  | srrl5 | n |  | al |  |  |  |  |
| sftm1 | sftm1 | i | sftm2 | dbi |  | tsmw1 |  |  |
|  | sftm2 | i | morw2 | db |  |  |  |  |
|  | zzz00 | n | halt1 | db |  |  |  |  |
|  | zzz01 | n | halt1 | db |  |  |  |  |
|  | zzz02 | n | halt1 | db |  |  |  |  |
|  | zzz03 | n | halt1 | db |  |  |  |  |
|  | zzz04 | n | halt1 | db |  |  |  |  |
|  | zzz05 | n | halt1 | db |  |  |  |  |
|  | zzz06 | n | halt1 | db |  |  |  |  |
|  | zzz07 | n | halt1 | db |  |  |  |  |
|  | zzz08 | n | halt1 | db |  |  |  |  |
|  | zzz09 | n | halt1 | db |  |  |  |  |
|  | zzz0a | n | halt1 | db |  |  |  |  |
|  | zzz0b | n | halt1 | db |  |  |  |  |
|  | zzz0c | n | halt1 | db |  |  |  |  |
|  | zzz0d | n | halt1 | db |  |  |  |  |
|  | zzz0e | n | halt1 | db |  |  |  |  |
|  | zzz0f | n | halt1 | db |  |  |  |  |
|  | zzz10 | n | halt1 | db |  |  |  |  |
|  | zzz11 | n | halt1 | db |  |  |  |  |
|  | zzz12 | n | halt1 | db |  |  |  |  |
|  | zzz14 | n | halt1 | db |  |  |  |  |
|  | zzz15 | n | halt1 | db |  |  |  |  |
|  | zzz17 | n | halt1 | db |  |  |  |  |
|  | zzz18 | n | halt1 | db |  |  |  |  |
|  | zzz19 | n | halt1 | db |  |  |  |  |
|  | zzz1a | n | halt1 | db |  |  |  |  |
|  | zzz1b | n | halt1 | db |  |  |  |  |
|  | zzz1c | n | halt1 | db |  |  |  |  |
|  | zzz1d | n | halt1 | db |  |  |  |  |
|  | zzz1e | n | halt1 | db |  |  |  |  |
|  | zzz1f | n | halt1 | db |  |  |  |  |
|  | zzz20 | n | halt1 | db |  |  |  |  |
|  | zzz21 | n | halt1 | db |  |  |  |  |
|  | zzz22 | n | halt1 | db |  |  |  |  |
|  | zzz23 | n | halt1 | db |  |  |  |  |
|  | zzz24 | n | halt1 | db |  |  |  |  |

APPENDIX B

| abbrev | meaning |
|--------|---------|
| rx | register (data or address) designated by $R_X$ field in macroinstruction |
| rxa | address register designated by $R_X$ field in macroinstruction |
| rxd | data register designated by $R_X$ field in macroinstruction |
| rxh | upper half (16 most significant bits) of register (data or address) designated by $R_X$ field in macroinstruction |
| rxl | lower half (16 least significant bits) of register (data or address) designated by $R_X$ field in macroinstruction |
| rxdl | lower half (16 least significant bits) of data register designated by $R_X$ field in macroinstruction |
| ry | register (data or address) designated by $R_Y$ field in macroinstruction |
| rya | address register designated by $R_Y$ field in macroinstruction |
| ryd | data register designated by $R_Y$ field in macroinstruction |
| ryh | upper half (16 most significant bits) of register (data or address) designated by $R_Y$ field in macroinstruction |
| ryl | lower half (16 least significant bits) of register (data or address) designated by $R_Y$ field in macroinstruction |
| rydl | lower half (16 least significant bits) of data register designated by $R_Y$ field in macroinstruction |
| rz | register (data or address) designated by 4-bit field of second word of macro-instructions using indexed addressing for specifying register to be used as the index |
| rzl | lower half (16 least significant bits) of register described immediately above |

APPENDIX B

| abbrev | meaning |
|---|---|
| db | DATA BUS (including high, low, and data sections) |
| dbh | DATA BUS (high section only) |
| dbl | DATA BUS (low section only) |
| dbd | DATA BUS (data section only) |
| db* | DATA BUS (at least data section) |
| dbe | sign extend sign bit onto high section of DATA BUS |
| edb | external data bus |
| dbin | data bus input buffer (including a latch) coupled to external data bus |
| dbinh | upper byte (8 most significant bits) of data bus input buffer |
| dbinl | lower byte (8 least significant bits) of data bus input buffer |
| dob | data bus output buffer coupled to external data bus |
| dobh | upper byte (8 most significant bits) of data bus output buffer |
| dobl | lower byte (8 least significant bits) of data bus output buffer |
| ab | ADDRESS BUS (including high, low, and data sections) |
| abh | ADDRESS BUS (high section only) |
| abl | ADDRESS BUS (low section only) |
| abd | ADDRESS BUS (data section only) |
| ab* | ADDRESS BUS (at least data section) |
| abe | sign extend sign bit onto high section of ADDRESS BUS |
| aob | address output buffer coupled to external address bus |
| * | ADDRESS BUS (high, low, and data sections) or alternatively DATA BUS (high, low, and data sections) |
| *e | sign extend sign bit onto high section of ADDRESS BUS or alternatively onto high section of DATA BUS |
| psw | program status word which stores condition codes, interrupt level, trace mode bit, supervisor mode bit |
| psws | supervisor mode bit in the program status word |
| ssw | special word which monitors status of current microinstruction; accessed in event of address error or bus error to aid processor in recovery from error |
| at | temporary address register |
| ath | upper half (16 most significant bits) of temporary address register |
| atl | lower half (16 least significant bits) of temporary address register |
| sp | user or supervisor stack pointer |
| sph | upper half (16 most significant bits) of user or supervisor stack pointer |
| spl | lower half (16 least significant bits) of user or supervisor stack pointer |
| pc | program counter register |
| pch | upper half (16 most significant bits) of program counter register |
| pcl | lower half (16 least significant bits) of program counter register |
| dcr | decoder in data section of execution unit which is used for bit manipulation |
| reset pren | used during instruction which specifies access to multiple registers in order to advance encoder to the address of the next register to be accessed |
| ftu | field translation unit |
| idle wait | no transfers occur during this microcycle |
| tpend | a one-bit latch which indicates whether the current macroinstruction should implement a trace upon completion of the macroinstruction |
| inl | latch which stores the interrupt level of the interrupting device upon recognition of an interrupt for subsequent transfer into program status word |
| trap | stores vector which can be supplied to field translate unit for addressing a trap routine in event of trap condition (e.g. divide-by-zero) |
| corf | correction factor for decimal arithmetic which can be provided to ALU |
| 'sr c-alu-alue' | shift right used in multiply operation; carry bit coupled to msb of ALU; lsb of ALU coupled to msb of ALUE |

APPENDIX C
CBC Conditional Branch Choice

| CBC | VARIABLE | SOURCE | VALUES | C1 | C0 | REMARKS |
|---|---|---|---|---|---|---|
| 0 | i11 | irc | 0 | 0 | 0 | |
| | | | 1 | 1 | 1 | |
| 1 | auz | eu | 0 | 1 | 1 | |
| | | | 1 | 0 | 1 | |
| 11 | auz | eu | 0 | 1 | 1 | |
| | | | 1 | 0 | 0 | |
| 2 | c | psw | 0 | 0 | 1 | |
| | | | 1 | 0 | 0 | |
| 12 | c | psw | 0 | 1 | 1 | |
| | | | 1 | 1 | 0 | |
| 3 | z | psw | 0 | 0 | 0 | |
| | | | 1 | 1 | 1 | |
| 4 | nz1 | psw | 00 | 1 | 0 | n z |
| | | | 10 | 0 | 1 | |
| | | | x1 | 1 | 1 | |
| 5 | n | psw | 0 | 0 | 1 | |
| | | | 1 | 1 | 1 | |
| 15 | n | psw | 0 | 1 | 0 | |
| | | | 1 | 1 | 1 | |
| 6 | nz2 | psw | 00 | 1 | 1 | n z |
| | | | 1x, x1 | 0 | 1 | |
| 7 | ms0 | eu, ird | x0 | 1 | 1 | ir[B] alue[0] |
| | | | 01 | 0 | 1 | |
| | | | 11 | 1 | 0 | |
| 8 | m01 | eu, ird | 1xxx | 0 | 0 | auz ir[8] alue[1:0] |
| | | | 000x | 1 | 1 | |
| | | | 001x | 0 | 1 | |
| | | | 0100 | 1 | 1 | |
| | | | 0101 | 0 | 1 | |
| | | | 0110 | 1 | 0 | |
| | | | 0111 | 1 | 1 | |
| a | ze | eu | 0 | 1 | 1 | |
| | | | 1 | 0 | 0 | |
| b | nv | psw | x1, 0x | 1 | 1 | n v |
| | | | 10 | 0 | 0 | |
| c | d4 | dcr | 0 | 1 | 1 | |
| | | | 1 | 0 | 1 | |
| 1c | d4 | dcr | 0 | 1 | 1 | |
| | | | 1 | 1 | 0 | |
| d | v | psw | 0 | 1 | 1 | |
| | | | 1 | 0 | 0 | |
| e | enl | eu, ird | 00 | 1 | 0 | end ir[6] |
| | | | 10 | 1 | 1 | |
| | | | x1 | 0 | 0 | |
| 1e | enl | eu, ird | 00 | 1 | 0 | |
| | | | 10 | 1 | 1 | |
| | | | x1 | 0 | 1 | |
| 9 | cc | psw | 0 F | 0 | 1 | |
| | | | 1 T | 1 | 1 | |
| 19 | cc | psw | 0 F | 1 | 0 | |
| | | | 1 T | 1 | 1 | |

APPENDIX D

| abbrev | meaning |
|---|---|
| i11 | bit 11 in IRC register (IRC11); signifies whether or not to sign extend for indexed addressing |
| auz | arithmetic unit result equals zero (AU=0) |
| c | ALU cary bit stored in program status word (PSWC) |

APPENDIX D -continued

| abbrev | meaning |
|---|---|
| z | ALU result equals zero bit stored in program status word (PSWZ) |
| nz1 | logical combination of n and z condition codes (PSWN, PSWZ); used in signed-division algorithm |
| n | ALU result negative bit stored on program status word (PSWN) |
| nz2 | logical combination of n and z condition codes (PSWN, PSWZ); used in signed-division algorithm |
| mso | logical combination of bit 8 in IRD register (IRD8) and bit 0 in ALUE shift register (ALUE 0); used in multiply algorithm |
| m01 | logical combination of auz (AU=0), bit 8 in IRD register (IRD8), and bits 1 and 0 in ALUE shift register (ALUE1, ALUE0); used in multiply algorithm |
| ze | local copy of ALU result equal to zero (LOCZ); local copy required apart from z bit in program status word for operations which must test ALU=0 without changing program status word, such as "Decrement Counter and Branch if Non-Zero" (DCNT) macroinstruction |
| nv | logical combination of n and v condition codes (PSWN, PSWV); used in "Check Register Against Rounds" (CHK) macroinstruction |
| d4 | bit 4 of the decoder in the data section of the execution unit used for bit manipulation (DCR4); bit 4 specifies whether upper half or lower half of 32-bit register is required for bit manipulation |
| v | ALU result overflow bit stored in program status word (PSWV) |
| enl | logical combination of bit 6 in IRD register (IRD6) and signal generated by the multiple register access encoder in execution unit which indicates that all registers specified have been accessed (END) |
| cc | 4-bit field of macroinstruction stored in IRD register (IRDB-IRD8) which specifies conditions to be tested for "Branch Conditionally" (Bcc) and "Set According to Condition" (Scc) macroinstructions |
| irc | IRC register 52 in FIG. 4 |
| eu | execution unit |
| psw | program status word register 86 in FIG. 4 |
| ird | IRD register 56 in FIG. 4 |
| dcr | bit manipulation decoder in data section of execution unit |

APPENDIX E

| cc | abbrev | meaning | condition |
|---|---|---|---|
| 0 | — | branch always, set always | |
| 1 | — | never branch, reset always | |
| 2 | HI | high | $\bar{z} \cdot \bar{c}$ |
| 3 | LS | low or same | $z + c$ |
| 4 | CC | carry clear | $\bar{c}$ |
| 5 | CS | carry set | $c$ |
| 6 | NE | not equal | $\bar{z}$ |
| 7 | EQ | equal | $z$ |
| 8 | VC | no overflow | $\bar{v}$ |
| 9 | VS | overflow | $v$ |
| A | PL | plus | $\bar{n}$ |
| B | MI | minus | $n$ |
| C | GE | greater or equal | $n \cdot v + \bar{n} \cdot \bar{v}$ |
| D | LT | less | $\bar{n} \cdot v + n \cdot \bar{v}$ |
| E | GT | greater | $\bar{z} \cdot n \cdot v + \bar{z} \cdot \bar{n} \cdot \bar{v}$ |
| F | LE | less or equal | $z + \bar{n} \cdot v + n \cdot \bar{v}$ |

APPENDIX F

| Mnemonic | Description | Operand | Mnemonic | Description | Operand |
|---|---|---|---|---|---|
| ABCD | Add Decimal with Extend | 8 | MOVE Status | Move Status Register | 16 |
| ADD | Add Binary | 8, 16, 32 | MOVEUSP | Move User Stack Pointer | 32 |
| ADDA | Add Address | 16, 32 | MOVEM | Move Multiple Registers | 16, 32 |
| ADDI* | Add Immediate | 8, 16, 32 | MOVEP | Move Peripheral | 16, 32 |
| ADDQ* | Add Quick | 8, 16, 32 | MOVEQ* | Load Register Quick | 32 |
| ADDX | Add Extended | 8, 16, 32 | MULS | Signed Multiply | 16*16→32 |
| AND | Logical AND | 8, 16, 32 | MULU | Unsigned Multiply | 16*16→32 |
| ANDI* | Logical AND Immediate | 8, 16, 32 | NBCD | Negate Decimal with Extend | 8 |
| ASL, ASR | Arithmetic Shift | 8, 16, 32 | NEG | Negate Binary | 8, 16, 32 |
| BCC | Conditional Branch | 8, 16 | NEGX | Negate Binary with Extend | 8, 16, 32 |
| BCHG | Test a Bit and Change | 16, 32 | NOP | No operation | — |
| BCLR | Test a Bit and Clear | 16, 32 | NOT | Logical Complement | 8, 16, 32 |
| BRA | Unconditional Branch | 8, 16 | OR | Inclusive OR | 8, 16, 32 |
| BSET | Test a Bit and Set | 16, 32 | ORI* | Inclusive OR Immediate | 8, 16, 32 |
| BSR | Subroutine Branch | 8, 16 | PEA | Push Effective Address | 32 |
| BTST | Test a Bit | 16, 32 | RESET | Reset External Devices | — |
| CHK | Check register against bounds | 16 | ROL, ROR | Rotate without Extend | 8, 16, 32 |
| CLR | Clear an operand | 8, 16, 32 | ROXL, ROXR | Rotate With Extend | 8, 16, 32 |
| CMP | Compare | 8, 16, 32 | RTE | Return from Exception | — |
| CMPA | Compare Address | 16, 32 | RTR | Return and Restore Condition Codes | — |
| CMPI* | Compare Immediate | 8, 16, 32 | RTS | Return from Subroutine | — |
| CMPM | Compare Memory | 8, 16, 32 | SBCD | Subtract Decimal with Extend | 8 |
| DCNT | Decrement Counter and Branch if Non-zero | — | SCC | Set Conditionally | 8 |
| DIVS | Signed Divide | 32/16→32 | STOP | Stop | — |
| DIVU | Unsigned Divide | 32/16→32 | SUBA | Subtract Address | 16, 32 |
| EOR | Exclusive OR | 8, 16, 32 | SUBI* | Subtract Immediate | 8, 16, 32 |
| EORI* | Exclusive OR Immediate | 8, 16, 32 | SUBQ* | Subtract Quick | 8, 16, 32 |
| EXG | Exchange Registers | 32 | SUBX | Subtract Extended | 8, 16, 32 |
| EXT | Sign Extend | 8, 16→16, 32 | SWAP | Swap Register Halves | 16→16 |
| JMP | Unconditional Jump | — | TAS | Test Operand, then Set | 8 |
| JSR | Subroutine Jump | — | TRAP | Trap | — |
| LEA | Load Effective Address | 32 | TRAPV | Trap on Overflow | — |
| LINK | Link and Allocate | — | TST | Test Operand | 8, 16, 32 |
| LSL, LSR | Logical Shift | 8, 16, 32 | TST | Test Operand | 8, 16, 32 |
| MOVE | Move | 8, 16, 32 | UNLK | Unlink | — |
| MOVE CC | Move Condition Code | 16 | | | |

APPENDIX G

| Line Number = Bits [15:12] |
|---|
| 0000 — Bit Manipulation/MOVEP/Immediate |
| 0001 — Move Byte |
| 0010 — Move Long |
| 0011 — Move Word |
| 0100 — Miscellaneous |
| 0101 — ADDQ/SUBQ/$S_{CC}$ |
| 0110 — $B_{CC}$ |
| 0111 — MOVEQ/DCNT |
| 1000 — OR/DIV/SBCD |
| 1001 — SUB/SUBX |
| 1010 — (Unassigned, reserved) |
| 1011 — CMP/EOR |
| 1100 — AND/MUL/ABCD/EXG |
| 1101 — ADD/ADDX |
| 1110 — Shift/Rotate |
| 1111 — (Unassigned, reserved) |

Dynamic Bit

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | Register | | | 1 | Type | | Effective Address | | | | | |

Static Bit

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 1 | 0 | 0 | 0 | Type | | Effective Address | | | | | |

Bit Type Codes: TST = 00, CHG = 01, SET = 10, CLR = 11

MOVEP

| 0 | 0 | 0 | 0 | Register | | | Op-Mode | | | 0 | 0 | 1 | Register | | |
|---|---|---|---|---|---|---|---|---|---|---|---|---|---|---|---|

OR Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | Size | | Effective Address | | | | | |

AND Immediate

| 0 | 0 | 0 | 0 | 0 | 0 | 1 | 0 | Size | | Effective Address | | | | | |
|---|---|---|---|---|---|---|---|---|---|---|---|---|---|---|---|

SUB Immediate

| 0 | 0 | 0 | 0 | 0 | 1 | 0 | 0 | Size | | Effective Address | | | | | |
|---|---|---|---|---|---|---|---|---|---|---|---|---|---|---|---|

ADD Immediate

| 0 | 0 | 0 | 0 | 0 | 1 | 1 | 0 | Size | | Effective Address | | | | | |
|---|---|---|---|---|---|---|---|---|---|---|---|---|---|---|---|

EOR Immediate

| 0 | 0 | 0 | 0 | 1 | 0 | 1 | 0 | Size | | Effective Address | | | | | |
|---|---|---|---|---|---|---|---|---|---|---|---|---|---|---|---|

CMP Immediage

| 0 | 0 | 0 | 0 | 1 | 1 | 0 | 0 | Size | | Effective Address | | | | | |
|---|---|---|---|---|---|---|---|---|---|---|---|---|---|---|---|

MOVE Byte

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 1 | | \multicolumn{3}{c}{Destination} | | | \multicolumn{3}{c}{Source} | | | | |

| | | | | | Destination | | | | | Source | | | | | |
|---|---|---|---|---|---|---|---|---|---|---|---|---|---|---|---|
| 0 | 0 | 0 | 1 | | Register | | Mode | | | Mode | | | Register | | |

MOVE Long

| 0 | 0 | 1 | 0 | | Register | | Mode | | | Mode | | | Register | | |
|---|---|---|---|---|---|---|---|---|---|---|---|---|---|---|---|
| | | | | | Destination | | | | | Source | | | | | |

MOVE Word

| 0 | 0 | 1 | 1 | | Register | | Mode | | | Mode | | | Register | | |
|---|---|---|---|---|---|---|---|---|---|---|---|---|---|---|---|
| | | | | | Destination | | | | | Source | | | | | |

NEGX

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 0 | 0 | 0 | Size | | Effective Address | | | | | |

MOVE from SR

| 0 | 1 | 0 | 0 | 0 | 0 | 0 | 0 | 1 | | Effective Address | | | | | |
|---|---|---|---|---|---|---|---|---|---|---|---|---|---|---|---|

CLR

| 0 | 1 | 0 | 0 | 0 | 0 | 1 | 0 | Size | | Effective Address | | | | | |
|---|---|---|---|---|---|---|---|---|---|---|---|---|---|---|---|

NEG

| 0 | 1 | 0 | 0 | 0 | 1 | 0 | 0 | Size | | Effective Address | | | | | |
|---|---|---|---|---|---|---|---|---|---|---|---|---|---|---|---|

MOVE to CC

| 0 | 1 | 0 | 0 | 0 | 1 | 0 | 0 | 1 | 1 | Effective Address | | | | | |
|---|---|---|---|---|---|---|---|---|---|---|---|---|---|---|---|

NOT

| 0 | 1 | 0 | 0 | 0 | 1 | 1 | 0 | Size | | Effective Address | | | | | |
|---|---|---|---|---|---|---|---|---|---|---|---|---|---|---|---|

MOVE to SR

| 0 | 1 | 0 | 0 | 0 | 1 | 1 | 0 | 1 | 1 | Effective Address | | | | | |
|---|---|---|---|---|---|---|---|---|---|---|---|---|---|---|---|

NBCD

| 0 | 1 | 0 | 0 | 1 | 0 | 0 | 0 | 0 | 0 | Effective Address | | | | | |
|---|---|---|---|---|---|---|---|---|---|---|---|---|---|---|---|

PEA

| 0 | 1 | 0 | 0 | 1 | 0 | 0 | 0 | 0 | 1 | Effective Address | | | | | |
|---|---|---|---|---|---|---|---|---|---|---|---|---|---|---|---|

SWAP

| 0 | 1 | 0 | 0 | 1 | 0 | 0 | 0 | 0 | 1 | 0 | 0 | 0 | Register | | |
|---|---|---|---|---|---|---|---|---|---|---|---|---|---|---|---|

MOVEM Registers to EA

| 0 | 1 | 0 | 0 | 1 | 0 | 0 | 0 | 1 | Sz | Effective Address | | | | | |
|---|---|---|---|---|---|---|---|---|---|---|---|---|---|---|---|

EXT

| 0 | 1 | 0 | 0 | 1 | 0 | 0 | 0 | 1 | Sz | 0 | 0 | 0 | Register | | |
|---|---|---|---|---|---|---|---|---|---|---|---|---|---|---|---|

TST

| 0 | 1 | 0 | 0 | 1 | 0 | 1 | 0 | Size | | Effective Address | | | | | |
|---|---|---|---|---|---|---|---|---|---|---|---|---|---|---|---|

TAS

| 0 | 1 | 0 | 0 | 1 | 0 | 1 | 0 | 1 | 1 | Effective Address | | | | | |
|---|---|---|---|---|---|---|---|---|---|---|---|---|---|---|---|

MOVEM EA to Registers

| 0 | 1 | 0 | 0 | 1 | 1 | 0 | 0 | 1 | Sz | Effective Address | | | | | |
|---|---|---|---|---|---|---|---|---|---|---|---|---|---|---|---|

TRAP

| 0 | 1 | 0 | 0 | 1 | 1 | 1 | 0 | 0 | 1 | 0 | 0 | Vector | | | |
|---|---|---|---|---|---|---|---|---|---|---|---|---|---|---|---|

LINK

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 0 | 1 | 0 | Register | | |

UNLK

| 0 | 1 | 0 | 0 | 1 | 1 | 1 | 0 | 0 | 1 | 0 | 1 | 1 | Register | | |
|---|---|---|---|---|---|---|---|---|---|---|---|---|---|---|---|

MOVE USP

| 0 | 1 | 0 | 0 | 1 | 1 | 1 | 0 | 0 | 1 | 1 | 0 | dr | Register | | |
|---|---|---|---|---|---|---|---|---|---|---|---|---|---|---|---| dr (direction): 0 — to USP, 1 — from USP

RESET

| 0 | 1 | 0 | 0 | 1 | 1 | 1 | 0 | 0 | 1 | 1 | 1 | 0 | 0 | 0 | 0 |
|---|---|---|---|---|---|---|---|---|---|---|---|---|---|---|---|

NOP

| 0 | 1 | 0 | 0 | 1 | 1 | 1 | 0 | 0 | 1 | 1 | 1 | 0 | 0 | 0 | 1 |
|---|---|---|---|---|---|---|---|---|---|---|---|---|---|---|---|

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| STOP | 0 | 1 | 0 | 0 | 1 | 1 | 1 | 0 | 0 | 1 | 1 | 1 | 0 | 0 | 1 | 0 |
| RTE  | 0 | 1 | 0 | 0 | 1 | 1 | 1 | 0 | 0 | 1 | 1 | 1 | 0 | 0 | 1 | 1 |
| RTS  | 0 | 1 | 0 | 0 | 1 | 1 | 1 | 0 | 0 | 1 | 1 | 1 | 0 | 1 | 0 | 1 |
| TRAPV| 0 | 1 | 0 | 0 | 1 | 1 | 1 | 0 | 0 | 1 | 1 | 1 | 0 | 1 | 1 | 0 |
| RTR  | 0 | 1 | 0 | 0 | 1 | 1 | 1 | 0 | 0 | 1 | 1 | 1 | 0 | 1 | 1 | 1 |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| JSR | 0 | 1 | 0 | 0 | 1 | 1 | 1 | 0 | 1 | 0 | Effective Address ||||||
| JMP | 0 | 1 | 0 | 0 | 1 | 1 | 1 | 0 | 1 | 1 | Effective Address ||||||

JSR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 1 | 0 | Effective Address ||||||

JMP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 1 | 1 | Effective Address ||||||

MOVEP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | Data Register ||| Op-Mode ||| 0 | 0 | 1 | Addr Register |||

CHK

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | Register ||| 1 | 1 | 0 | Effective Address ||||||

LEA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | Register ||| 1 | 1 | 1 | Effective Address ||||||

ADDQ

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 1 | Data ||| 0 | Size || Effective Address ||||||

SUBQ

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 1 | Data ||| 1 | Size || Effective Address ||||||

Scc

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 1 | Condition |||| 1 | 1 | Effective Address ||||||

Bcc

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 0 | Condition |||| 8-bit Displacement ||||||||

MOVEQ

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 1 | Register ||| 0 | Data ||||||||

DCNT (Displacement is always negative)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 1 | Register ||| 1 | Displacement |||||||

OR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 0 | Register ||| Op-Mode ||| Effective Address ||||||

DIVU

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 0 | Register ||| 0 | 1 | 1 | Effective Address ||||||

DIVS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 0 | Register ||| 1 | 1 | 1 | Effective Address ||||||

SECD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 0 | Dest'n Register ||| 1 | 0 | 0 | 0 | 0 | R/M | Source Register |||

R/M (register/memory): register − register = 0, memory − memory = 1

SUB
SUBA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 1 | Register ||| Op-Mode ||| Effective Address ||||||

SUBX

| 1 | 0 | 0 | 1 | Dest'n Register ||| 1 | Size || 0 | 0 | R/M | Source Register |||

R/M (register/memory): register - register = 0, memory - memory = 1

CMP
CMPA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 1 | 1 | Register ||| Op-Mode ||| Effective Address ||||||

EOR

| 1 | 0 | 1 | 1 | Register ||| 1 | Size || Effective Address ||||||

CMPM

| 1 | 0 | 1 | 1 | Register ||| 1 | Size || 0 | 0 | 1 | Register |||

AND

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Register ||| Op-Mode ||| Effective Address ||||||

MULU

| 1 | 1 | 0 | 0 | Register ||| 0 | 1 | 1 | Effective Address ||||||

MULS

| 1 | 1 | 0 | 0 | Register ||| 1 | 1 | 1 | Effective Address ||||||

ABCD

| 1 | 1 | 0 | 0 | Dest'n Register ||| 1 | 0 | 0 | 0 | 0 | R/M | Source Register |||

R/M (register/memory): register - register = 0, memory - memory = 1

EXGD

| 1 | 1 | 0 | 0 | Data Register ||| 1 | 0 | 1 | 0 | 0 | 0 | Data Register |||

EXGM

| 1 | 1 | 0 | 0 | Data Register ||| 1 | 0 | 1 | 0 | 0 | 1 | Address Register |||

EXGA

| 1 | 1 | 0 | 0 | Address Register ||| 1 | 1 | 0 | 0 | 0 | 1 | Address |||

ADD
ADDA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 1 | Register ||| Op-Mode ||| Effective Address ||||||

ADDX

| 1 | 1 | 0 | 1 | Dest'n Register ||| 1 | Size || 0 | 0 | R/M | Source Register |||

R/M (register/memory): register - register = 0, memory - memory = 1

Data Register Shifts

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 0 | Count/Register ||| d | Size || i/r | Type || Register |||

Memory Shifts

| 1 | 1 | 1 | 0 | 0 | Type || d | 1 | 1 | Effective Address ||||||

Shift Type Codes: AS = 00, LS = 01, ROX = 10, RO = 11 d (direction): Right = 0, Left = 1 i/r (count source): Immediate Count = 0, Register Count = 1

We claim:

1. A data processor adapted for microprogrammed operation for executing a plurality of macroinstructions, the data processor comprising:
   (a) first means for storing a macroinstruction having a field containing conditional branch information;
   (b) a control store having an input port for receiving a control store address and an output port providing a control word which includes a conditional branch selection field; and
   (c) means for storing conditional signals indicative of the operational state of the data processor,
   (d) conditional branch control means coupled to the first means, coupled to the output port of the control store, and coupled to the means for storing conditional signals, the conditional branch control means comprising means for decoding the conditional branch selection field to provide a selection signal for selecting branch information from either the macroinstruction branch field or the control word conditional branch selection field, and means responsive to the selected branch field information and the conditional signals for providing branch execution address information to the control store.

2. A data processor as recited in claim 1 wherein: the conditional branch control means is responsive to at least one of the conditional branch selection signals for selecting the branch execution address information from among a plurality of groups of branch execution address information contained within the one or more selected conditional signals.

3. A data processor as recited in claim 1 wherein: the branch execution address information provided by the conditional branch control means is comprised of multibits.

4. A data processor as set forth in claim 3 wherein the control word further includes a field containing the base address of a plurality of possible branch addresses of control words, and the conditional branch control means further comprises means responsive to the base address field for addressing said plurality of possible branch addresses.

5. A data processor as set forth in claim 4 further comprising an address selection means coupled to the conditional branch control means and responsive to the branch execution address information thereof for selecting one of the plurality of possible branch addresses.

* * * * *